United States Patent [19]
Mizuuchi et al.

[11] Patent Number: 6,002,515
[45] Date of Patent: Dec. 14, 1999

[54] METHOD FOR PRODUCING POLARIZATION INVERSION PART, OPTICAL WAVELENGTH CONVERSION ELEMENT USING THE SAME, AND OPTICAL WAVEGUIDE

[75] Inventors: Kiminori Mizuuchi; Kazuhisa Yamamoto; Yasuo Kitaoka, all of Osaka, Japan

[73] Assignee: Matsushita Electric Industrial Co., Ltd., Osaka, Japan

[21] Appl. No.: 09/005,994

[22] Filed: Jan. 12, 1998

[30] Foreign Application Priority Data

Jan. 14, 1997 [JP] Japan ..................................... 9-004301
Feb. 5, 1997 [JP] Japan ..................................... 9-022321
Jun. 19, 1997 [JP] Japan ..................................... 9-162256
Jun. 20, 1997 [JP] Japan ..................................... 9-163977

[51] Int. Cl.$^6$ ....................................................... G02F 1/35
[52] U.S. Cl. ............................................. 359/326; 359/332
[58] Field of Search ..................................... 359/326–330, 359/331, 332; 385/122

[56] References Cited

U.S. PATENT DOCUMENTS 5,652,674 7/1997 Mizuuchi et al. ........................ 359/326

FOREIGN PATENT DOCUMENTS

| 1-238631 | 9/1989 | Japan . |
| 4-254834 | 9/1992 | Japan . |
| 4-335620 | 11/1992 | Japan . |
| 5-273624 | 10/1993 | Japan . |

*Primary Examiner*—Georgia Epps
*Assistant Examiner*—Suzanne Letendre
*Attorney, Agent, or Firm*—Merchant & Gould, P.C.

[57] ABSTRACT

A method for manufacturing a polarization inversion part on the substrate of a ferroelectric crystal that is suitable for the use as a light wavelength conversion element or the like. A deep polarization inversion part or a homogeneous polarization inversion part is formed by one or more of: reinverting polarization in a part of the polarization inversion part; inverting polarization while applying a voltage also in the perpendicular direction to the polarization direction of a crystal; forming a low resistance part between electrodes to which an voltage is applied; inverting polarization from a electrode formed in a concave part on the surface of a substrate; applying a high voltage utilizing a insulating film; or the like. A substrate comprising a polarization inversion part manufactured by such methods is useful not only for a light wavelength conversion element but also for a diffxaction element and is also useful for a short wavelength light generator and an optical pick-up comprising a light wavelength conversion element.

43 Claims, 65 Drawing Sheets

(a)

Waveguide mode

⇩

Focus spot (b)

Waveguide mode

⇩

Focus spot (a)

(b)

(c)

(a)

(b)

(c)

(d)

(a)

(b)

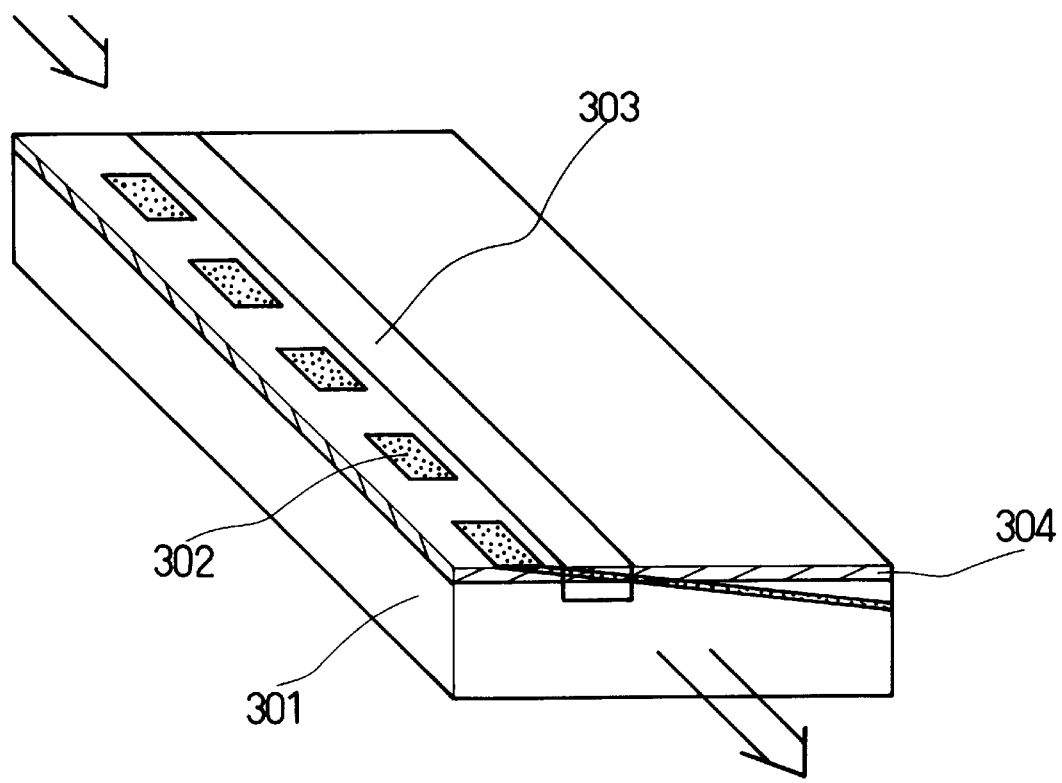
F I G. 64

METHOD FOR PRODUCING POLARIZATION INVERSION PART, OPTICAL WAVELENGTH CONVERSION ELEMENT USING THE SAME, AND OPTICAL WAVEGUIDE

FIELD OF THE INVENTION

The present invention relates to a light wavelength conversion element, to which a coherent source is applied, for use in the fields of light information processing and light applied measurement and a method for manufacturing polarization inversion parts in such a light wavelength conversion element. Also, the present invention relates to a short wavelength light generator using a light wavelength conversion element and an optical pickup. Furthermore, the present invention relates to a diffraction element for use in the above technical fields.

In addition, the present invention relates to an optical waveguide, to which a coherent source is applied, for use in the fields of light information processing and light applied measurement.

BACKGROUND OF THE INVENTION

Polarization inversion, in which the polarization of a single-polarization ferroelectric crystal is partially inverted, enables the control of light waves such as a nonlinear optical effect, an electric optical effect and an acoustic optical effect and is used in a wide variety of fields such as communication, light information processing and measurement. Among them, many studies have made on the application of the polarization inversion to a light wavelength conversion element utilizing the nonlinear optical effect because such application can implement a small-size short wavelength light source in which the wavelength of light from a semiconductor laser is converted.

A conventional method for manufacturing polarization inversion parts comprises forming a comb-shaped electrode and a stripe electrode on the surface of the ferroelectric substrate of an X or Y sheet parallel to a polarization direction and applying a voltage between the electrodes to form polarization inversion parts (Publication of Japanese Patent Application Tokkai Hei No. 4-335620). One conventional method for manufacturing polarization inversion parts will be described with reference to FIG. 58. A first electrode 202 and a second electrode 203 are formed on the ferroelectric $LiNbO_3$ substrate 201 of an X sheet in the Z direction (the C direction) that is the polarization direction of the $LiNbO_3$ substrate 201, and the polarization between the electrodes is inverted by applying a voltage between the electrodes from a power supply 205 to periodically form polarization inversion regions 204.

Furthermore, as shown in FIG. 59, another method for forming polarization inversion parts 204 comprises forming a second electrode 203 on a side of a substrate and applying a voltage between a first electrode 202 on a surface of the substrate and the side electrode 203.

Also, a method using a substrate is proposed in which the polarization direction of a crystal is inclined with respect to the surface of the substrate. This method is different from the method shown in FIG. 58 because the spontaneous polarization direction of the substrate is inclined with respect to the crystal surface. Electrodes are formed in the polarization direction of the crystal so that an electric field opposed to the polarization direction of the crystal can be applied. When a voltage is applied between the electrodes, polarization inversion occurs from the first electrode and grows toward the second electrode. Since the polarization inversion grows parallel to the spontaneous polarization of the crystal, the polarization inversion parts get into the substrate along the inclined crystal axis. Therefore, the polarization inversion parts get into the substrate deeper as approaching from the first electrode to the second electrode.

Another conventional method for manufacturing polarization inversion parts is shown in FIG. 60. According to the method shown in FIG. 60, polarization inversion parts are formed in the thickness direction of the substrate.

An electric charge required for polarization inversion is determined by (spontaneous polarization Ps)×(electrode range area)×2. The spread of a polarization inversion part is determined by a W/A ratio (A is the period of an electrode and W is the width of the electrode). It is believed that the polarization inversion part spreads only by the value that does not depend on the thickness of the substrate. In the polarization inversion part formed by the method as shown in FIG. 60, the period is about 3 μm, and the area of a region in which the polarization inversion part is formed is about 1 $mm^2$.

Other examples of the structures of conventional light wavelength conversion elements are shown in FIGS. 61 and 62. The light wavelength conversion element converts the fundamental 208 of light collected in the element to a second harmonic 209 (hereinafter also referred to as SHG) by periodically forming polarization inversion parts 207 on a substrate 206 of a ferroelectric crystal such as $LiTaO_3$ and performing a phase matching by the polarization inversion parts. Also, in the embodiment shown in FIG. 62, a fundamental 208 is converted to a SHG 209 in an optical waveguide 210 formed on the surface of a substrate 206.

Publication of Japanese Patent Application Tokkai Hei No. 5-273624 discloses a light wavelength conversion element in which a nonlinear deterioration layer is provided near the surface of an optical waveguide. Publication of Japanese Patent Application Tokkai Hei 4-254834 discloses a light wavelength conversion element in which a high refractive index layer having a higher refractive index than an optical waveguide is formed on the optical waveguide. The structural view of this light wavelength conversion element is shown in FIG. 63. In the light wavelength conversion element, a $TiO_2$ high refractive index layer 211 is formed on the surface of an optical waveguide 210 formed on a $LiNbO_3$ substrate 206. Since the refractive index of the $TiO_2$ film 211 is higher than that of the optical waveguide 210, the containment of the fundamental 208 is strong, achieving a more efficient light wavelength conversion element.

Furthermore, another light wavelength conversion element is proposed which uses a ridge-shaped optical waveguide structure to strengthen the containment of an optical waveguide (Publication of Japanese Patent Application Tokkai Hei No. 1-238631).

Problems of the conventional methods for manufacturing polarization inversion parts will be described below.

In a conventional method for manufacturing polarization inversion parts, polarization inversion parts grow from a +C surface, on which polarization inversion cores are formed, to a −C surface. Therefore, a homogeneous polarization inversion structure that has substantially the same shape as an electrode is formed near the +C surface, while the shape of the polarization inversion structure becomes irregular as it approaches the −C surface, forming a polarization inversion structure that does not have a full homogeneity near the −C surface.

Thus, it is difficult to form a light wavelength conversion element that has a deep polarization inversion structure formed by application of an electric field and an optical waveguide formed on a −C surface.

Furthermore, in a conventional method for manufacturing polarization inversion parts using the substrate of an X or Y sheet, it is difficult to form deep polarization inversion parts.

Thus, the depth of polarization inversion parts in a substrate in which the direction of spontaneous polarization is parallel to the surface of the substrate is limited to 1 µm or less. Furthermore, the homogeneity of the polarization inversion parts is not good. Therefore, it is difficult to form polarization inversion parts having a large area, and the interaction length can be only about 10 mm.

In a conventional method for manufacturing polarization inversion parts using a polarization direction and using a substrate in which the polarization direction of a crystal is inclined with respect to the surface of the substrate, polarization inversion parts are formed in the polarization direction of the crystal, so that deep polarization inversion parts are formed. However, the conventional method has the following problems:

1) the effective area that can be used for a light wavelength conversion element is small; and 2) the depth of the polarization inversion parts is limited to about 2 µm, so that it is difficult to form deeper polarization inversion parts.

Polarization inversion parts formed in an oblique substrate get into the substrate from the surface of the substrate. Therefore, only part of the deep polarization inversion parts overlapping an optical waveguide are present near the surface of the substrate. Thus, only part of the polarization inversion parts can be used for an optical waveguide type light wavelength conversion element.

Next, the problems of the conventional light wavelength conversion elements will be described below.

The light wavelength conversion element as shown in FIG. 62 is intended to achieve a high efficiency by forming deep polarization inversion structures using an oblique substrate and enhancing the overlap of the deep polarization inversion structures and an optical waveguide. However, the effective area in which polarization inversion can be used is very narrow and the substrate can have about one optical waveguide overlapping the polarization inversion parts.

The light wavelength conversion element as shown in FIG. 63 is intended to achieve a high efficiency by forming a high refractive index layer 211 having a higher refractive index than a waveguide 210 and strengthening the light containment. However, the high refractive index layer 211 of a ferroelectic film greatly affects the effective refractive index of the waveguide 210, so that a high precision is required for the homogeneity of the thickness of the high refractive index layer 211 on the entire waveguide 210. If the effective refractive index of the waveguide is not controlled well in the propagation direction of light, the conversion efficiency decreases extremely. Therefore, precise homogeneity is required for the thickness of the high refractive index layer 211.

Also, waveguide loss is likely to occur at an interface between the waveguide 210 and the high refractive index layer 211.

SUMMARY OF THE INVENTION

An object of the present invention is to provide a method for manufacturing a polarization inversion part excellent in homogeneity even in the vicinity of a −C surface.

Another object of the present invention is to provide a method for manufacturing a polarization inversion part reaching from a surface of a substrate to a deep part, particularly, to provide a method for manufacturing a deep polarization inversion part even in the case of using a substrate having a polarization direction parallel to the substrate such as an X-plate or an Y-plate or a substrate having a polarization direction inclined with respect to the substrate.

Another object of the present invention is to provide a method for manufacturing a polarization inversion part broadening an effective area for light wavelength conversion in a substrate having a polarization direction inclined with respect to the substrate surface.

Another object of the present invention is to provide a light wavelength conversion element having high efficiency, particularly, a light wavelength conversion element in which the depth and the arrangement of a polarization part are suitable for wavelength conversion, or a light wavelength conversion element provided with an optical waveguide having a structure suitable for wavelength conversion in a light confinement effect or the like.

Still another object of the present invention is to provide a short wavelength generator and an optical pick-up using such a light wavelength conversion element, to provide a diffraction element in which a structure of such a light wavelength conversion element is used and to provide an optical waveguide having a structure suitable for wavelength conversion.

In accordance with one aspect of the present invention, a method for manufacturing a polarization inversion part comprises: forming a polarization inversion part by applying a voltage in the polarization direction of a ferroelectric crystal substrate; conducting a treatment for reducing an internal electric field generated in the substrate by having applied the voltage to the substrate; and reinverting polarization in at least a part of the polarization inversion part by applying a reverse direction voltage against the voltage previously applied.

In accordance with another aspect of the present invention, a method for manufacturing a polarization inversion part comprises: forming a polarization inversion part by applying a voltage in the polarization direction of a ferroelectric crystal substrate; and forming a polarization inversion stabilized part near the surface of the substrate in the polarization inversion part.

In accordance with still another aspect of the present invention, a method for manufacturing a polarization inversion part in a ferroelectric crystal substrate having a first surface and a second surface facing each other comprises: forming a first electrode having a stripe pattern part on the first surface; covering the first electrode with a first insulating film; forming a second insulating film on the second surface; forming a second electrode on the second insulating film so as to covering an area on the second surface determined by projecting the first electrode in the polarization direction through the second insulating film; and developing a polarization inversion part from the stripe pattern part of the first electrode to the second electrode by applying a voltage between the first electrode and the second electrode.

In accordance with yet another aspect of the present invention, a method for manufacturing a polarization inversion part comprises: forming a first electrode, a second electrode and a third electrode in this order in the polarization direction of a ferroelectric crystal substrate in which a polarization direction and a surface of the substrate are substantially parallel; forming a stripe polarization inversion part along the polarization direction between the first electrode and the second electrode by applying a voltage between the first electrode and the second electrode; and developing the stripe polarization inversion part from the second electrode to the third electrode by applying a voltage between the first electrode and the third electrode.

In accordance with another aspect of the present invention, a method for manufacturing a polarization inversion part comprises a process for developing a polarization inversion part in the polarization direction by applying an electric field on a ferroelectric crystal substrate, the electric field having a first electric field element parallel to the polarization direction of the ferroelectric crystal and a second electric field element perpendicular to the polarization direction.

In accordance with still another aspect of the present invention, a method for manufacturing a polarization inversion part comprises: forming a first electrode, a second electrode and a low resistance part on a substrate of a ferroelectric crystal, the low resistance part having a value of resistance lower than that of a ferroelectric crystal and being formed between the first electrode and the second electrode; and developing a polarization inversion part in the polarization direction of the ferroelectric crystal by applying a voltage between the first electrode and the second electrode.

In accordance with yet another aspect of the present invention, a method for manufacturing a polarization inversion part comprises: forming a concave part on a surface of a ferroelectric crystal substrate; forming a first electrode within the concave part; and developing a polarization inversion part in the polarization direction of the ferroelectric crystal from the first electrode by applying a voltage between the first electrode and a second electrode formed on the surface.

In accordance with another aspect of the present invention, a method for manufacturing a polarization inversion part comprises: forming an insulating film on a surface of a ferroelectric crystal substrate; forming a concave part on the surface, the concave part passing through the insulating film; forming a conducting layer in an area including at least the concave part of the surface; and developing a polarization inversion part in the polarization direction of the ferroelectric crystal from a first electrode that is the conducting layer within the concave part by applying a voltage between the first electrode and a second electrode formed on the surface.

In accordance with still another aspect of the present invention, a method for manufacturing a polarization inversion part comprises: forming a first electrode on a surface of a ferroelectric crystal substrate; forming an insulating film on the surface of the first electrode; forming a second electrode at a position on the surface of the insulating film where the first electrode has not been formed; and developing a polarization inversion part in the polarization direction of the ferroelectric crystal from the first electrode by applying a voltage between the first electrode and the second electrode.

In accordance with yet another aspect of the present invention, a method for manufacturing a polarization inversion part comprises: forming two or more pairs of electrodes, each of the pair of electrodes including a first electrode having a comb-shape and a second electrode arranged in the direction in which the comb-shape is extending, on the surface of a ferroelectric crystal substrate so that the comb-shape is arranged in the same direction; and developing a polarization inversion part from the comb-shape part of the first electrode to the second electrode side by applying a voltage between the first electrode and the second electrode.

In accordance with another aspect of the present invention, a light wavelength conversion element comprises: a ferroelectric crystal substrate; a polarization inversion part formed within the substrate so as to form layers substantially parallel to each other; and a polarization inversion stabilized part formed within the polarization inversion part near the surface of the substrate.

In accordance with still another aspect of the present invention, a light wavelength conversion element comprises: a ferroelectric crystal substrate in which the polarization direction is substantially parallel to the surface of the substrate; an optical waveguide formed along the surface in the substrate; and two or more polarization inversion parts having a depth of 2 $\mu$m or more formed in the substrate so as to traverse the optical waveguide periodically.

In accordance with yet another aspect of the present invention, a light wavelength conversion element comprises: a ferroelectric crystal substrate having an inclination angle of 1°–5° between a polarization direction and a surface of the substrate; and two or more polarization inversion parts extending from the surface in the polarization direction so as to form a layered structure in cross section that is perpendicular to the surface of the substrate along the polarization direction.

In accordance with another aspect of the present invention, a light wavelength conversion element comprises a concave part formed on a surface of a ferroelectric crystal substrate and a polarization inversion part having an end at the concave part and extending in the polarization direction of the ferroelectric crystal.

In accordance with still another aspect of the present invention, a light wavelength conversion element comprises: a ferroelectric crystal substrate; a first electrode formed on a surface of the substrate; an insulating film formed on the surface covering the first electrode; a second electrode formed at a position on the surface of the insulating film where the first electrode has not been formed; and a polarization inversion part having the first electrode as an end and extending to the second electrode side along the polarization direction of the ferroelectric crystal.

In accordance with yet another aspect of the present invention, a light wavelength conversion element comprises: a ferroelectric crystal substrate; two or more pairs of electrodes, each of the pair of electrodes including a first electrode having a comb-shape and a second electrode arranged in the direction in which the comb-shape is extending, formed on the surface of the substrate so that the comb-shape is arranged in the same direction; and a polarization inversion part having an end at the comb-shaped part of the first electrode and extending toward the second electrode side along the polarization direction of the ferroelectric crystal.

In accordance with another aspect of the present invention, a diffraction element comprises: a ferroelectric crystal substrate having an inclination angle of 1°–5° between a polarization direction and a surface of the substrate; and two or more polarization inversion parts extending from the surface in the polarization direction so as to form a layered structure in cross section, being perpendicular to the surface of the substrate, along the polarization direction.

In accordance with still another aspect of the present invention, a light wavelength conversion element comprises: a crystal having a nonlinear optical effect; an optical waveguide formed along a surface in the crystal; two or more polarization inversion parts formed so as to traverse the optical waveguide periodically; and an ion exchanged layer formed in a surface of the optical waveguide, wherein the ion exchanged layer has a refractive index larger than that of the optical waveguide and a thickness determined so that a fundamental wave propagating in the optical waveguide can not propagate in the ion exchanged layer but a higher harmonic of the fundamental wave can propagate in the ion exchanged layer.

In accordance with still another aspect of the present invention, a light wavelength conversion element comprises: a crystal having a nonlinear optical effect; an optical waveguide formed along a surface in the crystal; two or more polarization inversion parts formed so as to traverse the optical waveguide periodically; and an ion exchanged layer formed in a surface of the optical waveguide, wherein the ion exchanged layer has a refractive index larger than that of the optical waveguide, a width narrower than that of the optical waveguide and a depth shallower than half the depth of the optical waveguide.

In accordance with yet another aspect of the present invention, an optical waveguide comprises: a crystal substrate; a waveguide formed along a surface in the crystal substrate; and an ion exchanged layer formed in a surface of the waveguide, wherein the ion exchanged layer has a refractive index larger than that of the waveguide and a thickness determined so that a higher harmonic of a fundamental wave can propagate in the ion exchanged layer but the fundamental wave propagating in the waveguide can not propagate in the ion exchanged layer.

In accordance with another aspect of the present invention, an optical waveguide comprises: a crystal substrate; a waveguide formed along a surface in the crystal substrate; and an ion exchanged layer formed in a surface of the waveguide, wherein the ion exchanged layer has a refractive index larger than that of the waveguide, a width narrower than that of the waveguide and a depth shallower than half the depth of the waveguide.

In accordance with still another aspect of the present invention, a light wavelength conversion element comprising: a substrate of a crystal with a nonlinear optical effect having an inclination angle of 1°–5° between a polarization direction and a surface of the substrate; an optical waveguide formed along a surface in the substrate; two or more polarization inversion parts formed so as to traverse the optical waveguide periodically; and an ion exchanged layer formed in a surface of the optical waveguide, wherein the ion exchanged layer has a refractive index larger than that of the optical waveguide and a thickness thinner than the thickness between the upper end of the polarization inversion part and the substrate surface at the center of the width of the optical waveguide.

BRIEF DESCRIPTION OF THE DRAWINGS

FIG. 64 is a perspective view to illustrate an example of an optical wavelength conversion element of this invention.

DETAILED DESCRIPTION OF THE INVENTION

This invention provides a method for forming desired polarization inversion parts on a surface on which a polarization inversion core (domain core) is not generated. More specifically, so-called electric field application can be used for this aim. In this method, polarization inversion parts are formed under electrodes by forming electrodes on a felroelectric substrate of a single polarization (e.g. an $LiTaO_3$ substrate) and by applying high electric voltage between the electrodes. For example, the polarization inversion parts are formed to be a periodically laminated structure so that they can be used for an optical wavelength conversion element and so on.

First, a process of forming a polarization conversion part in a conventional method is explained.

Conventionally, a comb-shaped electrode is formed on a +C surface on which a polarization inversion core is generated, while a plane electrode is formed on a −C surface. After that, a pulse voltage (e.g. approximately 21 kV/mm as an electric field) is applied to the space between the electrodes, so that polarization inversion is generated under the comb-shaped electrode and a periodic polarization inversion structure is formed.

By using a similar technique, a comb-shaped electrode is formed on the −C surface and a plane electrode is formed on the +C surface before applying voltage to the space between the electrodes. As a result, the formed polarization inversion parts correspond to the shape of the electrode formed on the +C surface, that is, a plane polarization inversion part is formed while a periodic polarization inversion part is not formed.

The reason is that the polarization inversion part grows in the −C surface direction from the inversion core. In $LiTaO_3$ and $LiNbO_3$, the polarization inversion core is generated on the +C surface. Therefore, a desired polarization inversion part is not formed unless electrodes (e.g. an electrode having a stripe patterned part) to control an inversion core are formed on the +C surface. The shape of the polarization inversion part, however, tends to become irregular as it grows from the polarization inversion core. As a result, a polarization inversion part having a precisely-controlled shape is difficult to form on the −C surface.

The following is an explanation of the method for solving the above-identified problems and forming a desired polarization inversion part on a −C surface.

Embodiment 1

Figure 1:
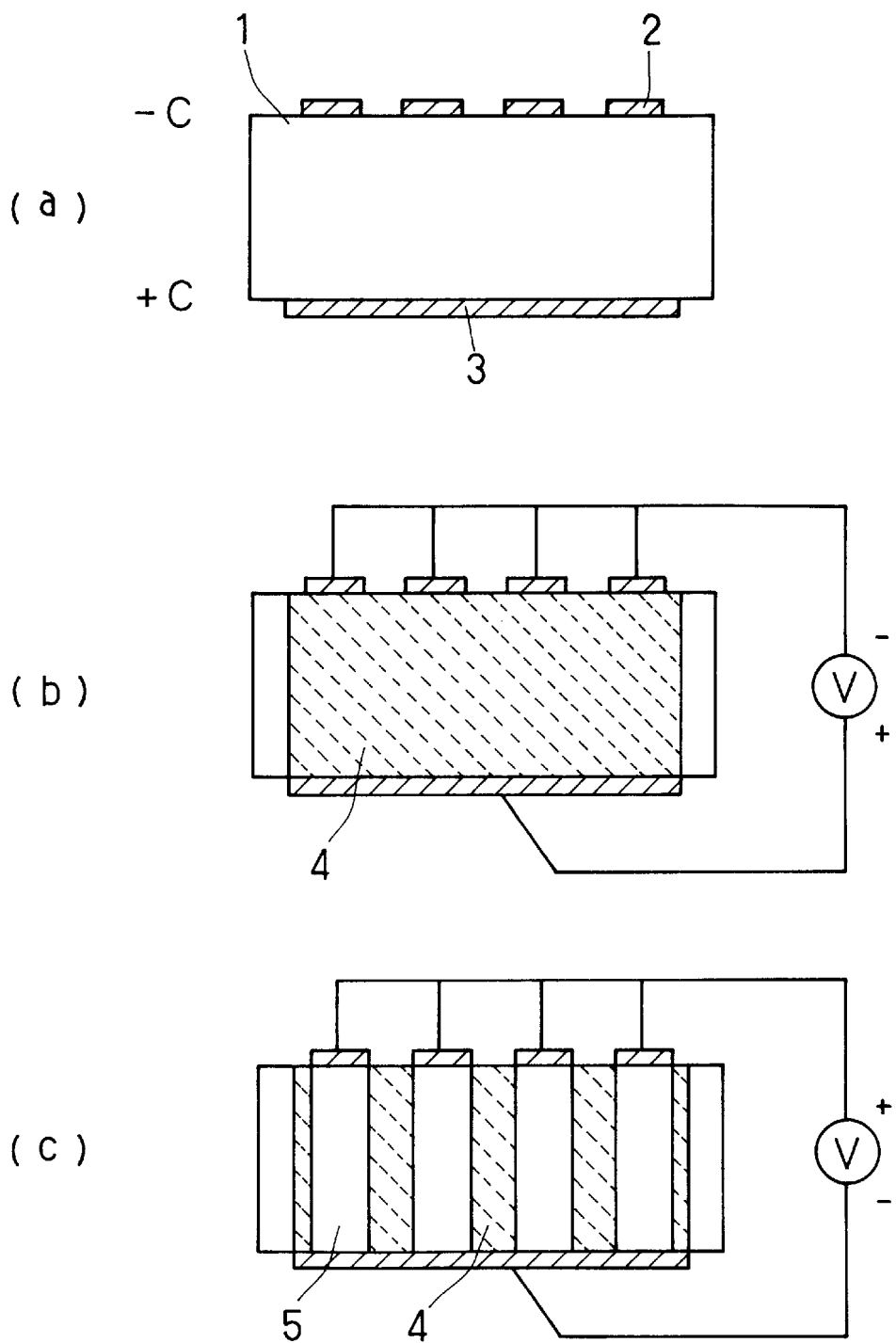
FIGS. 1(a)–1(c) are cross-sectional views to illustrate a method for producing polarization inversion parts of this invention.

A method for producing polarization inversion parts of this invention is exemplified referliing to FIG. 1.

In FIG. 1(a), a comb-shaped electrode 2 is formed on a −C surface of an LiTaO$_3$ substrate 1, and a plane electrode 3 is formed on a +C surface on the same substrate. In FIG. 1(b), (+) voltage is applied from the plane electrode 3 to the +C surface in order to form polarization inversion parts 4. (In this state, the polarization direction in the crystal is reversed: the surface with the comb-shaped electrode is the +C surface while the surface with the plane electrode is the −C surface.) In FIG. 1(c), the polarization is inverted again by applying (+) voltage from the comb-shaped electrode 2, thereby forming the polarization reinversion part 5. The polarization reinversion part 5 has a periodic stripe pattern that corresponds to the comb-shaped electrode 2.

When forming polarization inversion parts, problems were observed in the (c) step, that is, the inversion voltage was not stabilized or no polarization inversion was generated. As a result of experiments, it was found that an internal electric field was formed inside the crystal due to the applied electric field in the (b) step and thus the reinversion of the polarization was disturbed when an electric field was applied in the (c) step. A method to decrease or remove the internal electric field is considered. As a result, the internal electric field can be lowered by annealing between the steps (b) and (c), and the polarization reinversion will be facilitated. The following characteristics are found about the dependency of the annealing temperature.

1) When the annealing temperature is lower than 50° C., the reinversion of polarization is impossible.
2) When the annealing temperature is 100° C., the polarization can be reinverted, but the inversion is unstable and not homogeneous.
3) When the annealing temperature exceeds 150° C., reinversion is possible and homogeneous polarization inversion parts can be formed.
4) When the annealing temperature exceeds 500° C., the polarization formed in the (b) step vanishes and reinversion is impossible.

Here, the annealing temperature means the substrate temperature at annealing.

The above results show that desired polarization inversion parts can be formed on the −C surface by annealing at temperatures ranging from 150 to 500° C. preferably. The upper limit of the preferable annealing temperature is believed to be related to the Curie temperature of the used crystal. The required annealing time was only several minutes. In an observation of the formed polarization inversion structure, polarization inversion parts identical to the patterns of the electrode 2 were formed by forming the polarization inversion reinversion part 5 from the comb-shaped electrode 2 on the −C surface. It was found that a homogeneous polarization inversion layer also was formed on the −C surface.

The following is a method for homogeneously forming a periodical polarization inversion structure from the front surface to the backside of the ferroelectric crystal by using the above-mentioned method. In this method, polarization inversion by applying an electric field is repeated while removing the internal electric field. This method is explained below referring to FIGS. 2(a)–(d).

Figure 2:
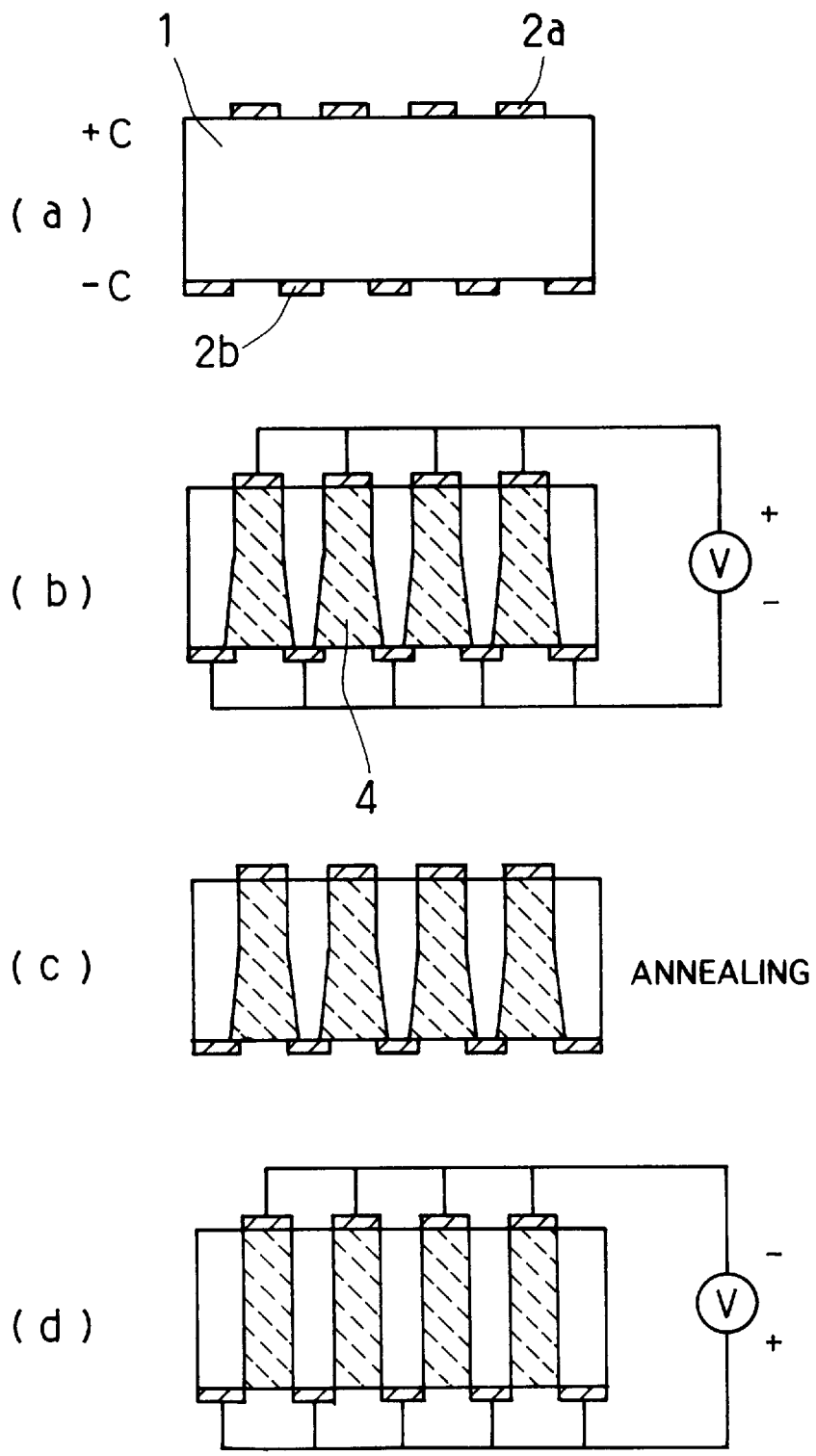
FIGS. 2(a)–2(d) are cross-sectional views to illustrate a method for producing polarization inversion parts of this invention.

In FIG. 2(a), a comb-shaped electrode 2a is formed on the +C surface of an LiTaO$_3$ substrate 1 that has a flat surface substantially perpendicular to the C axis, while another comb-shaped electrode 2b in an inverted pattern with respect to the +C surface electrode is formed on the −C surface, resulting in that the latter electrode is formed on the −C surface where no electrode is formed when the comb-shaped electrode 29 of the +C surface is projected onto the −C surface. In FIG. 2(b), polarization inversion parts are formed under the +C surface electrode by applying voltage between the electrodes (2a, 2b). At this time, the formed polarization inversion is generated from the +C surface, and thus, the polarization inversion shape is getting more heterogeneous in the vicinity of the −C surface. In FIG. 2(c), the substrate is annealed to remove the internal electric field. In FIG. 2(d), voltage is applied to invert the polarization again. The voltage applied in the (d) step is reverse to that applied in the (b) step.

In the (d) step, the reinverted polarization is the polarization inversion parts not corresponding to the +C surface electrode, that is, the heterogeneous polarization inversion parts. In this (d) step, the heterogeneous parts of the polarization inversion parts are removed and periodic polarization inversion parts corresponding to the electrode patterns can be formed homogeneously from the front surface to the back of the substrate.

The homogeneity will be further increased by repeating the above steps, with another step for removing the internal electric field.

Although an LiTaO$_3$(C) plate is used in this Embodiment 1, similar effects can be obtained by using LiNbO$_3$ and the mixture (LiNb$_x$Ta$_{(1-x)}$O$_3$). Since LiNbO$_3$ and the mixture have great nonlinear optical constants, the optical wavelength can be converted with a higher efficiency.

Furthermore, similar effects can be obtained by using MgO-doped LiTaO$_3$, MgO-doped LiNbO$_3$, and the mixture (MgO: LiNb$_x$Ta$_{(1-x)}$O$_3$. The doped MgO has improved resistance against optical damage. Thereby stable properties can be obtained for SHG with high output power.

While a nonlinear optical crystal substrate (C plate) was used in this Embodiment, similar properties can be obtained by using some other nonlinear optical crystal substrates such as X plate and Y plate that have surfaces parallel to the C axis. In such substrates, electrodes for polarization inversion parts are formed apart in the C axis direction on the substrates, and the polarization is inverted thereon. For this purpose, a pair of comb-shaped electrodes that are engaged with each other are preferred. When a substrate having a surface parallel to the C axis is used, the SHG can be excited by the TE mode fundamental wave. As a result, the coupling efficiency between the optical wave guide and the semiconductor laser is improved, resulting in a small, short wavelength light source with high output power.

The method for eliminating the internal electric field is not limited to annealing but can be conducted by applying an electric field in the opposite direction to the internal electric field. In this case, the applied voltage preferably ranges from 10 kV/mm to 20 kV/mm, since the internal electric field can be eliminated in a short time without generating a polarization inversion.

(Stability of the polarization inversion parts)

As mentioned above, a deep polarization inversion structure can be formed in a short period in the electric field application. However, a heat resistance test clarified that some problems such as deterioration or disappearance of the polarization inversion parts occurred, suggesting the problem in stability of the polarization inversion structure itself. It was also found that the polarization inversion layer vanished in the waveguide forming process for forming an optical wavelength conversion element. The following facts were found about the properties.

1) In the electric field applied polarization inversion layer formed from the +C surface, heat resistance: vanished at an annealing temperature of 500° C. or above; and waveguide formation: the polarization inversion parts in the waveguide were lost during the proton exchanging and annealing, 2) In the polarization inversion layer comprising the reinversion provided from the −C surface (in the steps in Embodiment 1) heat resistance: vanished in the vicinity of the −C surface at an annealing temperature at 350° C.; and waveguide formation: the polarization inversion parts in the waveguide were lost during the proton exchanging and annealing The stability of the polarization inversion parts formed by electric field application should be improved, and an experiment result concerning this purpose is explained below.

Embodiment 2

Here, improvement of heat resistance will be discussed. In a polarization inversion layer comprising the polarization reinversion part formed by the method in Embodiment 1, the polarization inversion vanished from the −C surface and the inversion part retreated by 5–6 $\mu$m. It was found for the first time that the disappearance occurs first on the −C surface and spreads to the +C surface. As a result of various experiments for preventing the inversion part disappearance, the polarization inversion parts can be prevented from disappearance by conducting proton exchanging on the surface. When a polarization inversion stabilizing part is formed by conducting proton exchange, the polarization inversion shape was not changed and the heat resistance was remarkably improved after annealing at 500° C.

The proton exchanging depth preferred for stabilizing the polarization inversion parts ranges from 0.01 to 0.2 $\mu$m, more specifically, 0.1 $\mu$m. Loss of the polarization inversion parts on the −C surface can be prevented by controlling the generation of the polarization inversion core on this surface. Proton exchange modifies the crystal structure. In other words, proton exchanging decreases asymmetry of the crystal and deteriorates the ferroelectric property. Therefore, the polarization will be merely inverted and the generation of the polarization inversion core will be controlled. As a result, stability of the polarization inversion structure, more specifically, stability of the polarization inversion structure formed on a −C surface, was remarkably improved.

Though an LiTaO$_3$ substrate was used in Embodiment 2, similar substrates can be manufactured from other materials such as LiTaO$_3$ (doped with MgO, Nb, Nd and so on), LiNbO and the mixture (LiTa$_{(1-x)}$Nb$_x$O$_3$ (0≦x ≦1)), and KPT (KTiOPO$_4$). Highly efficient optical wavelength conversion elements can be produced from LiTaO$_3$, LiNbO$_3$ and KPT since all of them have a high nonlinear property.

Such improvement in stability of the polarization inversion structure will be effective for the other crystals, too. For example, polarization in some materials such as KNbO$_3$ and TlPbO$_3$ is unstable so that polarization inversion will be generated easily in such materials due to outside pressure or temperature change. In such a case, stability in the polarization inversion can be improved remarkably by treating the crystal surface with ion exchange to modify the crystal structure of the surface.

Forming a polarization inversion layer is effective not only for the C plate (substrate) of this invention, but also for a substrate such as the X plate and Y plate. In either the X plate or Y plate, the formed polarization inversion parts can be stabilized by forming a polarization inversion stabilizing layer in an area including the +C side where polarization inversion will be generated.

Furthermore, polarization inversion can be stabilized in a substrate where the crystal polarization is inclined with respect to the substrate surface, by forming a polarization inversion stabilizing layer. In such an oblique substrate, polarization inversion parts are formed from the surface toward the inside of the substrate, similarly to the case of the C plate. Therefore, stable polarization inversion parts can be formed by forming a stabilizing layer at the polarization inversion parts in the vicinity of the substrate surface.

Embodiment 3

Figure 3:
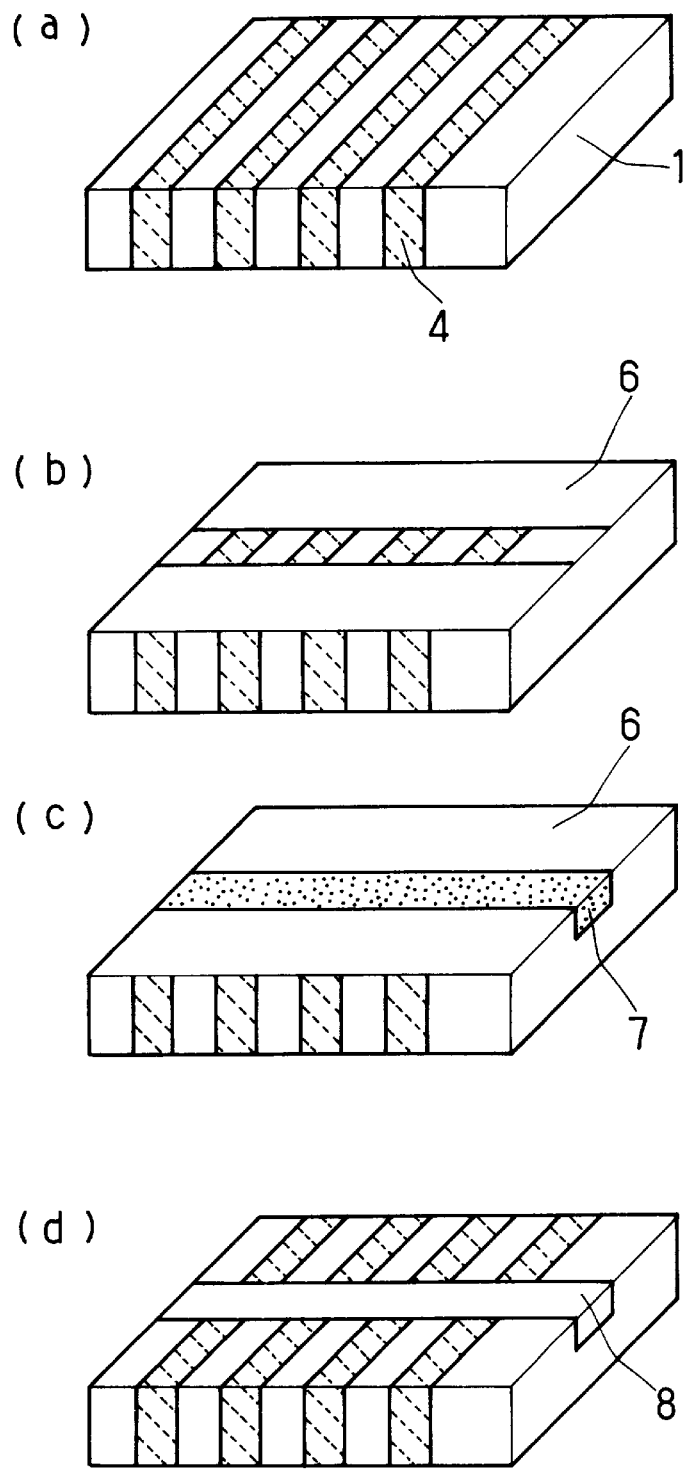
FIGS. 3(a)–3(d) are perspective views to illustrate a method for producing an optical wavelength conversion element of this invention.
Figure 4:
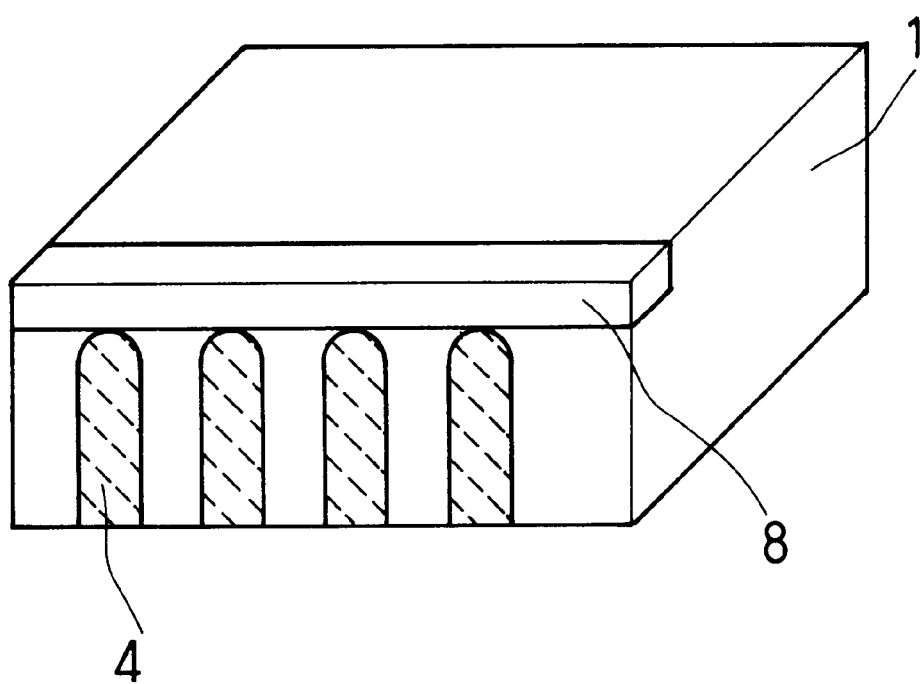
FIG. 4 is a perspective view to illustrate the optical wavelength conversion element produced in the method of FIGS. 3(a)–3(d).

The following description is a technique to prevent the polarization inversion parts in an optical waveguide from vanishing during a waveguide formation. First described is a method for producing an optical wavelength conversion element by using LiTaO$_3$. FIGS. 3($a$) to 3($d$) show the process for producing an optical wavelength conversion element. In FIG. 3($a$), a crystal is provided with a polarization inversion structure of periodic stripes. In FIG. 3($b$), a mask pattern 6 for forming an optical waveguide is formed by Ta and so on. In FIG. 3($c$), a proton exchanging part 7 (the thickness is about 0.5–2 $\mu$m) is used at the non-mask part by annealing the crystal in an acid solution such as pyrophosphoric acid. In FIG. 3($d$), an optical waveguide 8 is formed by annealing at a temperature (e.g. about 400° C.) after removing the mask. The optical wavelength conversion element was cut off at the optical waveguide cross-section in order to observe the polarization inversion parts to find that the polarization inversion parts 4 vanished inside the optical waveguide 8 as shown in FIG. 4. This phenomenon will be found in the inversion layers formed on both surfaces (+C surfaces); found in the polarization inversion layers having heat resistance improved by ion-exchanging; and found in the layers even if the temperature for annealing the optical waveguide is lowered to about 300° C. The problem of the disappearance of the polarization inversion parts cannot be solved even by using the technique described in Embodiment 2. The reason is considered that the polarization inversion structure vanishes when the proton is thermally diffused to the inside of the crystal.

In order to prevent this problem, polarization inversion parts that endure the proton's thermal diffusion should be formed. Various experiments were conducted to stabilize the polarization inversion. In a process for inverting the polarization, proton exchange annealing was conducted selectively on the −C surface of the LiTaO$_3$ substrate. This substrate was annealed at a temperature approximate at the Curie temperature for the substrate (about 530° C.) in order to form a periodic polarization inversion structure. This process is known as proton exchange annealing. In this treatment, however, forming deep polarization inversion parts is difficult and thus, the polarization inversion depth is only about 2 $\mu$m. The inventors tried hard to improve the properties of the polarization inversion structure by treating the polarization inversion structure formed by electric field application with proton exchange annealing. As a result, the following two phenomena were newly discovered.

1) When polarization inversion parts formed by electric field application are treated with proton annealing, polarization inversion parts due to the proton exchange annealing are formed by using the first part as the core. As a result, a deep polarization inversion structure, which cannot be provided by the proton exchange annealing, can be formed.

2) A polarization inversion structure that does not vanish during an optical waveguide forming process can be formed by forming a polarization inversion structure in the vicinity of the surface of the electric field applied polarization inversion structure, formed by proton exchange annealing in the vicinity of its surface of electric field application polarization inversion.

Figure 5:
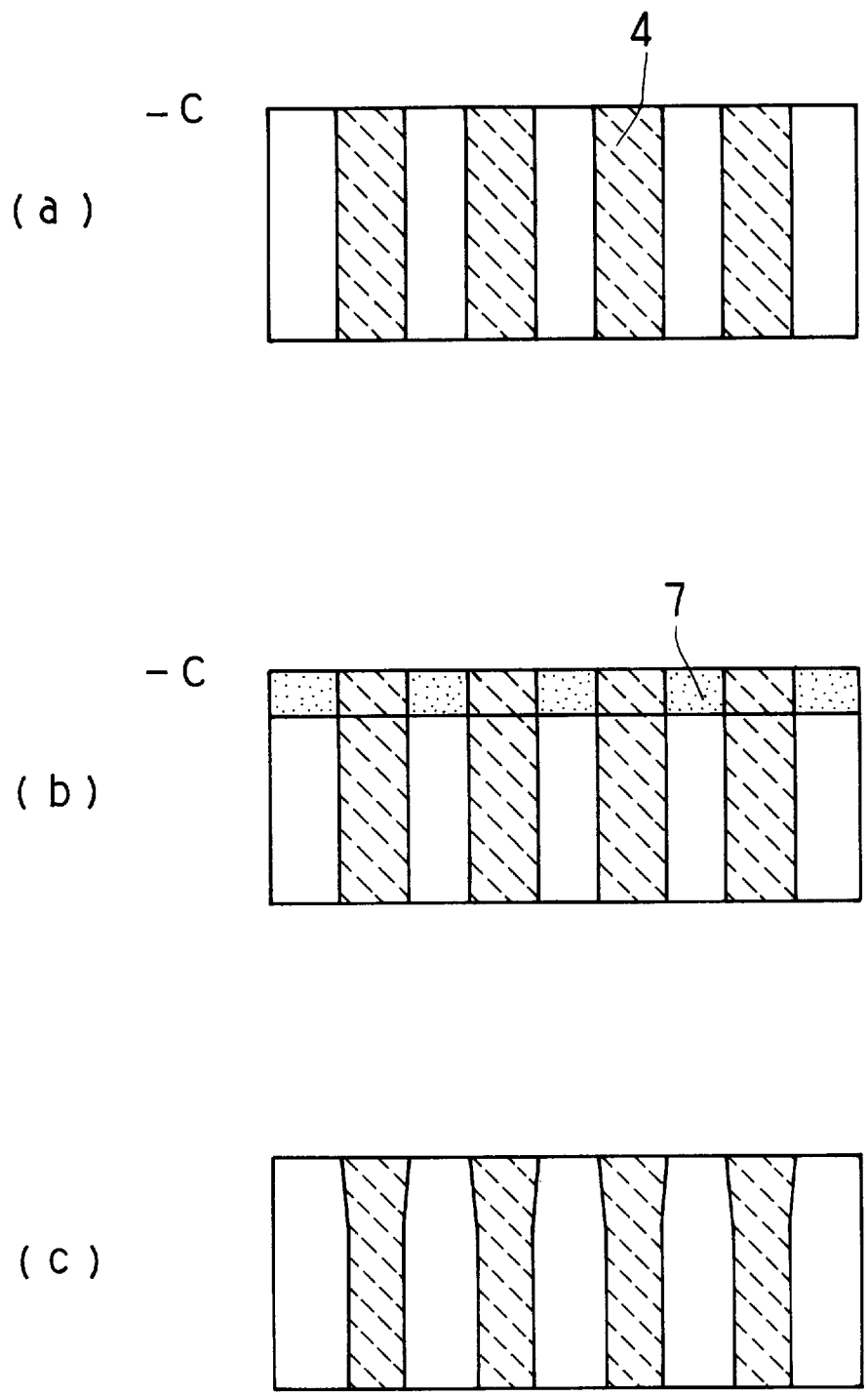
FIGS. 5(a)–5(c) are cross-sectional views to illustrate a method for stabilize polarization inversion parts of this invention.

The following is the way to form a resistant and stable polarization inversion structure by conducting the annealing (FIGS. 5(a)–5(c)). In FIG. 5(a), periodic polarization inversion parts 4 are formed on the −C surface by the reinversion of the polarization inversion parts described in Embodiment 1. In FIG. 5(b), a proton exchange part 7 is formed on the surface by treating the substrate surface with an acid such as pyrophosphoric acid. In FIG. 5(c), the proton exchange heat treatment is conducted near the surface of the polarization inversion parts formed by electric field application. The shape of the polarization inversion parts is substantially similar to that formed by the electric field application, which shows that a deep polarization inversion structure can be formed homogeneously in a short time. The proton exchanging can be conducted not only by using pyrophosphoric acid but any other acids such as hydrochloric acid.

Figure 6:
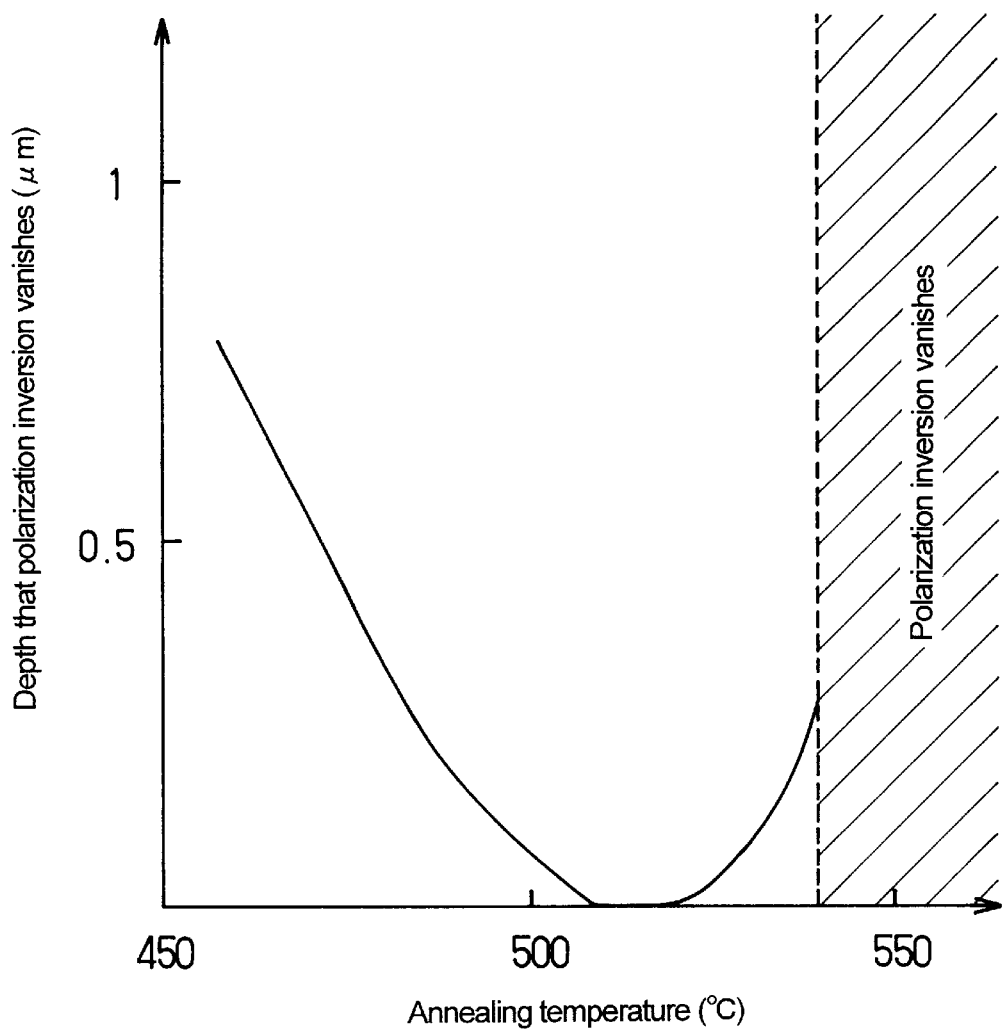
FIG. 6 is a graph to illustrate the relationship between the annealing after proton exchanging and the depth at which a polarization inversion vanishes.

Next, a waveguide is formed on the polarization inversion parts produced in the above manner, and an observation was conducted on the disappearance of the polarization inversion parts in the waveguide. The observation showed that the annealing in the 5(c) step had a great influence on the disappearance of the polarization inversion parts. FIG. 6 is a graph showing the relationship between the annealing temperature and the distance that the polarization inversion parts vanished from the −C surface. When the annealing temperature was 400° C. or lower, the polarization inversion parts vanished to the depth of at least 1 µm from the surface since polarization inversion parts are not formed by the proton exchange annealing. The depth of the vanishing polarization inversion layer was decreased as the temperature was close to 500° C., and the retreating depth was 0.35 µm or less when the temperature was 480° C. or higher. When the temperature ranged from 500° C. to 520° C., the polarization inversion parts did not vanish. The disappearance depth of the inversion part should not exceed 0.5 µm so as not to effect the efficiency for converting the optical wavelength conversion element, while the optical wavelength conversion element can be produced at a high efficiency by annealing at a temperature from 480° C. to 530° C. When the temperature was 540° C. or higher, the periodic polarization inversion parts vanished, and slab polarization inversion parts were formed, and thus, an optical wavelength conversion element was not produced.

The above results show that the polarization inversion structure formed by the electric field application is not stable as a crystal structure, since the crystal polarization direction will not change due to annealing at a low temperature or due to ion-exchanging. On the other hand, a polarization inversion stabilizing part can be formed by annealing the electric field applied polarization inversion parts at a temperature lower than the Curie temperature after conducting ion exchange on the surface, since the ions will be dispersed into the substrate by annealing the layer (this layer is ion-exchanged and the crystal structure is changed) near the Curie temperature. Thus, the polarization is fixed at a stable state when the ion-exchanged part recovers its original crystal structure. Namely, the unstable crystal structure formed by applying the electric field becomes a stable crystal structure through the ion exchanging and the annealing. The preferable annealing temperature is in the vicinity of the substrate's Curie temperature but not exceeding the Curie temperature. For instance, the preferable annealing temperature for LiTaO$_3$. (Curie temperature: about 600° C.) ranges from 480 to 530° C., more preferably, about 500° C. The reason is that the potential for changing/inverting the polarization is lowered and the inversion can be conducted easily in the vicinity of the Curie temperature. In addition, the polarization becomes uneven and the crystal is not a single polarization once it is over the Curie temperature. In general the preferable annealing temperature is from "Curie temperature minus 150° C." to Curie temperature.

Figure 7:
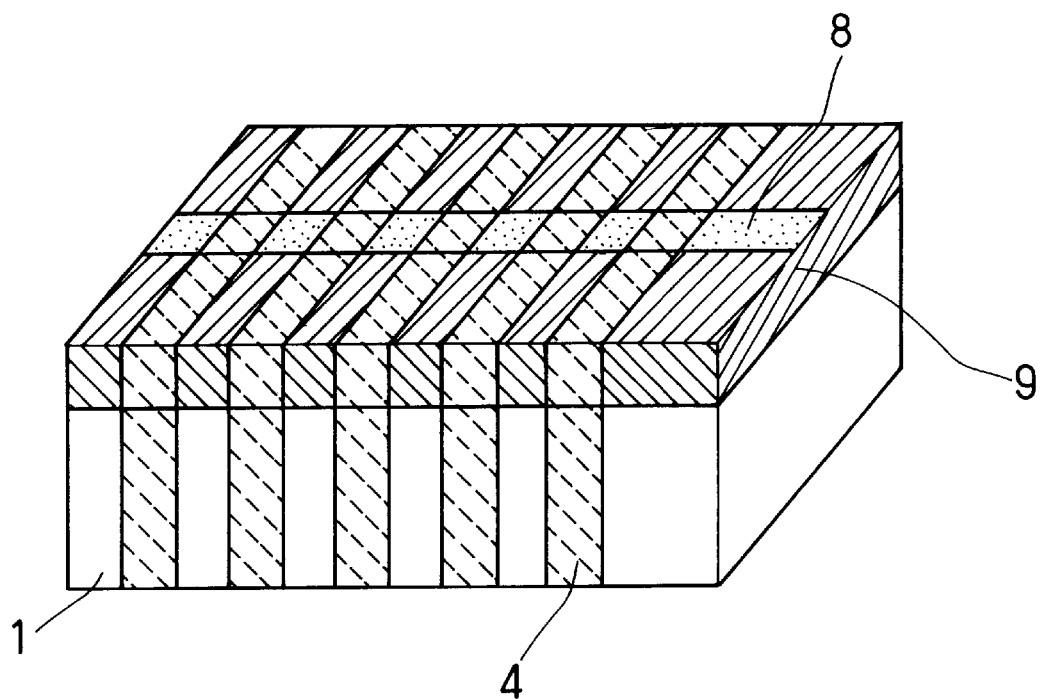
FIG. 7 is a perspective view to illustrate an optical wavelength conversion element of this invention.

Next, an optical waveguide was formed on an annealed (510° C.) polarization inversion structure on which an optical wavelength conversion element was produced in order to evaluate the properties. FIG. 7 shows the structure of the produced SHG element. An optical wavelength 8 is formed to cross polarization inversion parts 4 that are periodically-formed on an LiTaO$_3$ substrate 1. Another polarization inversion stabilizing layer 9 has its proton exchange layer annealed. In the layer 9, polarization inversion is merely generated compared to the LiTaO$_3$ substrate 1. The electric resistance is also lowered due to the ion exchanging and the annealing. The polarization inversion period in this Embodiment is 3.5 µm, while the optical waveguide is 51 µm wide, 2 µm deep. To this waveguide 8, a light beam having a wavelength of 850 nm (a fundamental wave) from a semiconductor laser is input (70 mW) to obtain a second harmonic generation(SHG) having the output power of 10 mV. In a conventional polarization inversion method, the conversion efficiency will be decreased greatly because the polarization inversion parts inside the optical waveguide vanish, and only about 1 mV output power is obtained in a similar experiment. That is, the conversion efficiency is remarkably improved in this invention. Moreover, the above optical wavelength conversion element of this invention has a remarkably-improved resistance to optical damage. In a conventional method, the polarization inversion parts vanish in the vicinity of the surface, and the optical damage occurs at this part. So the SHG's output power changes and the obtainable stable output power is just several mV. In the above method, however, optical damages can be prevented since a deep polarization inversion structure that does not vanish in the vicinity of the surface can be formed. As a result, stable output power is obtained to SHG output power of 20 mV, and the unstability due to the optical damage can be prevented completely.

The above-identified polarization inversion structure has an ideal, namely, deep and short-periodic structure. Moreover, it realizes excellent resistance without changes in its properties during the chemical treatments for forming an optical waveguide. As a result, a periodic polarization inversion structure can be formed inside the optical waveguide from the surface to the deep part of the substrate, which is difficult in the conventional technique. As a result, an SHG element with high efficiency and high stability (excellent in resistance to optical damage) can be formed.

Though in the above Embodiment an optical waveguide SHG element is shown, such a polarization inversion structure having an polarization inversion stabilizing part is effective also for a bulk SHG. In a bulk element, the stability of the polarization inversion layer leads to a stabilized element. Therefore, the polarization inversion structure of this invention can provide an element having excellent thermal resistance and reliability.

Proton exchange can be carried out by using pyrophosphoric acid. The depth of a proton exchange layer depends on the pyrophosphoric acid temperature and the time. For instance, formation of a proton exchange layer of 0.2 μm depth requires annealing at 260° C. for approximately 160 seconds. Formation of a proton exchange layer of 0.1 μm depth requires annealing at 260° C. for approximately 40 seconds. When forming a thin proton exchange layer, the accuracy for the thickness can be improved by lowering the temperature of the pyrophosphoric acid. For example, when forming a proton exchange layer of 0.01 μm depth at 260° C., the treatment time cannot exceed one second; the annealing time can be extended to about 3 seconds when the annealing temperature is 200° C. Although proton exchange can be conducted at a still lower temperature, the preferable temperature range is from 160° C. to 280° C.

Similar polarization inversion stabilizing layers can be formed by using the proton exchange even if the pyrophosphoric acid is replaced by any one of other acids including benzoic acid, orthopyrophosphoric acid, suilfric acid, and hydrochloric acid.

In the above Embodiment, a proton exchange (using an acid) is used for the ion exchange for forming the polarization inversion stabilizing part. Some other materials such as Nd, K, Ag, Rb, Cu, Zn Cd and Ti can be used if ion exchanging can be conducted. If annealing is conducted by mixing ions in an acid, proton exchange and ion exchange can be conducted simultaneously, and ion injection in the substrate also can be conducted. In this case, the crystal structure changes by annealing the substrate at approximately (but not exceeding) the Curie temperature. As a result, polarization inversion parts are further stabilized and a polarization inversion stabilizing part is formed.

Though an $LiTaO_3$ substrate was used in Embodiment 3, similar substrates can be manufactured from other materials such as $LiTaO_3$ (doped with MgO, Nb, Nd and so on), $LiNbO_3$ and the mixture ($LiTa_{(1-x)}Nb_xO_3$ ($0 \leq x \leq 1$)), and KTP ($KTiOPO_4$). Highly efficient optical wavelength conversion elements can be produced from $LiTaO_3$, $LiNbO_3$ and KTP since all of them have a high nonlinear property.

Such improvement in stability of the polarization inversion structure will be effective for the other crystals, too. For example, polarization in some materials such as $KNbO_3$ and $TiPbO_3$ is unstable so that polarization inversion will occur easily in such materials due to outside pressure or temperature change. In such a case, stability in the polarization inversion can be improved remarkably by treating the crystal surface with ion exchange to modify the crystal structure of the surface.

Forming a polarization inversion layer is effective not only for the C plate (substrate) of this invention, but also for a substrate such as the X plate and Y plate. In either the X plate or Y plate, the formed polarization inversion parts can be stabilized by forming a polarization inversion stabilizing layer in an area including the +C side where polarization inversion will be generated.

Furthermore, polarization inversion can be stabilized in a substrate where the crystal polarization is inclined with respect to the substrate surface, by forming a polarization inversion stabilizing layer. In such an oblique substrate, polarization inversion parts are formed from the surface toward the inside of the substrate, similarly to the case of the C plate. Therefore, stable polarization inversion parts can be formed by forming a stabilizing layer at the polarization inversion parts in the vicinity of the substrate surface.

Embodiment 4

The following is another method for forming polarization inversion parts by applying an electric field.

Polarization inversion parts are formed on an XY substrate having a flat surface parallel to a C axis (an X plate, a Y plate or the mixture), which enables the production of a waveguide SHG element that can be coupled with a semiconductor laser at a high efficiency. The reason is that the polarization direction of the waveguide mode of the light beam propagating in the waveguide corresponds to that of the semiconductor laser. In a conventional method for forming polarization inversion parts on XY plates, a comb-shaped electrode and a plane electrode are formed apart from each other in the C axis direction on the XY plates, and the polarization is inverted by applying voltage between the electrodes. The conventional method has the following problems.

1) The electrode interval is limited to hundreds μm, and so is the area for forming SHG elements, resulting in difficulty of mass production.

2) The formed polarization inversion parts are shallow to sufficiently overlap with the waveguide, and thus, the efficient SHG element cannot be obtained.

Figure 8:
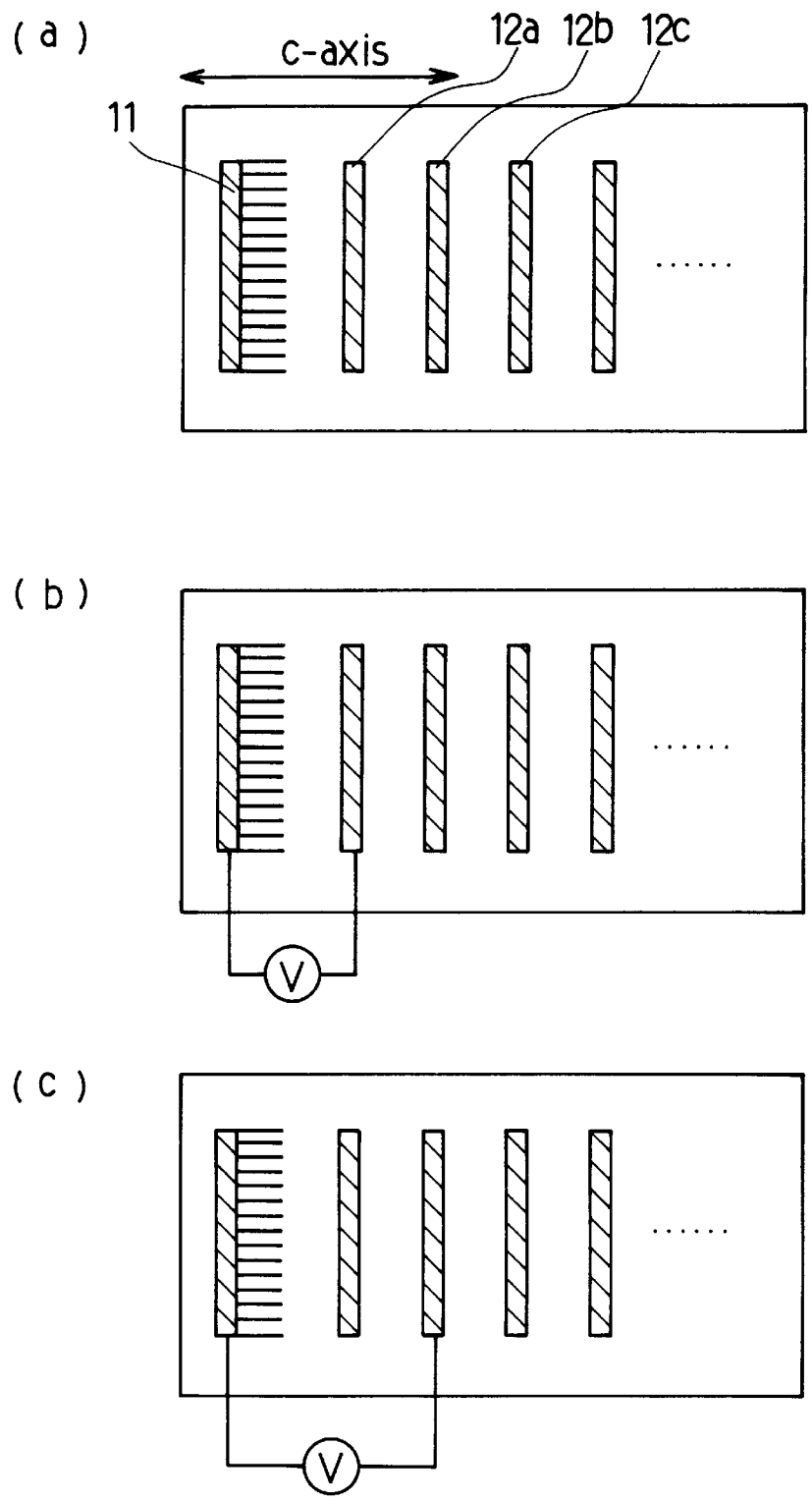
FIGS. 8(a)–8(c) are plan views to illustrate a method for producing polarization inversion parts of this invention.

In order to solve these problems, a method to invert polarization is shown in Embodiment 4. In FIG. 8(a), a comb-shaped electrode 11 and plan e electrodes (12a, 12b . . . ) are formed in the C axis direction on a Y plate ($LiTaO_3$). In FIG. 8(b), a pulse voltage is applied to the space between the comb-shaped electrode 11 and the plane electrode 12a. The voltage is, for example, 20–30 kV/mm and the time is, for example, about 20 ms. For the applied voltage shape, rectangular voltage can ivert the polarization. The above-mentioned pulse high voltage is applied at an initial stage, and then continuous wave (CW) voltage of about e.g. 5 kV/mm is applied continuously to form homogeneous polarization inversion parts. In FIG. 8(c), voltage is applied to the space between the comb-shaped electrode 11 and the electrode 12b in order to form periodic polarization inversion parts between the two electrodes. As a result, a periodic polarization inversion structure can be formed for 200 μm. Moreover, periodic polarization inversion parts can be provided to a large area by applying voltage between the comb-shaped electrode 11 and the other plane electrodes such as 12c. In this method, the distance between two adjacent electrode is, for example, 50 μm-1mm, more preferably, 200–400 μm, though there is no specific Inntation.

Furthermore, the depth of the polarization inversion is also improved by the above producing method. The inversion depth of the first polarization inversion part between the comb-shaped electrode 11 and the electrode 12a is only about 1 μm, but deeper polarization inversion parts (at least 1.5 μm) can be formed by applying voltage to the electrodes (12b, 12c . . . ) in turn.

In addition to that, an electrode structure for improving the homogeneity of the polarization inversion structure is developed. That is the electrode structure in which the electrodes and the residual spaces are covered with an insulating film (see FIGS. 8(a)–8(c)). In case that an electric field is applied after depositing a resist and $SiO_2$ to a thickness of about 1 μm, the voltage is distributed between the electrodes with improved homogeneity, and homogeneous polarization inversion parts are provided.

Though plural plane electrodes are used in Embodiment 4, some other methods can be used too. For instance, similar polarization inversion parts can be formed by etching and diminishing the plane electrodes and inverting the polarization while spreading the spaces between the comb-shaped electrode and the plane electrodes.

Though an LiTaO$_3$ substrate was used in Embodiment 4, similar substrates can be produced from other materials such as LiTaO$_3$ (doped with MgO, Nb, Nd and so on), LiNbO$_3$ and the mixture (LiTa$_{(1-x)}$Nb$_x$O$_3$ (0≦x≦1)), and KTP (KTiOPO$_4$. Highly efficient optical wavelength conversion elements can be produced from LiTaO$_3$, LiNbO$_3$ and KTP since all of them have a high nonlinear property.

Figure 17:
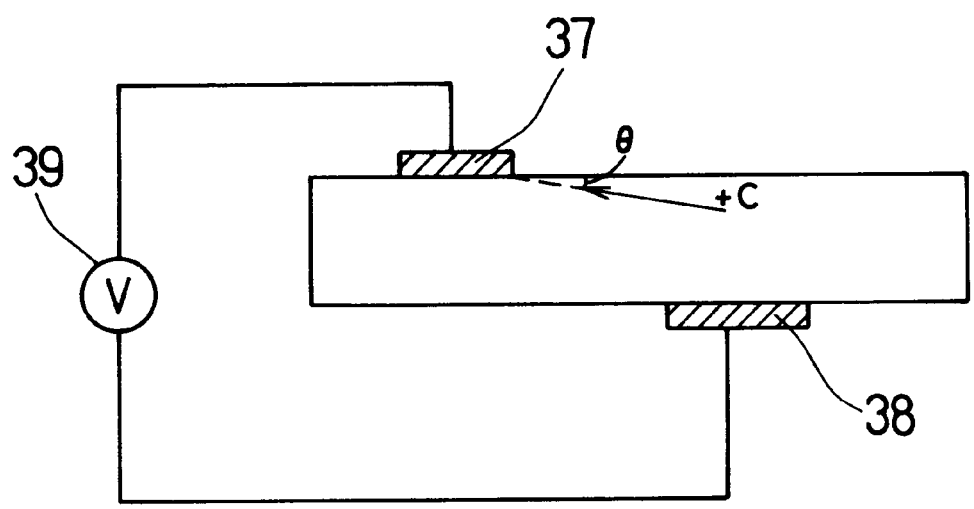
FIG. 17 is a cross-sectional view of a substrate, illustrating a method for producing polarization inversion parts of this invention.

Further, as shown in FIG. 17, the above-mentioned electric field application method is effective when the polarization direction is shifted a predetermined angle: θ to the substrate surface. In this case, it is preferable that the predetermined angle: θ is in a range between 1° and 5°. When the angle θ is 1° or more, the depth of the polarization inversion can be increased, and when the angle θ is 5° or less, the homogeneity of the polarization inversion can be obtained.

Embodiment 5

Figure 9:
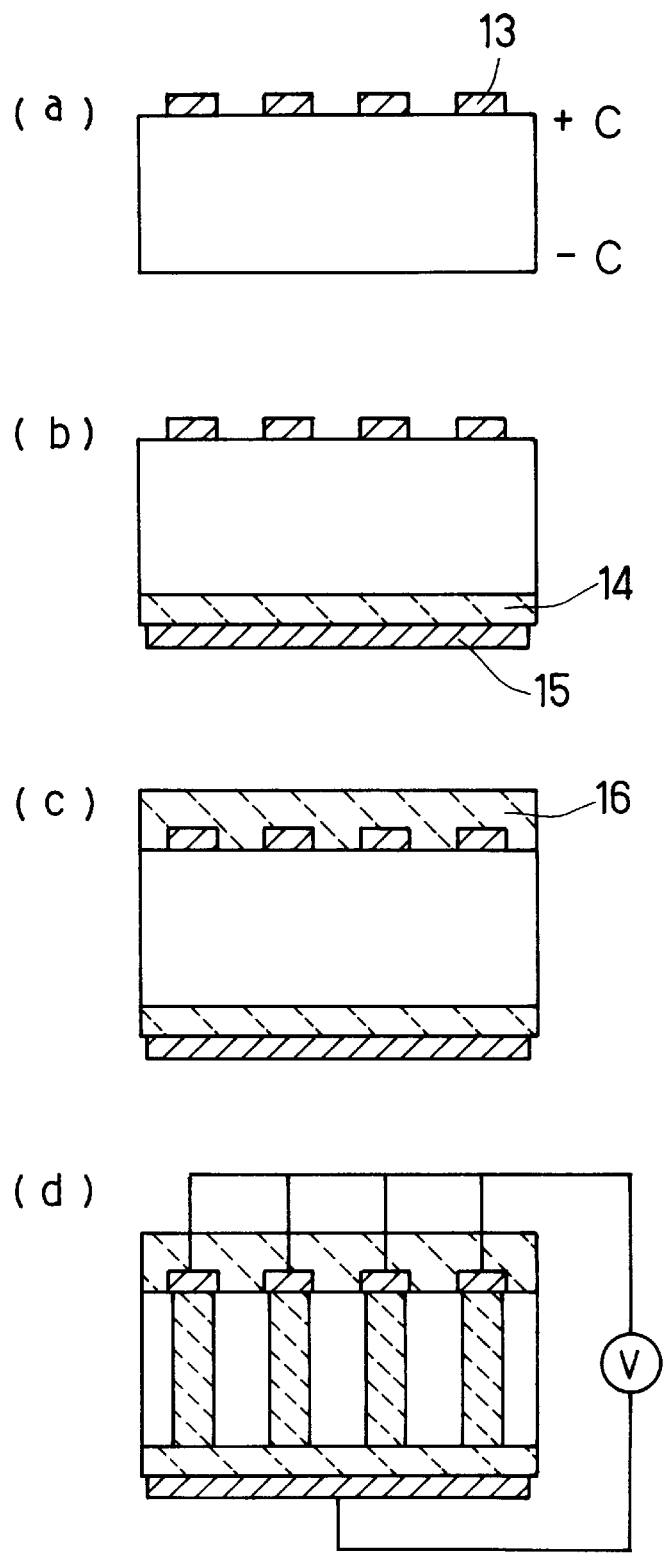
FIGS. 9(a)–9(d) are cross-sectional views to illustrate a method for producing polarization inversion parts of this invention.

Here a method for forming an electric field applied polarization inversion on a nonlinear optical crystal is described. The crystal has a surface substantially perpendicular to the C surface. FIGS. 9(*a*)–9(*d*) show the process for producing the polarization inversion. In FIG. 9(*a*), a comb-shaped electrode 13 is formed on the +C surface of the C plate (LiNbO$_3$). In FIG. 9(*b*), a plane electrode 15 is formed after depositing an SiO$_2$ film 14 on the –C surface. In FIG. 9(*c*), another SiO$_2$ film 16 is deposited on the comb-shaped electrode 13 of the +C surface. In FIG. 9(*d*), the polarization is inverted by applying voltage to the space between the electrodes. The voltage can be applied homogeneously by depositing the SiO$_2$ film 16 on the –C surface, and homogeneous periodic polarization inversion parts can be provided. A polarization inversion structure having a short period can be formed by depositing the SiO$_2$ film 16 on the +C surface. This method enables formation of a polarization inversion structure with a short period in a large area. The next aim is an optimum SiO$_2$ film thickness. An SiO$_2$ film was deposited by a sputtering method in order to observe the polarization inversion properties with respect to the thickness. First observation was conducted on the SiO$_2$ film thickness on the –C surface. The film having thickness less than 0.5 μm had little effect on the homogeneous polarization inversion. If the thickness was 0.7 μm or thickei; the inversion homogeneity was improved and homogeneous inversion was realized for an area of more than 10×10 mm. The polarization was merely inverted when the thickness exceeded 2.3 μm, and inversion reproducibility was decreased. Therefore, when the SiO$_2$ film 14 is 0.7–2.3 μm thick, the film is effective for homogeneous polarization inversion. The next object for consideration was the thickness of the SiO$_2$ film deposited on the comb-shaped electrode of the +C surface. When the thickness was less than 0.5 μm, the inversion period was at least 3 μm. As a result, the heterogeneity of the inversion structure is achieved rapidly and the SHG element's properties deteriorated. When the thickness of the SiO$_2$ film was maintained at least 1 μm, the homogeneity was improved, and polarization inversion parts having a period of at most 21 μm were obtained. So the SiO$_2$ film thickness is preferably about 1 μm. As mentioned above, polarization inversion parts of at most 2 μm period can be formed to be 10×10 mm by depositing the SiO$_2$ films (14, 16) respectively on the ±C surfaces.

Though an LiNbO$_3$ substrate was used in Embodiment 5, similar substrates can be produced from other materials such as LiTaO$_3$ (doped with MgO, Nb, Nd and so on), LiNbO, and the mixture (LiTa$_{(1-x)}$Nb$_x$O$_3$ (0≦x≦1)), and KTP (KTiOPO$_4$). Highly efficient optical wavelength conversion elements can be produced from LiTaO$_3$, LiNbO$_3$ and KTP since all of them have a high nonlinear property.

Embodiment 6

The following describes a short wavelength light generator comprising the above optical wavelength conversion element.

Figure 10:
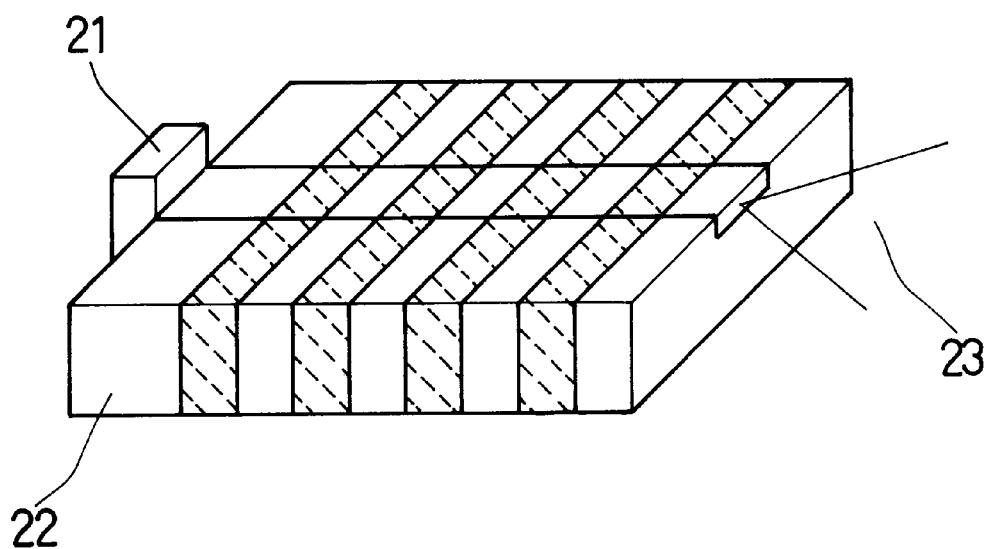
FIG. 10 is a perspective view to illustrate a short wavelength light generator of this invention.

Such a short wavelength light generator can be provided by using a laser beam source and an optical wavelength conversion element. FIG. 10 shows a short wavelength light generator in Embodiment 6. The fundamental wave from a semiconductor laser 21 has its wavelength converted by an optical wavelength conversion element 22 and is irradiated as a second harmonic generation (SHG) 23. Blue SHG light having a wavelength of 400 nm band will be obtained by using a semiconductor laser having a wavelength of 800 nm band, and thus, a small blue light source will be provided. A stable and small short wavelength light generator can be used in many fields including medical and biotechnology, such as high density optical recording, color laser printers, and fluorescence microscopes.

When a red semiconductor laser fundamental wave having a wavelength of 680 nm band is used, ultraviolet rays having a wavelength of 340 nm can be generated, and a small ultraviolet ray source can be provided. More specifically, such a light source can be used for many fields such as biotechnology, measurement of fluorescent life, and specific instruments. When a laser is pulse-driven, a fundamental wave having a high peak power is obtainable, and thus, wavelength can be converted with high efficiency. For instance, a semiconductor laser having the maximum output power of approximately 40 mW at a CW drive can generate hundreds of mW of peak power by pulse driving, that is dozens mW as SHG output power. SHG light with a high peak power can be applied to measurement of fluorescent life for the purpose of impurity detection. When a semiconductor laser is RF driven at a high frequency, pulse oscillation with high peak power can be realized, and the conversion efficiency is improved by five times in average compared to a semiconductor laser by CW drive. The properties are excellent for a small light source with high output power.

When high output power SHG light is generated, a problem is unstable output power due to optical damage. In the element in this Embodiment, a deep polarization inversion structure is formed, and thus, it has excellent resistance to optical damage, and the properties are stable even if the generated SHG output power exceeds 10 mW.

Embodiment 7

The following is the description on an optical pickup in which a short wavelength light generator is used for a light source to pick up an optical disk. Since recording at a high density is desirable for the optical disk, a smaller short wavelength light source is indispensable. A pickup for reading an optical disk comprises a light source, a focusing optical system and a light-receiving part. When the optical wavelength conversion element of Embodiment 7 is used for the light source, blue light beams having a wavelength of 400 nm band can be used as a light source to read an optical disk, and thus, the recording density can be doubled. Furthermore, high output power blue light beam generation enables not only reading information but writing information on an optical disk. When a semiconductor laser is used for a fundamental light source, the element can be miniaturized, and small equipment for reading and recording optical disks for private use can be provided. In such an optical wavelength conversion element, the aspect ratio of the output power beam can be optimized by optimizing the width of the optical waveguide. Since the focusing property of the optical pickup is improved, some portions such as a beam-forming prism are not required, and thus, the propagation efficiency is improved, excellent focusing property is obtained and the cost is lowered. In addition to that, noise of scattered light that is generated at beam forming is decreased and a pickup with a simple configuration is obtained.

Figure 11:
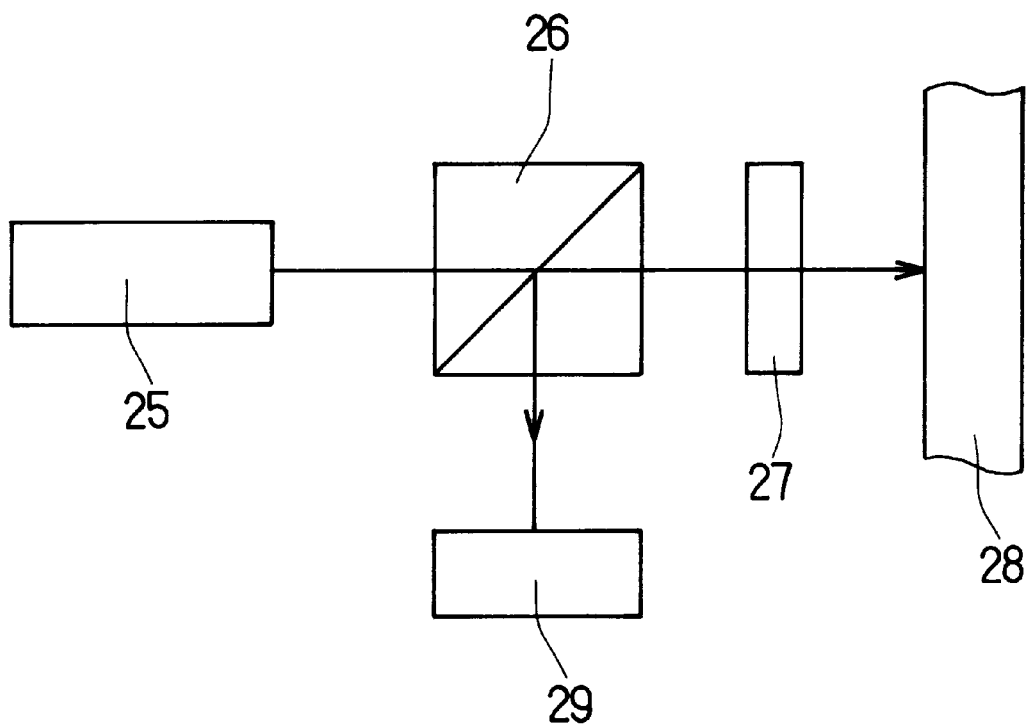
FIG. 11 is a schematic diagram to illustrate the configuration of an optical pickup of this invention.

FIG. 11 shows an Embodiment of an optical pickup in this invention. In FIG. 11, the beam having 10 mW output power from a short wavelength light generator 25 is passed through a beam splitter 26 and irradiated to an optical disk 28 as an information recording medium by a lens 27. On the other hand, reflected light beams are collimated by the lens 27 and reflected by the beam splitter 26, and thus, signals are read by a detector 29. In addition, the output power of the short wavelength light generator can be modulated and information can be written on the optical disk 28. As a result, the focusing property is improved due to the short wavelength light, and the recording density can be doubled compared to a conventional element.

Another object of this invention is to provide a technique for forming a homogeneous and deep polarization inversion structure on a ferroelectric substrate having a surface that is substantially parallel to the polarization direction.

Embodiment 8

An example of a method for producing polarization inversion parts of this invention is explained below referring to FIG. 12.

Figure 12:
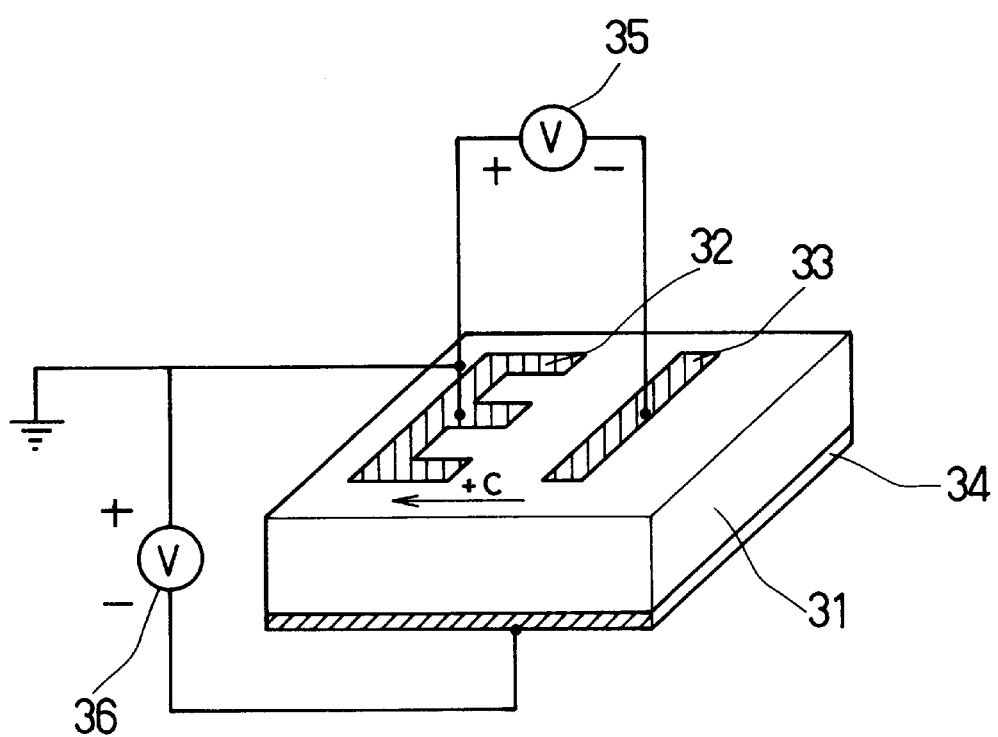
FIG. 12 is a perspective view to illustrate a method for producing polarization inversion parts of this invention.

In FIG. 12, a comb-shaped electrode 32 and a bar-shaped electrode 33 are formed on one surface of MgO:LiNbO$_3$ substrate 31 (X plate). A plane electrode 34 is formed on the other side of the substrate 31. Voltage sources (35, 36) are respectively positioned between the comb-shaped electrode 32 and the bar-shaped electrode 33, and between the comb-shaped electrode 32 and the plane electrode 34. The comb-shaped electrode 32 is formed in the +C direction, while the bar-shaped electrode 33 is formed in the −C direction of the substrate. The entire substrate is dipped in an insulating solution in order to prevent discharging during voltage application.

First, voltage was applied to the space between the electrodes (32, 33) in the same manner as the conventional techniques for the purpose of polarization inversion. The electrode interval was 100 μm and the electrode was 10 nm long. When voltage of about 0.4 kV was applied (when the electric field was about 4 kV/mm), the polarization was inverted. At the polarization inversion parts observed from the cross section, polarization inversion parts of about 1 μm depth were formed. When the polarization inversion parts formed from the surface were observed, the polarization inversion parts were not formed homogeneously in the range of 10 mm length of the electrode, and some parts remained without inversion. As mentioned above, when polarization inversion parts are formed by applying an electric field in the direction parallel to the substrate, the inversion depth is shallow (approximately 1 μm) and the polarization inversion parts are not homogeneous in the surface.

In order to provide deep polarization inversion parts, the properties of the formed polarization inversion parts are examined. The results are as follows.

1) The polarization inversion depth largely depends on the direction of the electric field that is generated at the tips (electrode digit) of the comb-shaped part (stripe patterned part) of the comb-shaped electrode. In other words, the electric fields generated between the electrodes formed on the substrate are localized in the vicinity of the substrate surface. As a result, the electric field is not distributed in the depth direction and thus, a deep polarization part will not be formed.

2) The polarization inversion parts grow at the electrode formed on the +C surface and grow in the −C direction. Therefore, the comb-shaped electrode should be formed at the +C side.

3) The polarization inversion depth is determined by the depth of the polarization inversion parts formed at the tips of the electrode digit at the +C side. The polarization inversion parts are the deepest at the tips of the electrode digit at the +C side where the inversion core is generated, and the depth gets shallower at the −C side.

Figure 13:
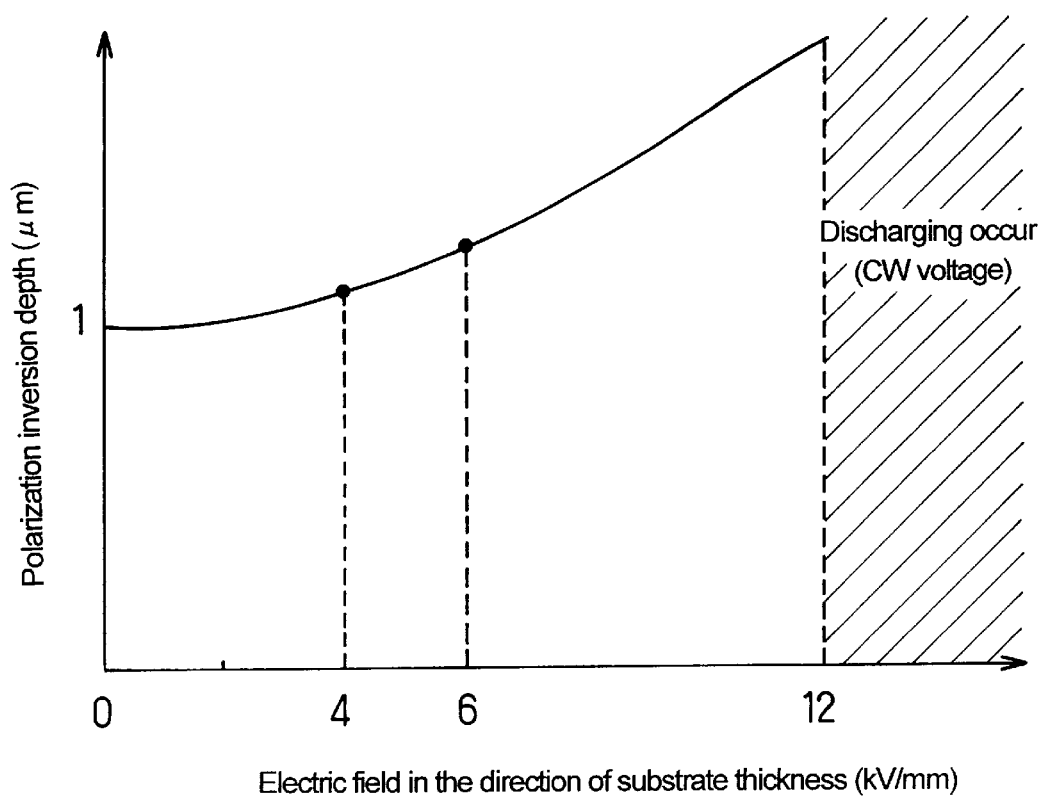
FIG. 13 is a graph based on the method in FIG. 12, illustrating the relationship between the electric field in the direction of the substrate's thickness and the polarization inversion depth.

The above results show that it is required that a comb-shaped electrode is formed on the +C surface (the crystal side where the polarization inversion is generated) and deep polarization inversion parts are formed at the tips of the electrode digit of the comb-shaped electrode to form deep polarization inversion parts. For this purpose, the electric field direction at the tips of the electrode digit should be inclined in the depth direction of the substrate. In the following experiment, the electric field at the tips of the electrode digit was directed to the depth direction of the substrate by applying an electric field in the perpendicular direction of the substrate plus in the parallel direction. More specifically, voltage was applied to the space between the comb-shaped electrode 32 and the bar-shaped electrode 33 while applying voltage between the comb-shaped electrode 32 and the plane electrode 34. Direct voltage was applied to the space between the electrodes 32 and 34, and a pulse voltage having a pulse width of 100 ms was applied to the space between the electrodes 32 and 33, so that the electric field between the electrodes 32 and 33 was 4 kV/mm. FIG. 13 shows the relationship between the voltage applied to the electrodes 32 and 34, and the polarization inversion depth. The electric field between the electrodes 32 and 34 was calculated from the substrate depth (0.5 mm). As shown in FIG. 13, when the voltage between these electrodes was 2 kV/mm or less (approximately 50% of the voltage between the electrodes 32 and 33), the polarization inversion depth was 1 μm or substantially the same as the case without voltage application between the electrodes 32 and 34. The polarization inversion depth was not increased. When the value reached 4 kV/mm, the inversion depth was increased in substantial proportion to the applied voltage. The homogeneity of the polarization inversion parts was improved when the value reached 3 kV or more (the electric field: 6 kV/mm, about 1.2 times that between the electrodes 32 and 34), and homogeneous polarization inversion parts were formed in the range of 10 mm length of the electrode. Therefore, for the applied electric field, the substrate voltage between the electrodes 32 and 34 is preferably the same as that of the electrodes 32 and 33 or the former exceeds the latter. More preferably the voltage of the electrodes 32 and 33 is 1.2 times or more as that of the electrodes 32 and 34, as the homogeneity is also improved.

Polarization inversion parts were formed by applying voltage of 4 kV between the two electrodes (32, 34) so that polarization inversion parts of 1.5 μm depth (period: 3.2 μm) were formed homogeneously in the range of 40 mm (function length).

Next, the voltage application method was examined.

In order to apply voltage to the front and back surfaces of the substrate, voltage can be applied to the space between the electrodes (33, 34). In this method, however, the polarization inversion depth was limited. The reason is considered that the polarization inversion depth is increased depending largely on the depth of the polarization inversion core. The polarization inversion begins with the polarization inversion core generation at the +C side electrode, and grows in the −C direction. Therefore, the entire depth of the polarization inversion parts is limited by the depth in the vicinity of the +C side. In order to deepen the polarization inversion parts in the vicinity of the comb-shaped electrode at the +C side, an electric field in the substrate depth direction should be applied near the electrode. So voltage should be applied effectively to the space between the electrode 32 and the electrode 34 on the backside of the substrate.

The waveshape of the applied voltage also was examined.

Deep polarization inversion parts can be formed by applying pulse voltage to the space between the electrodes (32, 33) while applying direct current voltage between the electrodes (32, 34) on the front and back sides of the substrate. In order to further increase the depth of the polarization inversion parts, voltage between the electrodes (32, 34) should be increased. If the voltage reaches or exceeds 6 kV (electric field: 12 kV/mm), electric breakdown might occur between the electrodes (32, 34), which will make application of high voltage difficult. An examination about the voltage waveshape shows that such breakdown can be prevented by shortening the voltage application time. Only about 5 kV of voltage can be applied in 1 second, but 8 kV voltage can be applied by making the pulse width at most 100 ms. As a result, the voltage application waveshape can be a pulse shape of at most 1s and the voltage applied to the space between the electrodes (32, 34) can be increased to about 6 kV, and thus, polarization inversion parts of 1.8 $\mu$m depth can be formed. Furthermore, voltage of about 8 kV can be applied by controlling the pulse width to be at most 100 ms, and polarization inversion parts of at least 2 $\mu$m can be formed.

When the pulse voltage in the substrate's thickness direction is increased and exceeds 9 kV, a crack may occur in the substrate due to the breakdown of the substrate. Therefore, it is difficult to apply the higher voltage.

As mentioned above, the electric field in the direction of the substrate thickness is preferably 4 kV/mm and the electric field is less than the value that causes the breakdown of the substrate. In this case, it is preferable that the electric field is applied by a pulse voltage. It is preferable that the electric field is 8 kV/mm or higher, more preferably, is 12 kV/mm or higher, for example, 8 kV/mm–18 kV/mm. CW voltage of 5–6 kV/mm caused electric breakdown of a substrate comprising LiANbO$_3$ or LiTaO$_3$, while the same substrate was not broken down when ms-order pulse voltage of 10 kV/mm was applied.

The application of the pulse voltage in the direction of the substrate's thickness direction is effective if it is conducted previously or at the same time that the voltage is applied in the polarization direction of the substrate. It is also effective that the pulse width of the pulse voltage in the substrate's thickness direction is greater than that of the pulse voltage in the polarization direction. As mentioned above, this is because the depth of the polarization inversion depends on the depth of the polarization inversion generated at the tips of the electrode digit.

The application in the polarization direction is also effective if it is conducted just before the voltage application in the substrate's thickness direction. The reason is that a polarization inversion core is formed at the tips of the electrode digit of the comb-shaped electrode by applying voltage to the space between the electrodes (32, 34), fiom which polarization inversion parts are formed between the electrodes (32, 33) when voltage is applied to the space between the electrodes (32, 33).

As mentioned above, it is preferable that pulse voltage is applied in the direction of the substrate's thickness. For example, when the pulse width is at most 1s, a deep polarization (about 1.8 $\mu$m) inversion part can be formed. More preferably, when the pulse width is at most 100 ms, polarization inversion parts of at least 2 $\mu$m depth can be formed.

The following is another technique to form a deep polarization inversion part.

Figure 14:
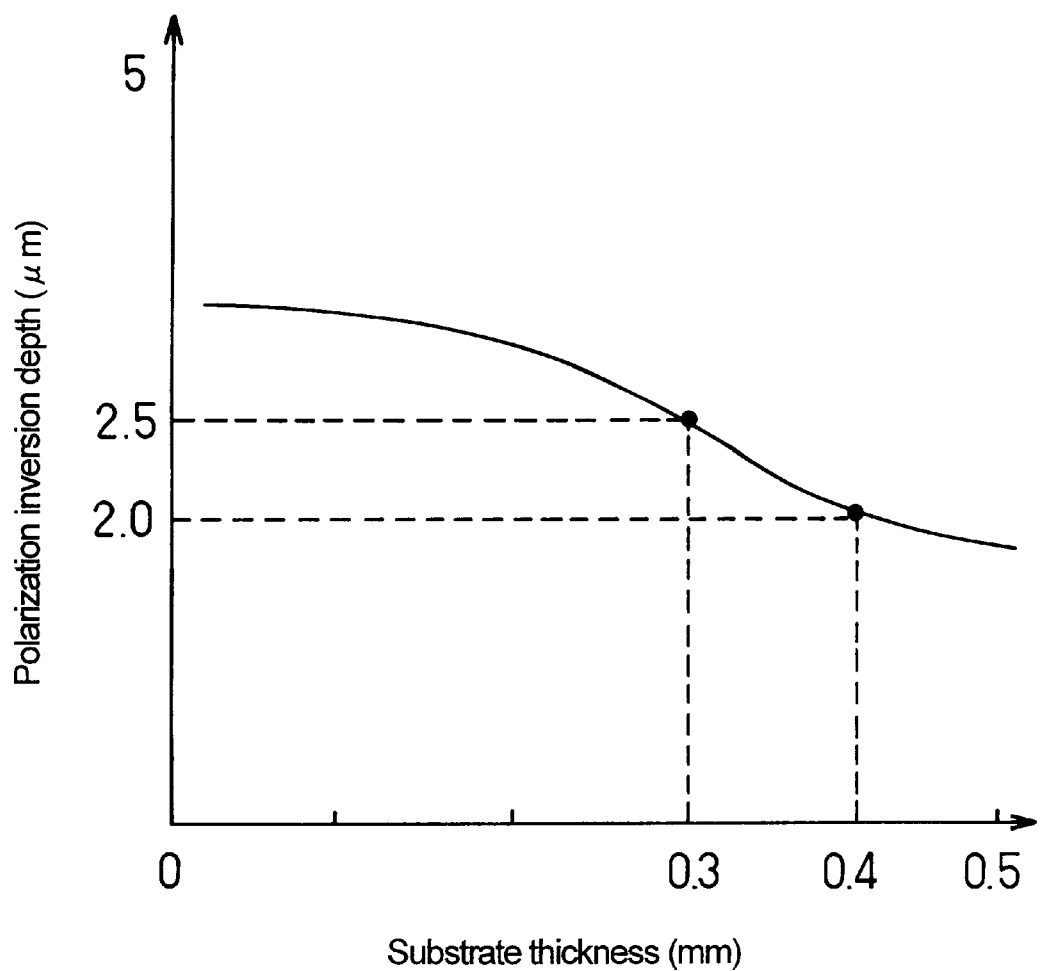
FIG. 14 is a graph based on the method in FIG. 12, illustrating the relationship between the substrate's thickness and the polarization inversion depth.

As mentioned above, deep polarization inversion parts can be formed by applying high voltage to the space between the electrodes (32, 34) in the above manner by using a substrate of 0.5 mm thickness. However, the increase of voltage application is limited if it only depends on decreasing the pulse width. As a result of various experiments to increase the applied electric field, the voltage causing breakdown does not change substantially if a thinner substrate is used. In other words, the applied electric field can be remarkably increased by using a thinner substrate when the voltage is not changed. For example , if a substrate 0.5 mm thick is replaced by one 0.25 mm thick, the applied electric field can be doubled with the same voltage. FIG. 14 shows the relationship between the substrate thickness and the polarization inversion depth that can be formed. When the substrate is 0.4 mm thick, the polarization inversion parts are at least 2.0 $\mu$m deep, and when the substrate is 0.3 mm thick, the polarization inversion parts are at least 2.5 $\mu$m deep or more. As a result, the polarization inversion parts reach or exceed the thickness of the optical waveguide when the substrate thickness is no more than 0.4 mm.

For instance, an optical wavelength conversion element is produced by forming an optical waveguide on a substrate having polarization inversion. The wavelength of the fundamental wave guiding the optical waveguide is converted by the polarization inversion parts that are periodically formed when it propagates inside the waveguide. The conversion efficiency is determined by the overlapping degree between the light propagating the optical waveguide and the polarization inversion parts. When the depth of the polarization inversion parts is at least 2.0, the overlapping with the optical waveguide is the maximum. Therefore, the conversion efficiency of the optical wavelength conversion element having the optical waveguide can be remarkably improved by controlling the substrate thickness to be no more than 0.4 mm.

Furthermore, similar effects can be obtained by using MgO-doped LiTaO$_3$, MgO-doped LiNbO$_3$, and the mixture (MgO: LiNb$_x$Ta$_{(1-x)}$O$_3$). The doped MgO has improved resistance against optical damage. Thereby stable properties can be obtained for SHG with high output power In this embodiment a substrate comprising ferroelectric crystal is used. Similar polarization inversion will be obtained by using a ferroelectric crystal film produced by gaseous or liquid phase growth. A film produced by the crystal growth has low impurity condensation and high crystal property, and thus, a highly-efficient optical wavelength conversion element can be formed.

Further, as shown in FIG. 17, the above-mentioned electric field application method is effective when the polarization direction is shifted a predetermined angle: θ to the substrate surface. In this case, it is preferable that the predetermined angle: θ is in a range between 1° and 5°. When the angle θ is 1° or more, the depth of the polarization inversion can be increased, and when the angle θ is 5° or less, the homogeneity of the polarization inversion can be obtained.

Embodiment 9

The following is another example of a method for producing polarization inversion parts. In order to form polarization inversion parts on a ferroelectric crystal of X or Y plate (MgO: LiNbO$_3$), a conventional method is known: an electric field is generated by applying voltage between electrodes formed on the substrate, and the polarization is inverted in the space.

Figure 15:
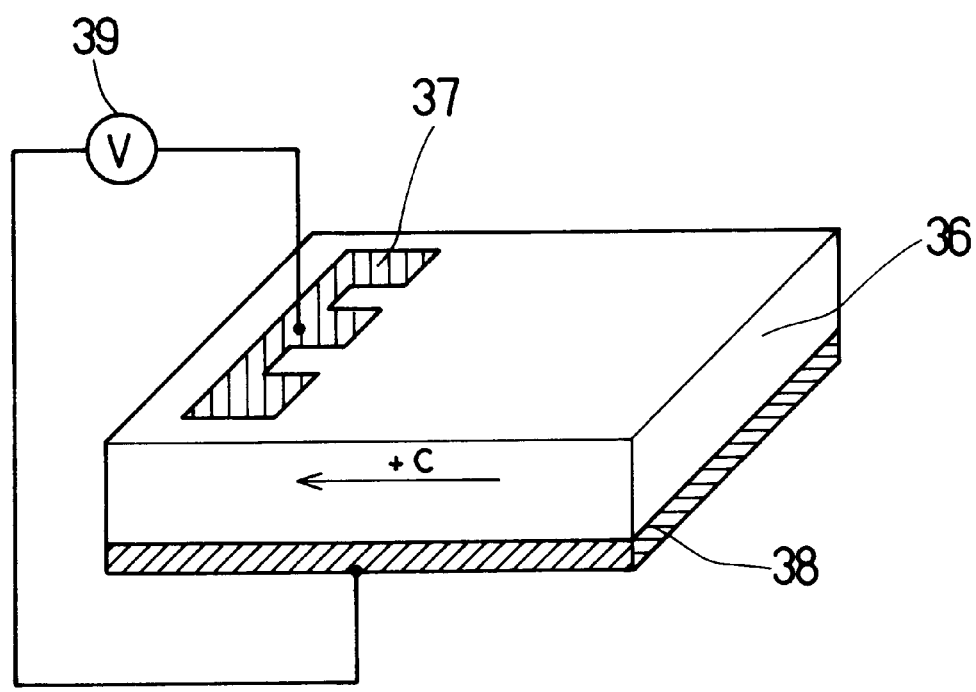
FIG. 15 is a perspective view of a substrate, showing a method for producing polarization inversion parts of this invention.

The inventors have found that polarization inversion parts similar to the above ones are generated by applying voltage between the electrodes formed on the front and back sides of a substrate. The process is shown in FIG. 15. In FIG. 15, an X plate ((MgO: LiNbO$_3$) 36, a comb-shaped electrode 37 and plane electrode 38 are formed. These two electrodes are respectively formed on the opposite surfaces. When voltage was applied from a voltage source 39 to the space between the comb-shaped electrode 37 on the front surface and the plane electrode 38 on the back surface, polarization inversion parts were formed at the tips of the electrode digit of the comb-shaped electrode 37. The substrate was 0.5 mm thick and the applied voltage was about 8 kV. The polarization inversion parts were formed only in the vicinity of the electrode digit and the length was only in the range of about dozens μm. As a result of various experiments, it was found that longer polarization inversion parts were formed by making the backside plane electrode wider in the polarization direction compared to the width of the comb-shaped electrode. When the difference of the electrode width is no more than twice, the length of the polarization inversion parts is 10 μm or less. When the difference of the electrode width is four times or more, polarization inversion parts of about 100 μm length were formed. Furthermore, the polarization inversion homogeneity was increased by making the difference of the electrode width at least 10 times.

Though the reason is not clear, but it is considered that an electric field in the polarization direction is generated since the electric field at the tips of the electrode digit is generated between the edge part of the electrode formed on the backside of the electrode.

Figure 16:
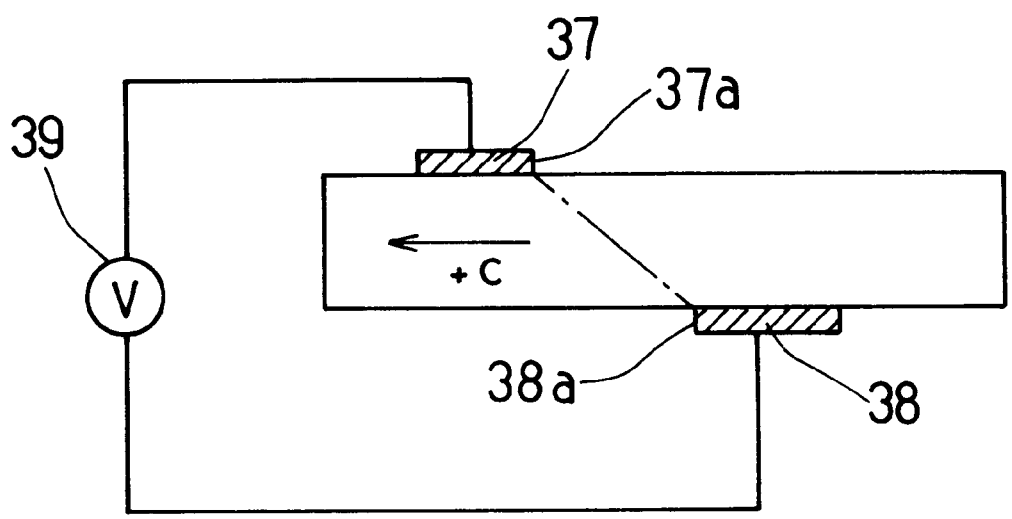
FIG. 16 is a perspective view to illustrate a method for producing polarization inversion parts of this invention.

The position of the backside electrode was examined on the basis of the above expectation. Polarization inversion parts are formed by forming an electric field component generated between the front and back electrodes in the direction of the substrate polarization. As shown in FIG. 16, the position of the plane electrode 38 to the comb-shaped electrode 37 is shifted in the polarization direction, which seems to cause the polarization inversion. So the bar-shaped electrode on the back surface was shifted in the –C surface direction to the comb-shaped electrode. The shifting distance was 5, 10, 20 and 100 μm. When voltage was applied, polarization inversion parts were not formed if the distance was 10 μm or less. When the distance was 20 μm or more (an angle between the line connecting the electrodes and the surface is about 88°), polarization inversion parts were formed. The formed polarization inversion parts are deep (about 2 μm) and excellent in homogeneity.

In this case, it was confirmed that an angle between the line connecting the electrodes and the surface of the substrate is preferably in a range between 2° and 80°. When the above-mentioned angle is 2° or more, a sufficient thickness of the substrate to maintain the intensity practically can be obtained. In addition to that, when the above-mentioned angle is 80 or less, the polarization inversion parts can be formed stably. When defined more precisely, the angle is formed by the substrate surface and a line connecting two end parts (37a, 38a) of the respective electrodes (37, 38), when the end parts (37a, 38a) are the parts positioned closer to the other electrodes.

Further, as shown in FIG. 17, the above-mentioned electric field application method is effective when the polarization direction is shifted a predetermined angle: θ to the substrate surface. In this case, it is preferable that the predetermined angle: θ is in a range between 1° and 5°. When the angle θ is 1 or more, the depth of the polarization inversion can be increased, and when the angle θ is 5° or less, the homogeneity of the polarization inversion can be obtained.

Embodiment 10

Figure 18:
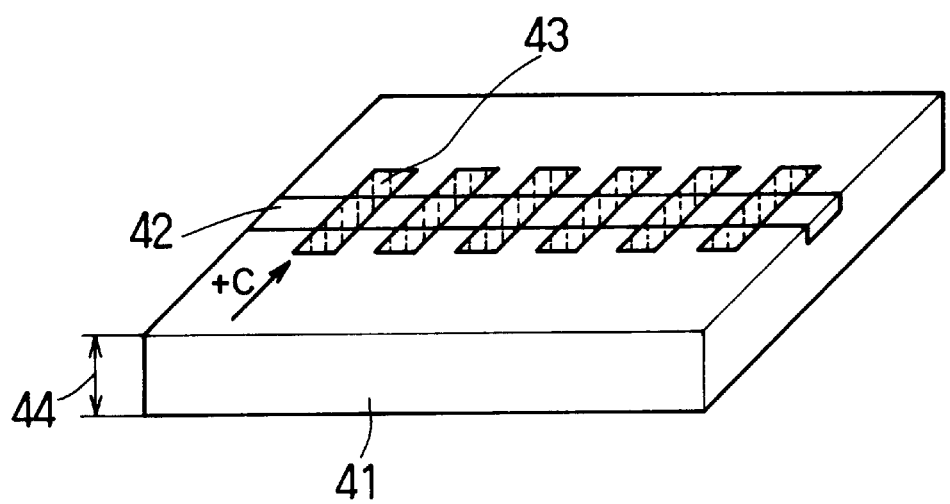
FIG. 18 is a perspective to illustrate an optical wavelength conversion element of this invention.

The following is an optical wavelength conversion element using the polarization inversion parts formed in the above embodiment. As shown in FIG. 18, the optical wavelength conversion element comprises polarization inversion parts 43 of 3.2 μm period and an optical waveguide 42 formed by proton exchanging. The polarization inversion parts 43 are formed on the X plate (MgO:LiNbO$_3$ substrate 41) and the optical waveguide 42 is right across the polarization inversion parts. In order to produce an optical waveguide, a stripe mask pattern is formed on a substrate after forming polarization inversion parts, and annealing is conducted in an acid. As a result, Li in the substrate and proton in the acid are exchanged at the non-mask part and an optical waveguide is formed.

Figure 19:
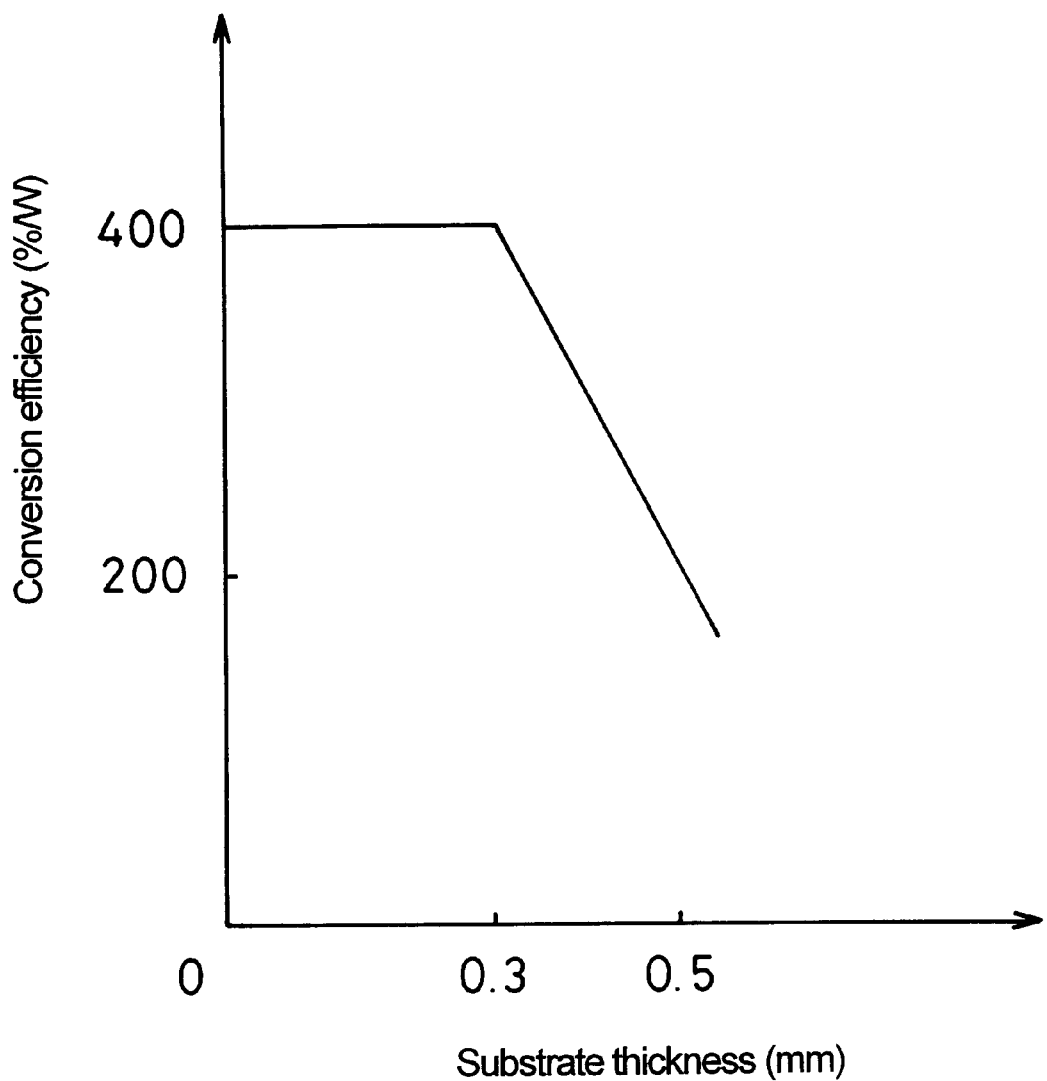
FIG. 19 is a graph to illustrate the relationship between the substrate's thickness and the optical wavelength conversion efficiency in the optical wavelength conversion element shown in FIG. 18.

Next, a Ti:Al$_2$O$_3$ laser light is radiated to the formed optical wavelength conversion element, and the conversion efficiency is measured. FIG. 19 shows the relationship between the substrate thickness and the conversion efficiency. When the thickness is no more than 0.3 mm, the conversion efficiency is maximum (about 400% /W).

When the substrate 44 is not thicker than 0.3 mm, the temperature of the optical wavelength conversion element can be controlled easily. An optical wavelength conversion element using periodic polarization inversion structure enables conversion with high efficiency, but the phase matching condition is severe. The convertible fundamental wave is only about 0.1 nm. Therefore, the wavelength of the phase matching should be adjusted to the fundamental wavelength by controlling the substrate temperature as the fundamental wavelength changes. A thick substrate has high heat capacity, and electric output power is required for temperature control. If the temperature is changed rapidly for a high-speed control, the substrate is distorted, resulting in the deterioration of the properties. Deterioration of the substrate due to the temperature difference is increased as a thicker substrate is used. In a conventional substrate of 0.5 mm thickness, about 0.1 second is required to stabilize the output power influenced by temperature while preventing the properties from deterioration. On the other hand, if the substrate thickness is 0.3 mm or less, the deterioration due to temperature change is substantially controlled. Deterioration is not observed if the temperature is stabilized at a high speed (0.01 second at most). The output power can be stabilized firther speedily by controlling the temperature.

The X plate used in this embodiment can be replaced by a Y plate. The MgO:LiNbO$_3$ used in this embodiment can be replaced by $LiNbO_3$, $LiTaO_3$ and the mixture ($LiNbXTa_{(1-x)}O_3$). A similar element can be produced by using KTP ($KTiOPO_4$). Since $LiTaO_3$, $LiNbO_3$, and KTP have high nonlinear property, they can provide optical wavelength conversion element with a high efficiency.

In this embodiment, a substrate comprising ferroelectric crystal is used. Similar polarization inversion will be obtained by using a ferroelectric crystal film produced by gaseous or liquid phase growth. A film produced by the crystal growth has low impurity condensation and high crystal property, and thus, a highly-efficient optical wavelength conversion element can be formed.

Furthermore, similar effects can be obtained by using MgO-doped $LiTaO_3$, MgO-doped $LiNbO_3$, and the mixture (MgO: $LiNb_xTa_{(1-x)}O_3$). The doped MgO has improved resistance against optical damage. Thereby stable properties can be obtained to SHG with high output power.

Embodiment 11

The following is an optical wavelength conversion element using the polarization inversion parts formed in the above embodiment.

Figure 20:
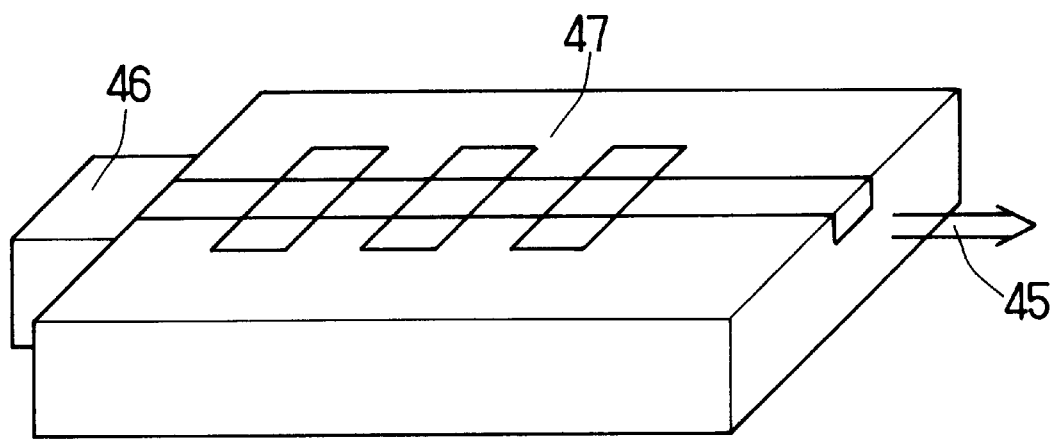
FIG. 20 is a perspective view to illustrate a short wavelength light generator of this invention.

A short wavelength light generator can be provided by using a laser light source and an optical wavelength light source in Embodiment 11. FIG. 20 shows a short wavelength light source. Fundamental wave from a semiconductor laser 46 is wavelength-converted by the optical wavelength conversion element 47 and radiated as an SHG 45. A semiconductor laser having a wavelength 800 nm band will provide a blue SHG light beam of a wavelength 400 nm band. As a result, a small blue light source is provided. In the optical wavelength conversion element of this embodiment, an X plate (MgO:$LiNbO_3$) is used, and therefore, the optical waveguide becomes TE polarized light. The polarization direction is identical to that of the optical waveguide composing the semiconductor laser, which maintains the electric field distribution between the waveguides and the polarized light direction to be substantially same. As a result, coupling with high efficiency can be conducted. Because of the direct coupling, the light radiated from the semiconductor laser can be coupled in the optical waveguide conversion element at an efficiency of at least 70%. And thus, a high output power small short wavelength light source can be provided.

Such a small short wavelength light source can be applied in various fields such as medical and biotechnology, such as high density optical recording, color laser printers, and fluorescence microscopes. Ultraviolet rays (wavelength: 340 nm) can be generated by using a red semiconductor laser (680 nm waveguide band) as the fundamental wave. The small ultraviolet light source can be applied to many fields such as biotechnology, fluorescent life measurement and specific instrumentation. A fundamental wave with high peak power can be obtained by pulse-driving the laser, and thus, wavelength can be converted with a high efficiency. A semiconductor laser whose maximum output power is 40 mW at continuous wave (CW) driving can generate high peak power of hundreds mW, or dozens mW as SHG output power. SHG light with a high peak power can be applied to measurement of fluorescent life for the purpose of impurity detection. When a semiconductor laser is RF-driven at a high frequency, pulse oscillation with high peak power can be realized, and the conversion efficiency is improved to five times in average compared to a semiconductor laser by CW drive. The properties are excellent for a small light source with high output power.

When high output power SHG light is generated, a problem will appear: unstable output power due to optical damage. In the element in this Embodiment, a deep polarization inversion structure is formed, and thus, it has excellent resistance to optical damage, and the properties are stable even if the generated SHG output power exceeds 10mW.

A further aspect of the present invention provides a method for improving conversion efficiency to a second harmonic (a SHG wave) by increasing overlap utilizing phase matching of a fundamental wave in a fundamental mode and a SHG wave in a higher-order mode in a light wavelength conversion element utilizing generation of a SHG wave by a nonlinear optical effect.

A principle of the increase of the overlap will be explained as follows. In this case, the explanation will be made for a principle for improving conversion efficiency by increasing the overlap between the modes through phase matching between a fundamental wave in a fundamental mode and a SHG wave in a higher-order mode.

Figure 21:
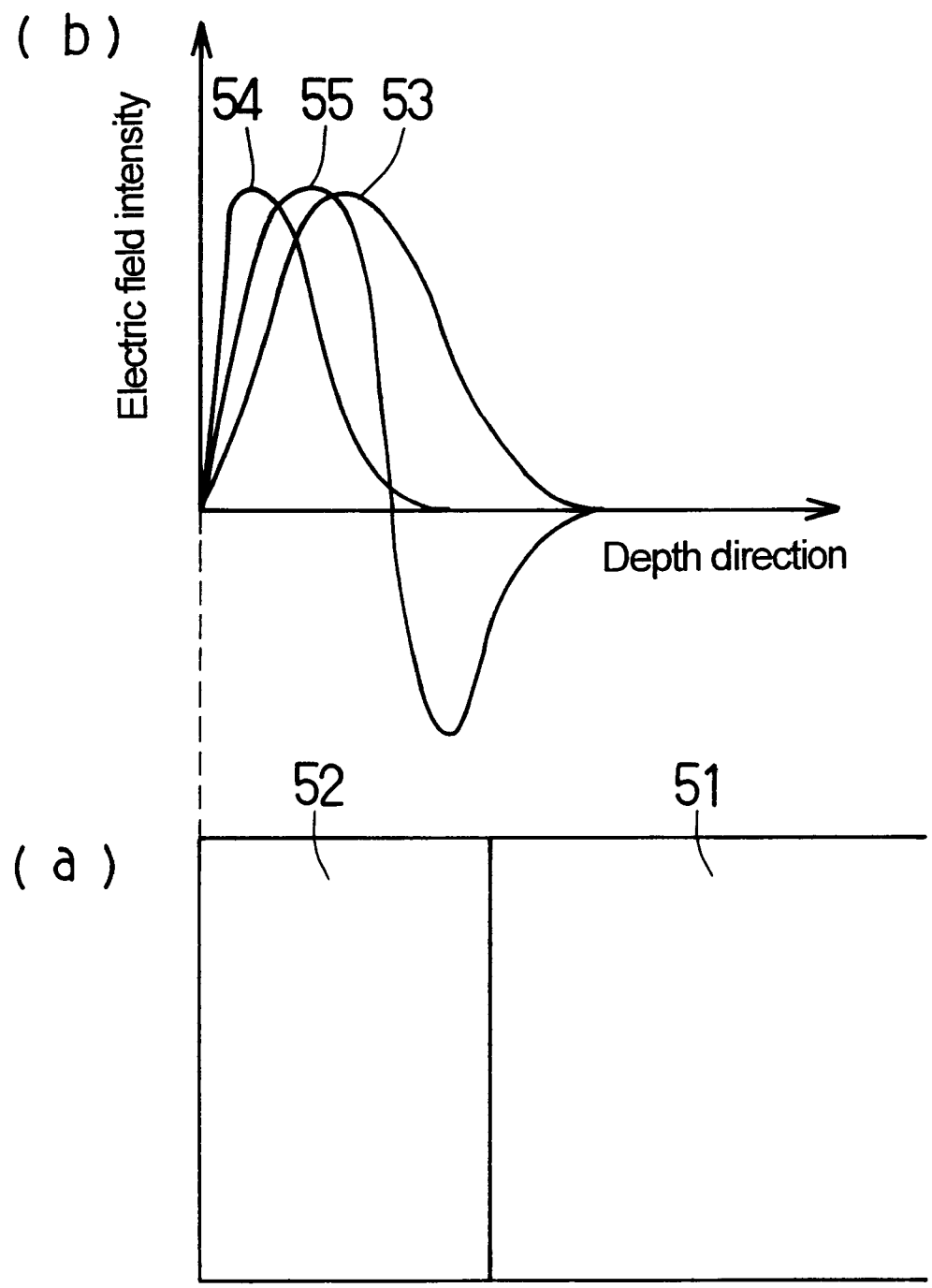
FIGS. 21(a) and 21(b) are graphs to illustrate the electric field distribution in the direction of waveguide depth of each mode guiding an optical waveguide.

Firstly, a light wavelength conversion in a general optical waveguide will be explained. Generally, a cross section of an optical waveguide includes a substrate 51 (a refractive index: ns), a guiding layer 52 (a refractive index: nf) and an outer layer (not shown in FIG. 21) (a refractive index: nc) as shown in FIG. 21 (a). The relationship of the refractive indexes is expressed by nf>ns>nc. An electric field distribution of a SHG wave in a first-order mode 54 and a second-order mode 55 for a fundamental wave 53 in a fundamental mode is shown in FIG. 21 (b).

As seen in FIG. 21 (b), the overlap in an electric field between a fundamental wave 53 and SHG waves 54 and 55 is largest between fundamental modes and decreases as an order of a guide mode of a SHG wave increases. That is to say, highest conversion efficiency is obtained between fundamental modes, since conversion efficiency of a SHG wave is proportional to overlap of a mode.

Next, an explanation will be made for the case where an outer layer having a refractive index higher than nf is formed. In the case of providing an outer layer with a high refractive index, a mode distribution of a fundamental wave is firmly confined near the surface of a waveguide due to offset to the layer side. Therefore, firm confinement of the fundamental wave is realized. In a conventional light wavelength conversion element, conversion efficiency has been improved by utilizing this firm confinement.

However, a wavelength of a fundamental wave and that of a higher harmonic are different and refractive indexes are distributed. Consequently, there has been a limitation in an increase of overlap between modes, since dispersion of each guide mode is different (for example, a second harmonic is drawn to a layer with a high refractive index stronger as compared to a fundamental wave). The limitation was caused by the following reason. In case of using a layer with a high refractive index higher than that of a guiding layer, confinement of a fundamental wave can be improved. However, on the other hand, conversion efficiency of an element decreases extremely due to confinement of a SHG wave having a short wavelength into an inside of the layer, as confinement of a fundamental wave is improved by making a thickness of the layer thicker.

Figure 22:
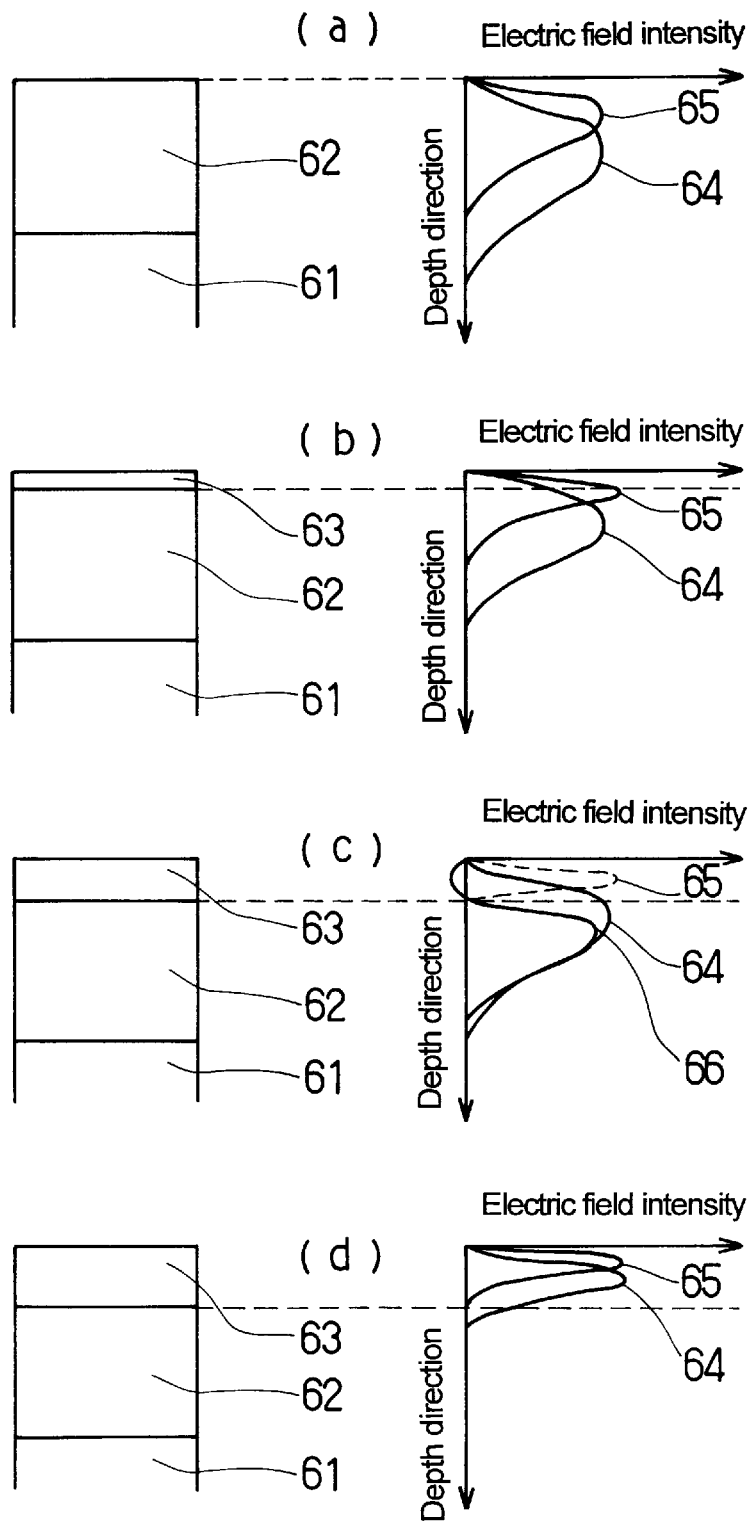
FIGS. 22(a)–22(d) are graphs to illustrate the electric field distribution in the direction of waveguide depth of each optical waveguide mode formed with a layer having a high refractive index thereon.

However, in the case of utilizing a higher-order mode, the problem mentioned above can be solved even when using the same SHG wave. This will be explained based on FIG. 22 that illustrates an electric field distribution in the depth direction of a cross section of a guiding layer. FIG. 22 shows a state of a guide mode in the case of changing a thickness of a layer with a high refractive index in a guiding layer having the layer.

FIG. 22(a) shows basically the same condition as in FIG. 21. In FIG. 22(a), a layer with a high refractive index is not present. FIG. 22 (b) shows a condition that a layer 63 with a high refractive index is relatively thin. In FIG. 22(b), the layer 63 meets a cutoff condition (a condition that a guide mode being confined within the layer does not exist) for a fundamental wave 64 and a SHG 65. In this case, the fundamental wave 64 and the SHG wave 65 propagate within a guiding layer 62, since both the fundamental wave 64 and the SHG wave 65 can not be guided only in the layer 63. However, electric field distributions of the fundamental wave 64 and the SHG wave 65 are drawn to the vicinity of the surface by the layer 63. FIG. 22(b) shows a guiding condition of an optical waveguide using a conventional layer with a high refractive index.

In FIG. 22(c), the layer 63 is thicker than that shown in FIG. 22(b) and meets a cutoff condition for the fundamental wave 64. On the other hand, the layer 63 does not meet the cutoff condition for the SHG wave, which enables propagation of a lower-order mode (in this case, the SHG wave 65 in a fundamental mode). In this case, a confinement effect of the fundamental wave 64 is further improved compared to that in FIG. 22(b). However, conversion efficiency from the fundamental wave 64 to the SHG wave 65 in a fundamental mode extremely decreases, since the SHG wave 65 in a fundamental mode is confined within the layer 63.

As shown in FIG. 22(c), most of SHG waves (in this case, a SHG wave 66 in a first-order mode) in a mode that is one order higher than an order of the mode capable of guiding a wave in the layer 63 propagate in a guiding layer 62. It is remarkable that there is almost no difference between an electric field distribution (FIG. 2(c)) of the guiding layer 62 of the SHG wave 66 and that (FIG. 2(a)) of the SHG wave 65 in a fundamental mode in the case where the layer 63 is not present. On the other hand, a guide mode of the fundamental wave 64 is strong and is drawn to the layer 63. That is to say, while the fundamental wave 64 in a fundamental mode becomes a guide mode having strong confinement, the SHG wave 66 in a higher-order mode hardly changes compared to the case where the layer 63 is not present. As a result, overlap between the both modes increases rapidly as shown in FIG. 2(c). Conversion efficiency from a fundamental wave to a SHG wave greatly can be improved by utilizing this effect.

In FIG. 22(d), the layer 63 is thicker than that shown in FIG. 22(c) and the fulndamental wave 64 can guide a wave in the layer 63. In the case where the fundamental wave 64 can guide a wave in the layer 63, the conversion efficiency decreases greatly, since overlap between the fundamental wave 64 and the SHG wave 65 within the guiding layer 62 is extremely reduced as shown in FIG. 22(d).

That is, in the guiding layer 62 including the layer 63, overlap between the fundamental wave 64 in a fundamental mode and the SHG wave 66 in a higher-order mode increases as shown in FIG. 22(c), thus enabling wavelength conversion at high efficiency.

In order to realize the state shown in FIG. 22(c), some conditions need to be met.

Firstly, it is necessary that the layer 63 is in the state capable of guiding the fundamental wave 64, that is to say, the thickness and the refractive index of the layer 63 meet a cutoff condition for the fundamental wave 64. When the layer 63 meets a guiding condition of the fundamental wave 64, the state showed in FIG. 22(d) is obtained and efficiency in the wavelength conversion decreases.

Secondly, it is necessary that a SHG wave meets the condition that a main peak in an electric field distribution propagates the guiding layer 62 and a sub-peak propagates the layer 63. In order to realize the state shown in FIG. 22(c), the layer 63 should meet the guiding condition of the SHG wave. In the state meeting this condition, it was found that a guide mode having a main peak in the guiding layer 62 was obtained, when the SHG wave in a mode that was one order higher than an order of the mode capable of guiding a wave was guided selectively in the layer 63.

Consequently, in order to realize a wavelength conversion element having high efficiency in the guiding layer 62 including the layer 63, it was found that the layer 63 should be constructed so that the thickness and the refractive index of the layer 63 met a cutoff condition for the fundamental wave and a guiding condition for the SHG wave.

Furthermore, a refractive index of the layer 63 was examined for realizing high efficiency. In order to improve the conversion efficiency of an element, an electric field distribution of the SHG wave needs to be centered in the guiding layer 62. That is to say, an electric field distribution of the layer 63 should be as narrow as possible. In an electric field distribution of the SHG wave, a ratio of an electric field distribution in a layer with a high refractive index (clad) and in a guiding layer (core) depends on the ratio of each refractive index. For example, electric fields in a distribution of a layer with a high refractive index decrease as the refractive index of the layer with a high refractive index for a guiding layer increases. Therefore, in order to obtain an electric field strength in the layer with a high refractive index that is one tenth or less of that in the guiding layer, the refractive index nc of the layer with a high refractive index for the refractive index nf (in the case of a graded refractive index distribution, a maximum refractive index of the guiding layer) of the guiding layer should be nc>1.01 nf.

A layer with a high refractive index that is a monolayer was explained above, but the same effect also can be obtained using a layer with a high refractive index that is a multilayer film. In the case of using a multilayer film, a refractive index distribution in a layer with a high refractive index can be controlled. As a result, the degree of freedom in element design increases, thus enabling manufacture of an element having a high manufacturing tolerance.

A wavelength conversion at high efficiency can be realized, since a mode of a SHG wave propagating in a guiding layer and having large overlap is determined by selecting a wavelength of a fundamental wave.

It was found that a structure of the guiding layer mentioned above was greatly effective for improving the strength for optical damage. An electric field in a part where a SHG wave and a fundamental wave does not overlap decreases, which is caused by increase of overlap between a fundamental wave and a SHG wave within a guiding layer. Optical damage is generated by creating an internal electric field through excitation of impurities within a crystal by a short wavelength light (a SHG light). However, an internal electric field generated by optical damage tends to be stabilized, since a level trapping impurities is excited by the intervention of a fundamental wave. This phenomenon appears significantly at the part where a fundamental wave near an electric field distribution of a SHG wave is present alone. However, in the case of employing a structure according to the embodiment mentioned above, the occurrence of optical damage can be reduced greatly, since the part where a fundamental wave and a SHG wave do not overlap decreases extremely.

The structure of a guiding layer mentioned above is also effective not only in a light wavelength conversion element but also in an optical waveguide guiding two or more lights having a different wavelength at the same time, since overlap of propagating light having a different wavelength is increased, thus improving an interaction.

In order to draw a distribution of a light to the vicinity of the surface, an influence on a guided light can be improved by an element of an electrode or the like integrated on an optical waveguide, thus enabling a structure of an optical integrated circuit device having high efficiency.

The following explanation will be made for a structure of an optical waveguide according to the embodiment including a layer with a high refractive index and a light wavelength conversion element having the structure of an optical waveguide.

A concrete structure of an optical waveguide preferably has an embedded waveguide structure provided with a layer with a high refractive index near the surface of a waveguide.

An optical waveguide having a structure of the embodiment exhibits the following characteristics:

having a focusing property not more than the diffraction limit;

improving confinement of a light in the transverse direction;

having a low propagation loss in a guiding layer and being able to improve efficiency to a high degree; and having a high tolerance for a shape error of an optical waveguide.

Furthermore, an advantage in manufacturing can be obtained in that utilizing an ion exchange facilitates a manufacturing process. In the following embodiment, concrete characteristics are described.

Embodiment 12

Figure 23:
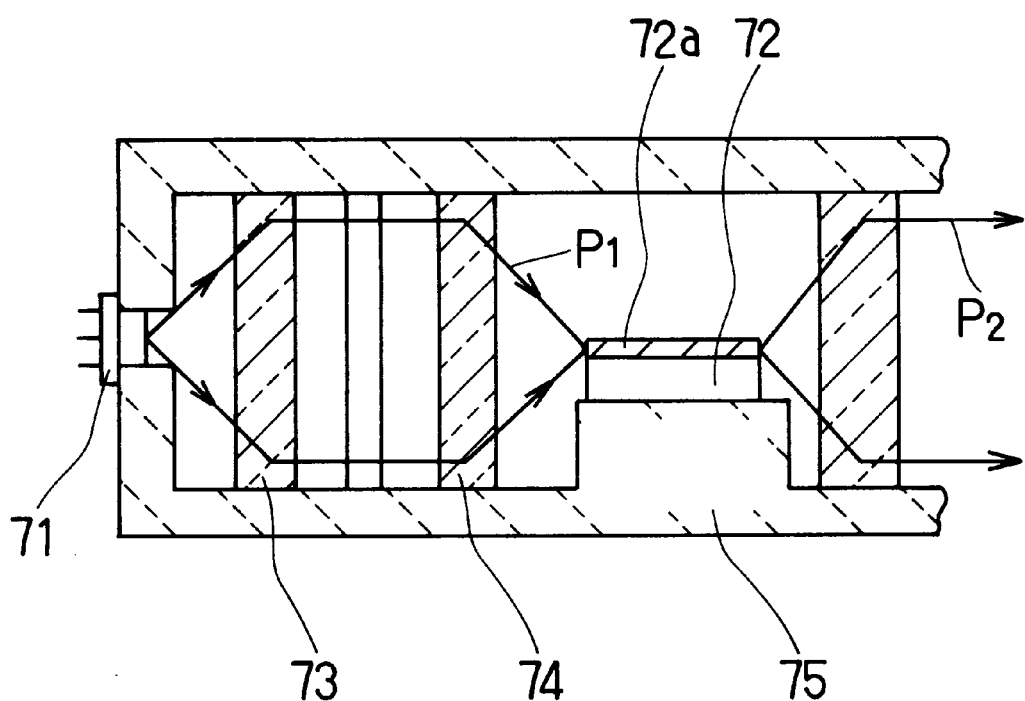
FIG. 23 is a cross-sectional view to illustrate a short wavelength light generator of this invention.

A structure of a short wavelength light generator will be explained. As shown in FIG. 23, a short wavelength light generator includes a semiconductor laser 71 and a light wavelength conversion element 72. A fundamental wave $P_1$ emitted from the semiconductor laser 71 enters into a guiding layer 72a formed on the light wavelength conversion element 72 through lenses 73 and 74. Each part is fixed on a mount 75.

Figure 24:
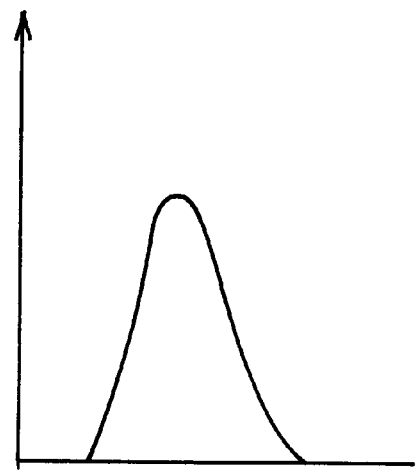
FIGS. 24(a) and 24(b) are graphs to illustrate focus spots of light propagating in the optical waveguide.
Figure 24:
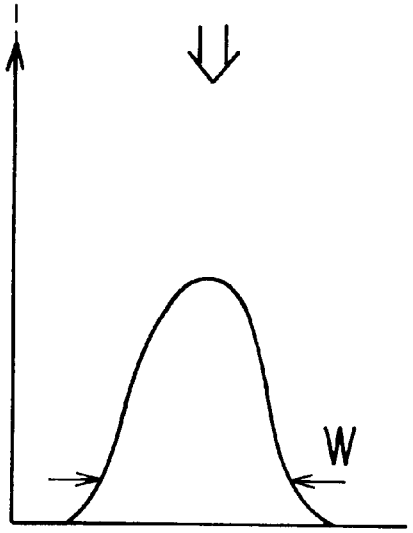
Figure 24:
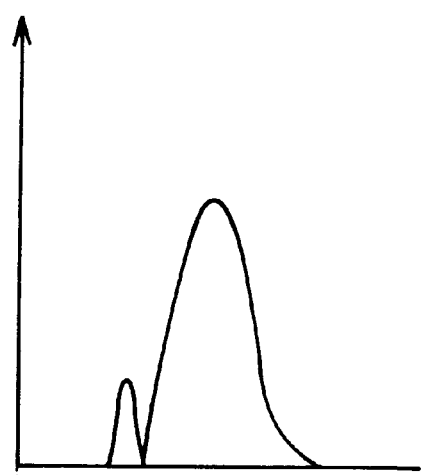
Figure 24:
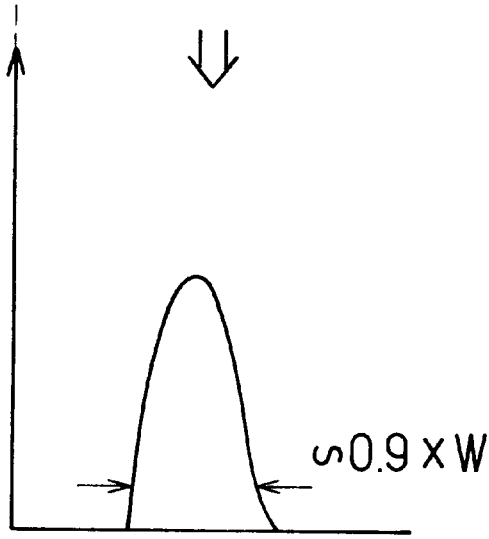

An incident fundamental wave $P_1$ propagates within the guiding layer 72a in a TE00 mode and is converted to a TE10 mode that is a higher-order mode of a higher harmonic. This higher harmonic is emitted from the light wavelength conversion element 72 and is used as a short wavelength laser beam. A mode profile of the TE10 mode of a higher harmonic propagating within the guiding layer 72a is remarkable. The TE10 mode has two peaks in an intensity distribution, for example, as shown in FIG. 24(b), since the TE10 mode is a higher-order guide mode. In the two peaks, the larger one is referred to as a main peak and the smaller one as a sub-peak.

The TE10 mode having a sub-peak forms a focus spot having a similar sub-peak with that in a guide mode when focusing by a focusing optical system, which becomes a problem when focusing a single peak near the diffraction limit.

A method for nearly eliminating the sub-peak that is a problem in gathering a higher harmonic was newly found. The method is to narrow a width of the sub-peak in a state of a guide mode sufficiently for the diffraction limit of a focusing optical system used for focusing. That is to say, it was found that an influence on a focus spot caused by the sub-peak was eliminated by restraining the sub-peak to the width of the resolving power or less of a focusing optical system.

In an experiment, a higher harmonic having a wavelength of 425 nm was gathered using a condenser lens (NA=0.95), wherein the diffra-action limit of a light in the air was about 0.34 μm. In the case where the guiding layer 72a was designed so as to have a width of a sub-peak of 0.32 μm or less, no sub-peak was observed at a focus spot obtained. That is to say, in the case where a width of a sub-peak corresponded to the diffraction limit (0.8×λ/NA) or less of a light in the air, it was found that a higher-order guide mode having a sub-peak did not affect the focus spot in focusing and was utilized effectively. As a result, the efficiency of outputs was maintained at 80% or more, even if a beam forming was carried out.

In the case of using a guided light with a sub-peak having a width corresponding to the diffraction limit or less, it was found that a superresolution effect capable of focusing a beam at the diffraction limit or less of a lens was obtained. Shapes of a focus spot in the case of gathering a TE00 mode and a TE10 mode are shown in FIG. 24(a) and FIG. 24(b) respectively. A value (0.8×λ/NA) close to the diffraction limit of the lens was obtained when gathering a TE00 mode. On the other hand, since a beam shape in the side having a sub-peak was steep, a light in a higher-order TE10 mode with a sub-peak was focussed in a width of the focus spot about up to 90% of the diffraction limit. As a result, it was found that a superresolution effect was obtained.

According to the experiment, it was proved that a width of a focus spot was narrower than the diffraction limit (0.8×λ/NA) of a lens used (numerical aperture: NA) by restraining a width of a sub-peak at the diffraction limit or less (~0.8×λ/NA) in the air of a light having a wavelength λ in the air. As mentioned above, it was proved that a further smaller focus spot was obtained by gathering a guide mode with a sub-peak having a width corresponding to the diffraction limit or less.

Furthermore, a relationship between the width of a sub-peak and a focus spot was examined in detail and the following results were obtained:

1) in the case of a width of a sub-peak: <0.8λ, a focusing property (a superresolution effect) not more than the diffraction limit was obtained;

2) in the case of a width of a sub-peak: 0.8λ(1+0.2 (1/NA−1))−0.8* λ(1+0.5(1/NA−1)), a focus spot that is almost same as the diffraction limit was obtained; and 3) in the case of a width of a sub-peak : 0.8λ(1+0.7(1/NA−1))~, a sub-peak appears at a focus spot and the focusing property degrades. That is to say, in order to prevent the degradation of a focusing property by a sub-peak, it is preferable that a width of the sub-peak should be restrained at least not more than about 0.8×λ(1+0.5(1/NA−1)).

Designing the guiding layer 72a so as to have a width of a sub-peak of not more than 0.8×λ is very efficient, since a focus spot further smaller than the diffraction limit of a condenser lens can be obtained. On the other hand, in the case where a width of a focus spot is larger than about the diffraction limit (0.8×λ/NA) of a lens used, the focus spot has almost the same shape as a guide mode and becomes a focus spot with 2 peaks including a sub-peak, thus obtaining no focus spot with a single peak.

In this embodiment, a guide mode was converted to a higher-order mode with a sub-peak having a width not more than the diffraction limit as a short wavelength light source when converting a wavelength of a fundamental wave to that of a higher harmonic. However, the same effect can be obtained by focusing a guided light having a sub-peak. For example, a periodic grating structure is provided on a guiding layer and a guided light in a TE00 mode is converted to a guided light in a TE10 mode. Then, by focusing this, a focus spot not more than the diffraction limit can be obtained by a superresolution effect.

In this embodiment, a TE10 mode having one sub-peak was used, but the same result also can be obtained by using a further higher-order guide mode when the width of the sub-peak corresponds to the diffraction limit. For example, a TE20 mode having sub-peaks in both sides of a main peak is effective, since the superresolution effect is further improved and a further smaller spot therefore can be obtained.

A TE01 mode and a TE02 mode having sub-peaks not only in the depth direction but also in the width direction and a TE11 mode and a TE22 mode having sub-peaks in both depth and width directions are effective, since a further smaller focus spot can be obtained.

In this embodiment, a TE mode was used, but the same effect also can be obtained by using a TM mode.

Embodiment 13

Figure 25:
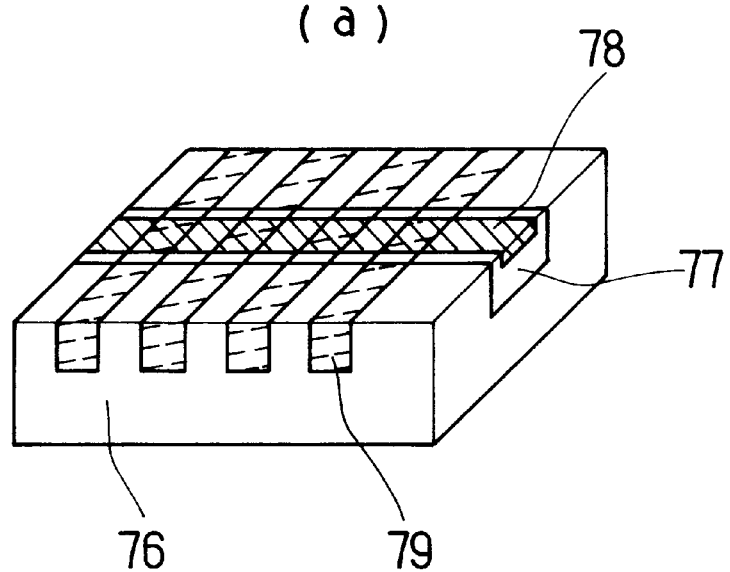
FIG. 25(a) is a perspective view to illustrate an optical wavelength conversion element of this invention and FIG. 25(b) is a cross-sectional view thereof.
Figure 25:
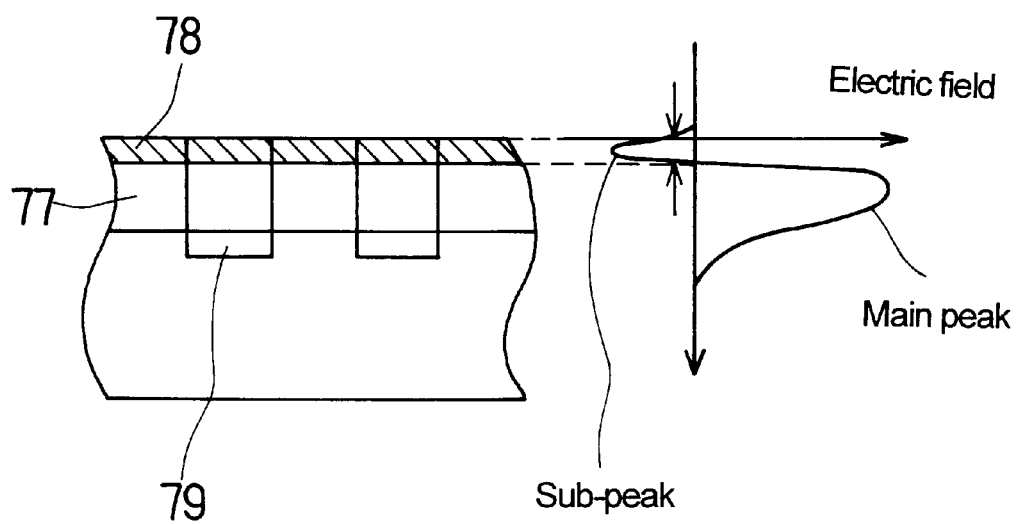

A light wavelength conversion element that is a basic element of a short wavelength light generator will be explained. As shown in FIG. 25, a waveguide 77 is formed in the vicinity of surface of a LiNbO$_3$ substrate 76 of an X-plate in a short wavelength light generator. A polarization inversion structure 79 is formed for phase matching in the LibO$_3$ substrate 76 so as to traverse the waveguide 77 periodically. A layer 78 with a high refractive index is formed in the vicinity of the surface of the waveguide 77. The waveguide 77 has a width of 4 $\mu$m and a depth of 2.5 $\mu$m, and the layer 78 has a width of 3 $\mu$m and a depth of 0.2 $\mu$m As shown in FIG. 25($a$), the layer 78 is formed along the waveguide 77 almost in its center part.

The waveguide 77 is formed by an annealing step after proton exchange of LiNbO$_3$, and a part of Li within the LiNbO, crystal is exchanged with H, which is expressed by Li$_{(1-x)}$H$_x$NbO$_3$(0<x<1). The x is an exchange rate in the proton exchange. It is preferable that a value of the x decreases to 0.3 or less by the annealing step.

The layer 78 also is formed through a proton exchange. In order to obtain a refractive index higher than that in the waveguide 77, the proton exchange rate x is higher than that of the waveguide 77. Specifically, the x is preferably 0.6 or more. In such a light wavelength conversion element, quasi-phase matching of a fundamental wave having a wavelength of 850 nm entered to the waveguide 77 in a TE00 mode with a higher harmonic in a TE10 mode occurs within the waveguide 77.

In this light wavelength conversion element, a principle that a fundamental wave can be converted to a higher harmonic at high efficiency will be explained. As described above, it was shown that overlap between a fundamental wave and a higher harmonic increased in a waveguide provided with the layer, and confinement of a guided light was improved, thus enabling wavelength conversion at high efficiency. However, this effect was further highlighted by using a structure according to this embodiment, and a further high conversion efficiency was obtained.

Figure 26:
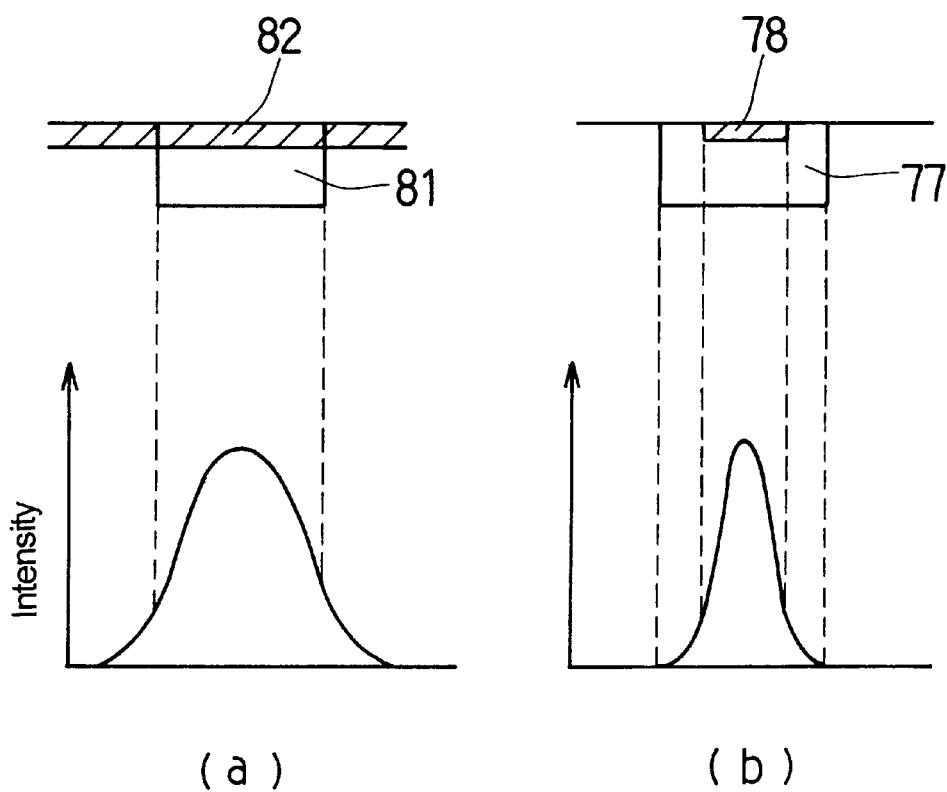
FIGS. 26(a) and 26(b) are cross-sectional views to illustrate the waveguide mode distribution in the waveguide width direction of an optical wavelength conversion element of this invention.

A distribution of a guide mode in a light wavelength conversion element according to this embodiment is shown in FIG. 26. FIG. 26($a$) shows a mode distribution in a waveguide 81 provided with a slab layer with a high refractive index on its surface for the purpose of making a comparison. A distribution of a guide mode in a stripe waveguide 77 with a high refractive index is shown in FIG. 26($b$). Electric field distributions in the depth direction are almost same in both FIGS. 26($a$) and ($b$). On the other hand, in an electric field distribution of a waveguide in the width direction, the width of the electric field distribution becomes narrow in FIG. 26($b$). Thus, it can be found that a further stronger confinement was attained.

As a result of the improvement of the confinement, the overlap between a fundamental wave and a higher harmonic in FIG. 26($b$) also increased and the conversion efficiency became 1.5 times of the waveguide 81 provided with a slab layer 82 with a high refractive index shown in FIG. 26($a$). As a result, the conversion efficiency was improved twice or more compared to a light wavelength conversion element provided with the slab layer 82.

Next, a mode profile of a higher-order higher harmonic will be described. A TE10 mode has two intensity peaks in the depth direction of a waveguide and a sub-peak in the side of the layer. The electric field distribution in the sub-peak does not contribute to the conversion from a fundamental wave to a higher harmonic due to a high proton exchange rate and low nonlinearity within the layer. Therefore, it is preferable that the existence of an electric field distribution at a sub-peak is limited as much as possible. As mentioned above, it is preferable that a refractive index nc of the layer is not less than 1.01 times of a refractive index nf of a waveguide.

Next, a thickness of the layer will be explained. As a film thickness of the layer increases, electric fields distributed in the layer increase. Therefore, it is preferable to limit a film thickness $D_2$ of the layer. In order to improve efficiency to a high degree, it is preferable that a thickness ($D_1$) of the waveguide is at least twice the thickness ($D_2$) of the layer ($D_1$>2×$D_2$). In the case of $D_1$<2×$D_2$, the conversion efficiency decreases below a half of the maximum. In view of a focusing property, a relationship of a refractive index of the layer and that of a waveguide will be explained now. In focusing a guided light having a sub-peak using a lens system, the focusing property degrades according to a size of the sub-peak. As mentioned above, in order to obtain a focus spot that is the same as or less than the diffraction limit in the case where the focus spot is a single spot, it is necessary that the sub-peak of a guide mode is decreased to the diffraction limit of a condenser lens or less. Therefore, it is preferable that a thickness ($D_2$) of the layer is defined. The width of a sub-peak is defined according to a thickness of the layer and a refractive index and is almost same as a thickness of the layer. Consequently, in order to restrain the width of the sub-peak at the diffraction limit or less, it is necessary to restrain the thickness of the layer with a high refractive index at the diffraction limit or less of a higher harmonic. Specifically, in the case of using a lens (NA=about 0.6), a focusing property degraded, wherein a higher harmonic had a wavelength of 425 nm and a thickness of the layer was thicker than 0.6 $\mu$m–0.7 $\mu$m ($D_2$>(0.7 $\mu$m–0.6 $\mu$m)). When the $D_2$ was about 0.5 $\mu$m, the focusing property is improved greatly. In the case of $D_2$<0.4 $\mu$m, a focusing property that was the diffraction limit or less was obtained. In the case of calculating the diffraction limit by supposing NA as 1 and a wavelength as 425 nm, about 0.34 $\mu$m was obtained as a value of the diffraction limit. Therefore, it can be found that an outgoing beam excellent in the focusing property can be obtained when $D_2$ is substantially less than the diffraction limit.

A width ($W_2$) of the layer will be explained as follows. High efficiency can be obtained by improving overlap between guide modes and a confinement effect. In order to improve the efficiency to a high degree, the width ($W_2$) of the layer is preferably narrower than a width ($W_1$) of the waveguide. As mentioned above, this enables the high efficiency to be further improved by improving confinement in the traverse direction of the waveguide. In the case where $W_2$ was not less than $W_1$, an electric field distribution of a guide mode propagating in the waveguide was almost the same as the slab guiding layer with a high refractive index and improvement of the efficiency was not found. Improvement of the conversion efficiency was confirmed when $W_2<0.9 \times W_1$, and the conversion efficiency improved to 1.5 times or more when $W_2<0.8 \times W_1$.

It was confirmed that the structure in which a width of the layer is narrower than that of the waveguide functions effectively not only in a method for forming the layer through a proton exchange within the waveguide formed through a proton exchange but also in a method depositing dielectrics with a high refractive index on the surface of the waveguide.

A refractive index of the layer will be explained. A proton exchange part is expressed by $Li_{(1-x)}H_xO_3 (0<x<1)$, and a part of Li within a lANbO$_3$ crystal is exchanged with H. X is an exchange rate in the proton exchange.

Both the waveguide and the layer are formed through a proton exchange and the difference between them is the exchange rate. The value of x right after the proton exchange is about 0.9, which is very high. The value of x can be controlled by an annealing step. In order to recover nonlinearity, it is needed to decrease the exchange rate to 0.5 or less. The exchange rate is proportional to a refractive index of a proton exchange layer, and the refractive index decreases as the exchange rate decreases.

A waveguide in a light wavelength conversion element needs strong confinement and high nonlinearity. However, the refractive index decreases as the nonlinearity recovers by an annealing step, resulting in weak confinement. In order to recover the nonlinearity up to about 80% of a substrate, it is needed to decrease the value of the x to about 0.3. In this state, the refractive index of a waveguide is low and it becomes difficult to confine a fundamental wave sufficiently. However, in the case where a layer with a high refractive index was formed in the upper part of the waveguide, confinement of the waveguide was improved, which enabled formation of an optical waveguide having high nonlinearity. In order to improve the confinement of the waveguide, it is necessary to improve the ion exchange concentration in the layer. It is preferable that the ion concentration is twice or more of that in the waveguide.

In this embodiment, a proton exchange layer was used as a layer with a high refractive index, but the same effect also can be obtained by using dielectrics with a high refractive index. In a proton exchange, the layer was formed inside of the waveguide. In the case of using dielectrics deposited as a layer with a high refractive index, it is preferable that a waveguide is formed by depositing dielectrics selectively on the surface of the waveguide.

$Nb_2O_5$ having a refractive index that is higher than that of $LiNbO_3$ was used as a dielectric. The $Nb_2O_5$ having a thickness of 200 nm was deposited on the surface of the waveguide by a sputtering technique and was formed along the waveguide in its center part. In processing a layer with a high refractive index into a ridge-shape by patterning on the surface of the waveguide, unevenness was formed slightly on the ridge-shaped side. As a result, a propagation loss of an optical waveguide increased. Therefore, it was found that the waveguide formed through an ion exchange was more excellent in reducing propagation loss of a guided light.

A substrate of an X-plate was used in this embodiment, but a Y-plate, a Z-plate or a substrate in which a crystal axis is inclined with respect to the surface may be used. In the case of using the Z-plate or the substrate in which a crystal axis is inclined with respect to the substrate surface, a deep polarization inversion structure can be formed easily, thus improving the efficiency to a high degree.

In this embodiment, the polarization direction of a TE mode was utilized in order to match with the polarization direction of a waveguide of a usual semiconductor laser. The waveguides can be coupled to each other at a low loss by using an optical waveguide having the same polarization direction with a semiconductor laser. An optical waveguide of a TM mode polarization also can be used. An optical waveguide of a TM mode enables the decrease of a coupling loss by controlling the polarization direction by a $\lambda/2$ plate.

Further, in this embodiment, a light wavelength conversion element using an optical waveguide was explained. The optical waveguide of the embodiment also is effective in the other light waveguide element. An electric field distribution of a guided light propagating in the optical waveguide is drawn strongly to the vicinity of the surface by forming a layer with a high refractive index on the optical waveguide. Consequently, a guided light can be affected strongly by a planar electrode formed on a waveguide and a grating element, thus obtaining modulation and diffraction effects having high efficiency.

A $LiNbO_3$ substrate was used as a substrate in this embodiment, but the same element can be manufactured by using LiNbO, doped with MgO, Nb, Nd or the like, $LiTaO_3$, a $LiTa_{(1-x)}Nb_xO_3 (0 \leq x \leq 1)$ substrate that is a mixture thereof and KTP($KTiOPO_4$). A light wavelength conversion element having high efficiency can be manufactured, since $LiTaO_3$, $LiNbO_3$ and KTP have high nonlinearity.

Embodiment 14

Figure 27:
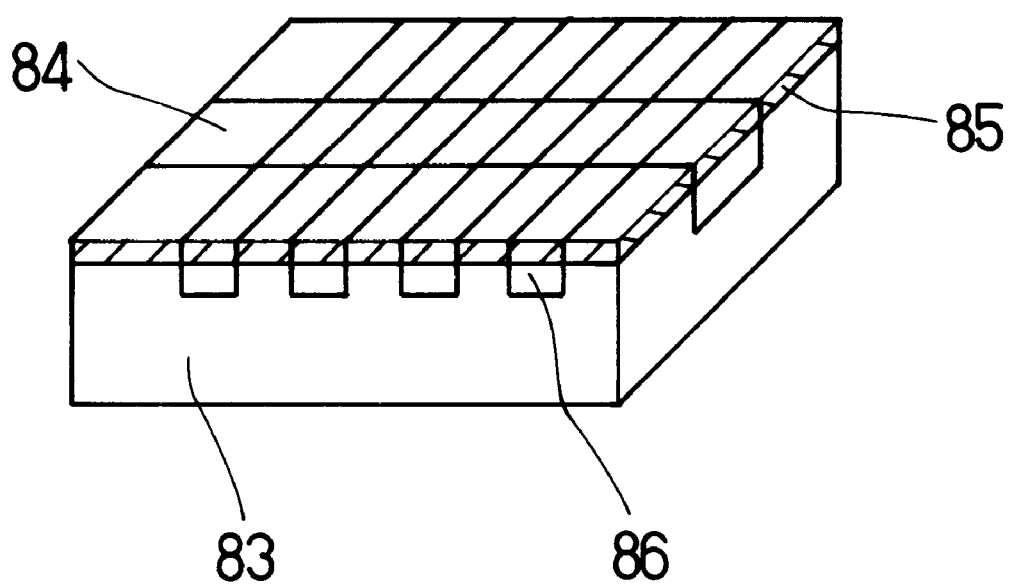
FIG. 27 is a perspective view to illustrate an optical wavelength conversion element of this invention.

The following explanation will be made as to the case of forming a layer with a high refractive index through an ion exchange in a structure of a light wavelength conversion element according to this embodiment. A structural drawing of a light wavelength conversion element according to this embodiment is shown in FIG. 27. A stripe waveguide 84 is formed in the vicinity of the surface of a $LiNbO_3$ substrate 83 of an X-plate as shown in FIG. 27. In the vicinity of the surface of the waveguide 84, a layer 85 with a high refractive index is formed through a proton exchange. A polarization inversion structure 86 is formed for phase matching so as to traverse the waveguide periodically. The layer 85 formed through an ion exchange is excellent in the following points:

having an excellent homogeneity in an inplane film thickness and being capable of controlling inplane unevenness at ±0.1% or less;

having excellent control of a film thickness and being capable of controlling the film thickness at ±0.01 μm or less;

having a low propagation loss for both a higher harmonic and a fundamental wave; and having little distortion or the like at a boundary with the waveguide 84 and providing neither propagation loss nor inplane distribution.

Furthermore, it is necessary that the layer has a higher refractive index than that of the substrate. A low propagation loss for a fundamental wave and a higher harmonic also is required. Especially, a propagation loss increases remarkably, since a higher harmonic has a short wavelength of about 400 nm. For example, $Nb_2O_5$, $TiO_2$ or the like is used usually as a dielectric with a high refractive index. However, in the case of using such a dielectric, a propagation loss for a light having a short wavelength tends to increase due to the existence of an absorption end of these dielectrics near the light having the short wavelength. Then, formation of the layer through an ion exchange was tried. An ion exchange layer is advantageous in that the characteristics of the ion exchange layer are almost the same as a permeation characteristic of the substrate and a propagation loss for a short wavelength light hardly increases.

An ion exchange is used in this embodiment and can be applied easily to a ferroelectric crystal. For example, in the case where a proton exchange that is a kind of an ion exchange was carried out in $LiNbO_3$, the change of a refractive index obtained was about 0.1 that is very large value and therefore the layer can be formed easily.

In addition, the ion exchange has a characteristic that a layer having a high homogeneity can be formed, since control of a depth in the ion exchange is easy. For example, in the case of forming the layer by depositing dielectrics using a sputtering technique or the like, inplane homogeneity is about ±1–3% in a usual device. On the other hand, a thickness can be controlled to 0.01 $\mu$m or less by a diffusion temperature and time control, since the ion exchange is formed by diffusion. The inplane homogeneity also can be controlled to the same degree as the thickness control. A high precision of 2 digits or more is obtained compared to deposition such as sputtering or the like. Specifically, characteristics between an element using a $Nb_2O_5$ sputter film and a light wavelength conversion element formed through a proton exchange were compared. As a result, it was found that a value of homogeneity in the element formed through a proton exchange was an order of magnitude higher than that in the element using a $Nb_2O_5$ sputter film and the conversion efficiency of a SHG wave in the element formed through a proton exchange was twice or more higher than that in the element using a $Nb_2O_5$ sputter film.

A method for restraining a sub-peak of a guide mode mentioned above to the diffraction limit or less of a guided light will be explained. A width of a sub-peak in a guide mode is determined by a thickness of the layer and a refractive index. However, the width of the layer needs to be restrained to at least a width of the diffraction limit of a guided light or less, since the width of the sub-peak can not be narrower than the thickness of the layer. Furthermore, in order to restrain the width of the sub-peak to the diffraction limit or less, the refractive index of the layer is needed to be 1.01 times or more of that of the guiding layer in addition to the thickness of the layer with a high refractive index.

In the case where the width of the layer with a high refractive index is narrower than that of the guiding layer, the width of the sub-peak increases greatly compared to the width of the layer when the refractive index of the layer became less than 1.01 times of that in the guiding layer. As a result, a focusing property of higher harmonic outputs was degraded and focusing up to the diffraction limit became difficult.

Furthermore, a relationship between a width of the sub-peak and a focusing property was examined by controlling the refractive index and the thickness of the layer. As a result, the same result as shown in Embodiment 12 was obtained. It was found that an excellent beam in a focusing property was obtained by setting the width of the sub-peak at the diffraction limit of the guided light or less.

Consequently, it was found that a beam excellent in a focusing property was obtained by setting the film thickness of the layer with a high refractive index to the diffraction limit of the guided light or less.

Next, the point that a light wavelength conversion element of the embodiment is excellent in tolerance for a production error will be explained. A light wavelength conversion element requires meeting the conditions for phase matching of a fundamental wave and a higher harmonic when the fundamental wave is converted to a higher harmonic within the waveguide. The conditions for phase matching are conditions for equalizing the phase velocity of a fundamental wave and a higher harmonic. The refractive index between a fundamental wave and a higher harmonic needs to be controlled.

In the case of using an optical waveguide, the conditions for phase matching should be met throughout the entire length of the optical waveguide. However, the tolerance in the conditions for phase matching was considerably low. In the case of forming a light wavelength conversion element with a shape of an actual optical waveguide, a width of the waveguide, change in a refractive index and the like needed to be controlled to the extreme limit. For example, in a light wavelength conversion element of a quasi-phase matching type using $LiNbO_3$, a width of a waveguide was needed to be controlled to 4 $\mu$m ±0.1 or less throughout the entire length of 10 mm, which caused a decrease of production yields.

Figure 28:
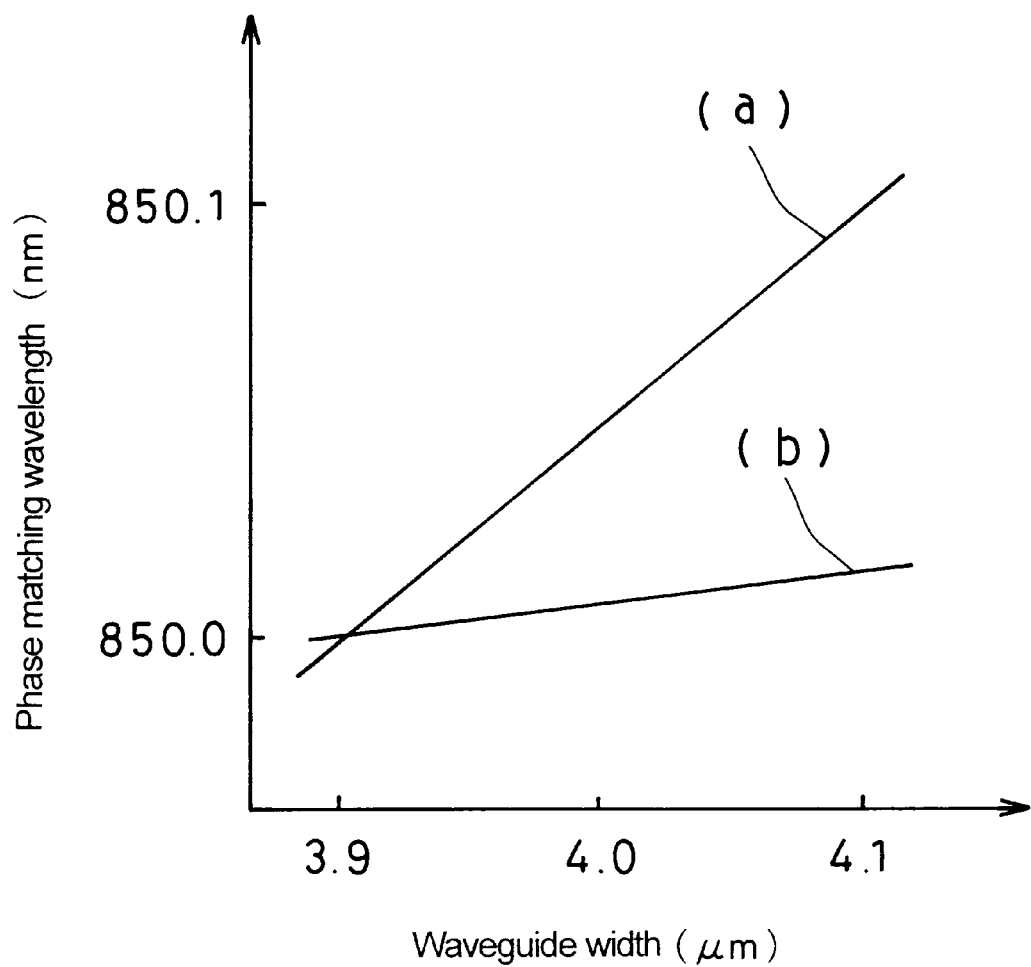
FIG. 28 is a graph to illustrate the relationship between the optical waveguide width and the phase matching wavelength.

This was caused by the great variation of a phase matching wavelength for a width of the waveguide as shown in FIG. 28($a$). The tolerance in a phase matching wavelength in a light wavelength conversion element is about 0.1 nm when the entire length of the element is 10 mm. For example, in the case of shifting the width of the waveguide by 0.1 $\mu$m, the width is out of the tolerance in a phase matching wavelength. A phase matching wavelength differs in each part when the width of the waveguide shifts slightly in the propagation direction. In this case, higher harmonics are generated only at parts of the waveguide having a width meeting conditions for phase matching when a fundamental wave having a specific wavelength entered into the waveguide. Consequently, conversion efficiency decreases, since only a part of polarization inversion parts formed throughout the entire area of the waveguide contributes to the light wavelength conversion. The same characteristics also were found in an optical waveguide in which a slab layer with a high refractive index was formed on the surface of the waveguide. The production error of the optical waveguide was ±0.1 $\mu$m or less, which was very rigorous.

However, in a light wavelength conversion element with an optical waveguide structure of this embodiment, it was found that variation of the phase matching wavelength for a width of a waveguide is small as shown in FIG. 28($b$). That is to say, it was found that the tolerance of the width of the waveguide that met a tolerance of a phase matching wavelength increased up to ±0.5 $\mu$m, i.e. the tolerance was broadened up to 5 times of the conventional tolerance. As a result, the conversion efficiency of the light wavelength conversion element whose property has been decreased conventionally by a production error of an optical waveguide was improved rapidly by twice or more.

A substrate of an X-plate was used in this embodiment, but a Y-plate, a Z-plate or a substrate in which a crystal axis is inclined with respect to the surface may be used. In the case of using the Z-plate or the substrate in which a crystal axis is inclined with respect to the substrate surface, a deep polarization inversion structure can be formed easily, thus further improving the efficiency to a high degree.

In this embodiment, the polarization direction of a TE mode was utilized in order to match with the polarization direction of a waveguide of a usual semiconductor laser. The waveguides can be coupled to each other at a low loss by making an optical waveguide have the same polarization direction with a semiconductor laser. A waveguide of a TIM mode polarization also can be used. A waveguide of a TM mode enables decrease of a coupling loss by controlling the polarization direction by a λ/2 plate.

Further, in this embodiment, a light wavelength conversion element using an optical waveguide was explained. The optical waveguide of the embodiment also is effective in the other light waveguide element. An electric field distribution of a guided light propagating in the optical waveguide is drawn strongly to the vicinity of the surface by forming a layer with a high refractive index on the optical waveguide. Consequently, a guided light can be affected strongly by a planar electrode formed on a waveguide and a grating element, thus obtaining modulation and diffraction effects having high efficiency.

A $LiNbO_3$ substrate was used as a substrate in this embodiment, but the same element can be manufactured by using $LiNbO_3$ doped with MgO, Nb, Nd or the like, $LiTaO_3$, a $LiTa_{(1-x)}Nb_xO_3 (0 \leq x \leq 1)$ substrate that is a mixture thereof and $KTP(KTiOPO_4)$. A light wavelength conversion element having high efficiency can be manufactured, since $LiTaO_3$, $LiNbO_3$ and KTP have high nonlinearity.

Embodiment 15

In this embodiment, a structure of another light wavelength conversion element will be explained. In another light wavelength conversion element, a periodic polarization inversion part 94 and a waveguide 92 are formed on a $MgO:LiNbO_3$ substrate 91 of an X-plate. The $MgO:LiNbO_3$ substrate 91 was cut so that a Z axis of a crystal was inclined to the surface of the substrate at 3°. In the case of using a substrate with a crystal axis inclining, a structure having the deep polarization inversion part 94 can be formed, thus forming a light wavelength conversion element having high efficiency. The structure is enabled, since a polarization inversion part 94 is formed along the Z axis of the crystal and the polarization inversion part 94 is formed from the substrate surface into an inside of the substrate. Then, a light wavelength conversion element shown in FIG. 29 was formed using this property.

FIG. 29(b) shows a cross-sectional view in which the substrate is cut along the waveguide 92. As shown in FIG. 29(b), the polarization inversion part 94 is formed within the substrate. The polarization inversion part 94 is formed from a part near a boundary between a layer 93 with a high refractive index on the surface and the waveguide 92 into the inside of the substrate so that the structure of the polarization inversion part does not exist inside of the layer 93. As a result, high efficiency of the light wavelength conversion element can be obtained. The reason will be explained as follows.

Conversion efficiency of a light wavelength conversion element depends on overlap between guided lights (a fundamental wave and a higher harmonic) propagating in a structure of the polarization inversion part 94 and the waveguide 92 as mentioned above. However, the phase of an electric field in the higher harmonic is reversed in the layer 93 and in the waveguide 92 in the electric field distribution, since a higher-order guide mode (a TE10 mode) is used as a higher harmonic in order to obtain high efficiency. Consequently, the efficiency of converting to higher harmonics is decreased by the overlap in the layer.

Figure 29:
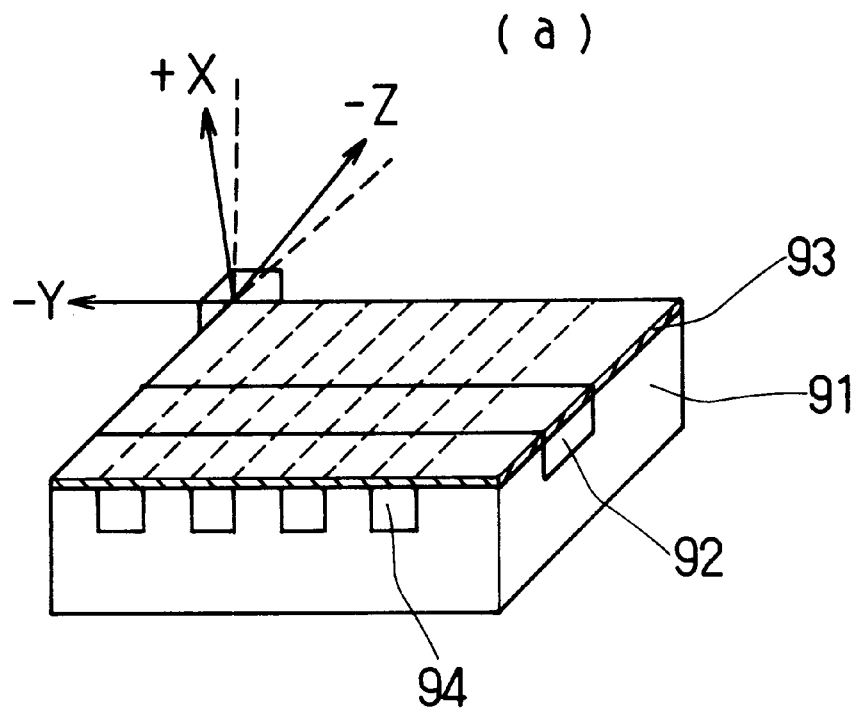
FIG. 29(a) is a perspective view to illustrate an optical wavelength conversion element of this invention and FIG. 29(b) is a cross-sectional view thereof.
Figure 29:
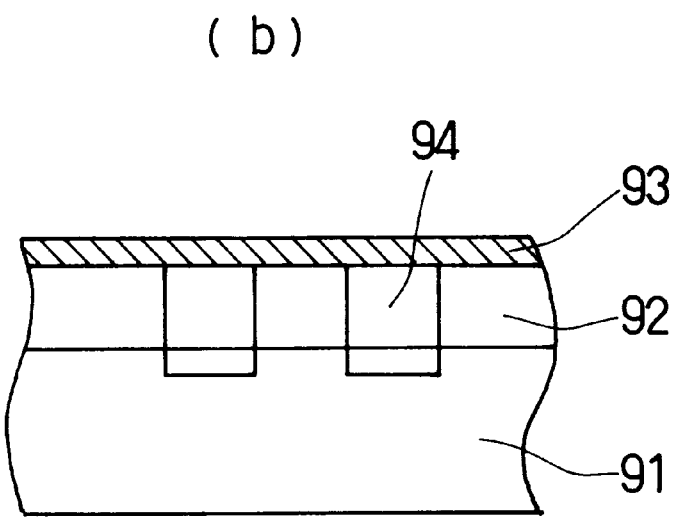

In order to prevent the decrease mentioned above, it is necessary that the overlap in the layer 93 does not affect the wavelength conversion. As shown in FIG. 29, a light wavelength conversion element can be formed so that selectively only the layer 93 does not meet conditions for phase matching by removing the structure of the periodic polarization inversion part 94 in the layer 93, thus obtaining high efficiency of the light wavelength conversion element.

In this embodiment, a crystal with an angle for the crystal axis of 3° was used. However, crystals with a crystal axis at 5° or less also can be used, since a structure having a deep polarization inversion part can be formed. Especially, the inclination angle is preferably 0.5°–3°, since a usable area increases in the case where a polarization inversion part has such a small inclination angle.

Embodiment 16

Figure 30:
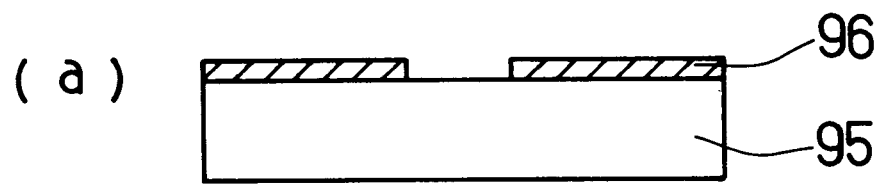
FIGS. 30(a)–30(d) are cross-sectional views of a substrate, illustrating a method for producing an optical waveguide for an optical wavelength conversion element of this invention.
Figure 30:
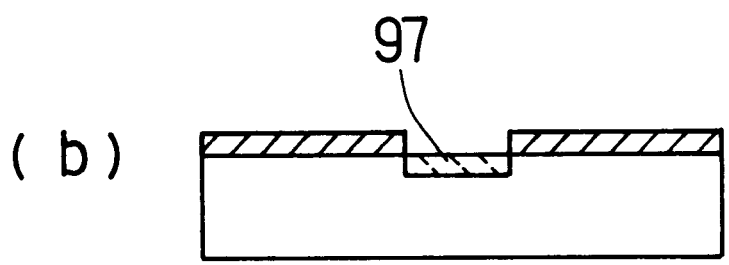
Figure 30:
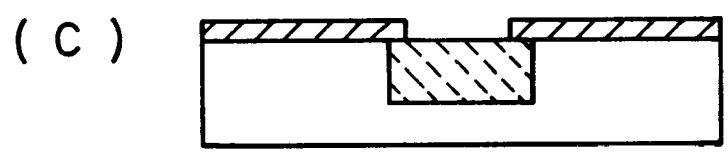
Figure 30:
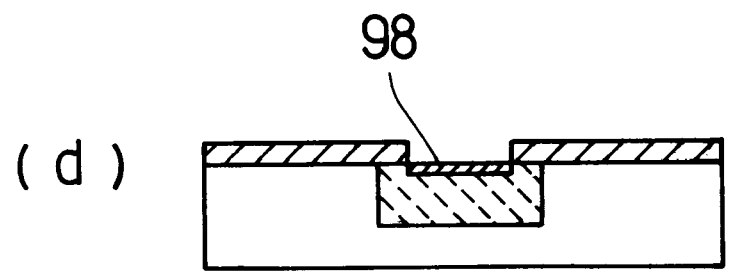

A method for manufacturing an optical waveguide in a light waveguide conversion element will be explained. The explanation will be made for formation of an optical waveguide using a proton exchange that is a kind of an ion exchange referring to FIG. 30.

FIG. 30(a) shows a process forming a waveguide pattern having a width of 4 μm by depositing a Ta film 96 on a surface of a $LiNbO_3$ substrate 95 and using a photolithographic method and dry etching. After this process, the substrate 95 was annealed in pyrophosphoric acid, thereby exchanging Li in a crystal at a non-mask part and proton ($H^+$) in the acid, thus forming a first proton exchange part, i.e. a waveguide 97 as shown in FIG. 30(b). As a next step, the proton exchange part was annealed, thus increasing the volume of an ion exchange part as shown in FIG. 30(c). Then, the substrate 95 was annealed in pyrophosphoric acid again, thus forming a second proton exchange part 98 at a non-mask part, i.e. a layer with a high refractive index. Further, fine adjustment was carried out for a thickness of the layer 98 by an annealing step at a low temperature of 160° C. or less, thus forming an optimal waveguide structure.

The first proton exchange part 97 was formed so as to have a thickness of about 0.2 μm by conducting a proton exchange at 200° C. for about 6 minutes. Then this was annealed at 200° C. for about 60 minutes, thus being enlarged so as to have a depth of an exchange layer of about 2.5 μm and a width of 5 μm or more. As a result, a waveguide was obtained. A proton exchange rate of the waveguide is decreased by the annealing step and nonlinearity is recovered.

By using a Ta excellent in an oxidation resistance in a mask, a proton exchange as well as a change in the film quality by annealing steps thereafter were not observed. A layer with a high refractive index was formed inside of the waveguide, when a proton exchange is conducted again using the same mask.

A layer with a high refractive index formed by the second ion exchange was a layer having a narrower width than that of the waveguide, since both width and depth of the waveguide had been enlarged by an annealing step.

Furthermore, it was found that a propagation loss was decreased without changing the characteristics of the waveguide by annealing the waveguide formed at a low temperature of 160° C. or less. By annealing at a low temperature, diffusion of the first and second ion exchange parts was restrained to a slight level and at the same time the propagation loss of the waveguide was decreased by the annealing.

The characteristics of the optical waveguide manufactured were examined. A fundamental wave having a wavelength of 850 nm entered into the waveguide and a mode distribution of a guided light was examined. The distribution of a guide mode was measured by observing an NFP (a near-field pattern) of the guided light, wherein the width and depth of the waveguide are 4 μm and 2 μm respectively. The measurement was conducted on each of the following optical waveguides manufactured by the method mentioned above: (1) an optical waveguide having a linear layer with a high refractive index; (2) an optical waveguide not having a layer with a high refractive index; and (3) an optical waveguide having a slab layer with a high refractive index. The results are shown in Table 1 below. In Table 1, a width of a mode shows a width when an intensity distribution is $1/e^2$.

TABLE 1

| Shape of a layer with a high refractive index | (1) Linear Layer | (2) No Layer | (3) Slab Layer |
| --- | --- | --- | --- |
| Thickness of a guide mode | 1.7 μm | 2.5 μm | 1.8 μm |
| Width of a guide mode | 3 μm | 4 μm | 3.5 μm |

From the results mentioned above, it was found that an optical waveguide having a high power density was formed, since confinement of the optical waveguide was improved in both the depth and width directions by providing a linear layer with a high refractive index.

A property capable of changing an electric field distribution of a guide mode according to the propagation direction of the waveguide can be obtained when a linear layer with a high refractive index is used. In the experiment, the formation of an incident taper that improves the optical waveguide coupling efficiency of a laser beam at an incident part of the optical waveguide and a mode forming in which shaping an aspect ratio of a outgoing beam to 1:1 were carried out.

Figure 31:
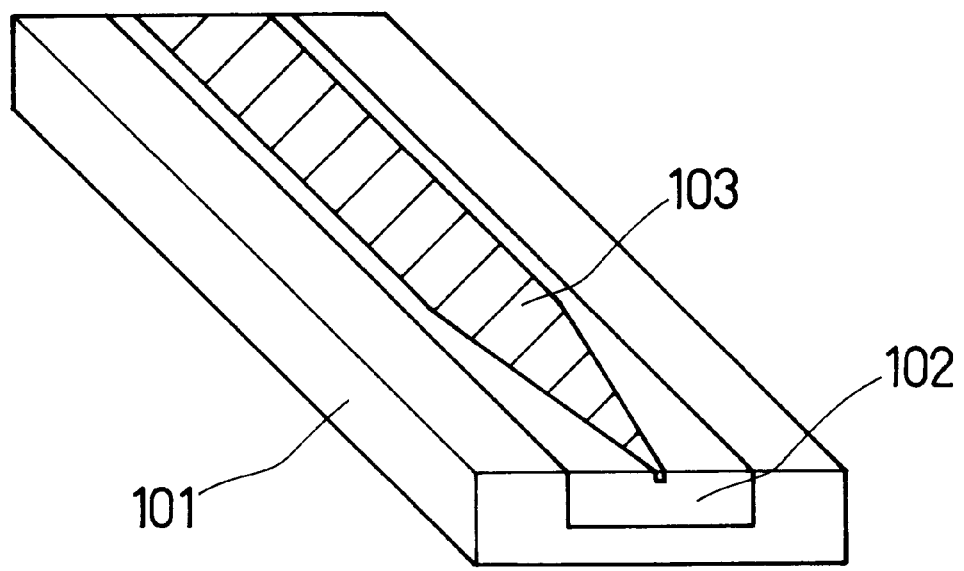
FIG. 31 a perspective view to illustrate the end part of an optical wavelength conversion element of this invention.

Firstly, the incident taper will be explained using FIG. 31. In FIG. 31, a waveguide 102 is formed on a $LiNbO_3$ substrate 101 and a linear layer 103 with a high refractive index is formed in the vicinity of the surface of the waveguide 102. A width of the layer 103 becomes narrower in the vicinity of the incident part having a tapered shape. In the waveguide 102 having the layer 103, confinement is improved by the layer 103 and the distribution of the guide mode is small as mentioned in Table 1. By processing the layer 103 into a tapered shape in the vicinity of the incident part of the waveguide 102 and decreasing the width of the layer as reaching the incident part, the confinement of the waveguide 102 becomes weak as reaching the incident part and the cross-section area of the guide mode can be enlarged. Specifically, in the case of making the width of the layer 103 narrower from 4 μm or more into 0.5 μm, the electric field distribution of the guide mode becomes equal to that of the case having no layer 103 and was enlarged. The guide mode in guiding part had a depth of 1.7 μm and a width of 3 μm, but in the incident part the depth and width were enlarged to 2.5 μm and 4 μm respectively. As a result, the coupling efficiency with the semiconductor laser was improved by 1.3 times compared to a conventional efficiency and the tolerance in coupling precision also was improved by 1.5 times.

There is another method for enlarging the incident part into a tapered shape. A layer with a high refractive index is formed into a linear shape in the waveguide and a rectangular shape in the vicinity of the incident part. The effective confinement of the waveguide can be changed by changing a ratio in the case of having the layer and that in the case of not having the layer in the incident part. Specifically, the ratio of the layer having a rectangular shape was decreased gradually from 100% to 10% as reaching to the incident part of the waveguide, wherein the period of the rectangular shape was 21 μm. In this method, the same effect as in the tapered shape was obtained and a taper waveguide having high coupling efficiency was formed.

Similarly, the shape of an outgoing beam also can be changed. The spect ration of the outgoing beam reached to 1:1 by changing the width of the layer in the incident part.

In this embodiment, a substrate of an X-plate was used, but a substrate of a Z-plate or a Y-plate or a substrate having a surface inclined with respect to a crystal axis can be used regardless of the crystal axis.

A $LiNbO_3$ substrate was used as a substrate in this embodiment, but the same element can be manufactured by using $LiNbO_3$ doped with MgO, Nb, Nd or the like, $LiTaO_3$, a $LiTa_{(1-x)}Nb_xO_3(0 \leq x \leq 1)$ substrate that is a mixture thereof and $KTP(KTiOPO_4)$. A light wavelength conversion element having high efficiency can be manufactured, since $LiTaO_3$, $LiNbO_3$ and KTP have high nonlinearity.

Embodiment 17

In the present embodiment, a short wavelength light generator using a light wavelength conversion element of the present invention will be explained. A structure of the light wavelength conversion element in the embodiment mentioned above enabled a stable light wavelength conversion element having high efficiency to be realized. Manufacturing a short wavelength light source using the light wavelength conversion element was tried. The short wavelength light source is made up of a semiconductor laser having a wavelength of 800 nm band, a focusing optical system and a light wavelength conversion element. The light emitted from the semiconductor laser is focused on the end face of the waveguide of the light wavelength conversion element by the focusing optical system, thus exiting a guide mode.

A SHG light whose wavelength has been converted is emitted from another end face of the waveguide of the light wavelength conversion element. A blue SHG light of 10 mW was obtained using a semiconductor laser having an output of about 100 mW, since light wavelength conversion element having high conversion efficiency was realized. A stable output was obtained, since the wavelength conversion element is excellent in optical damage resistance. As a result, the output variation was restrained to 2% or less, thus obtaining a stable output. A wavelength of 400 nm band is desired in a wide applicable field such as in making a plate for printing, in biotechnology, in a special measurement such as a measurement of an emission spectroscopy property or the like, in an optical disk or the like. The short wavelength light source using the light wavelength conversion element according to the present invention can be put into practical use in such applicable fields, since both of an output property and stability of the light wavelength light source are excellent.

In this embodiment, a light of the semiconductor laser was coupled to the optical waveguide using the focusing optical system, but it is also possible to couple the semiconductor laser and the optical waveguide directly. In the case of using an optical waveguide in which a TE mode propagates, it becomes possible to equalize an electric field distribution and a guide mode of a semiconductor laser. As a result, the semiconductor laser and the optical waveguide can be coupled at high efficiency, even if there is no condenser lens. In the experiment, the direct coupling was possible at a coupling efficiency of 80%, and it was proved that almost the same coupling property as that in the case of using a lens was obtained. When using direct coupling, a small-sized and inexpensive light source can be realized.

Embodiment 18

Figure 32:
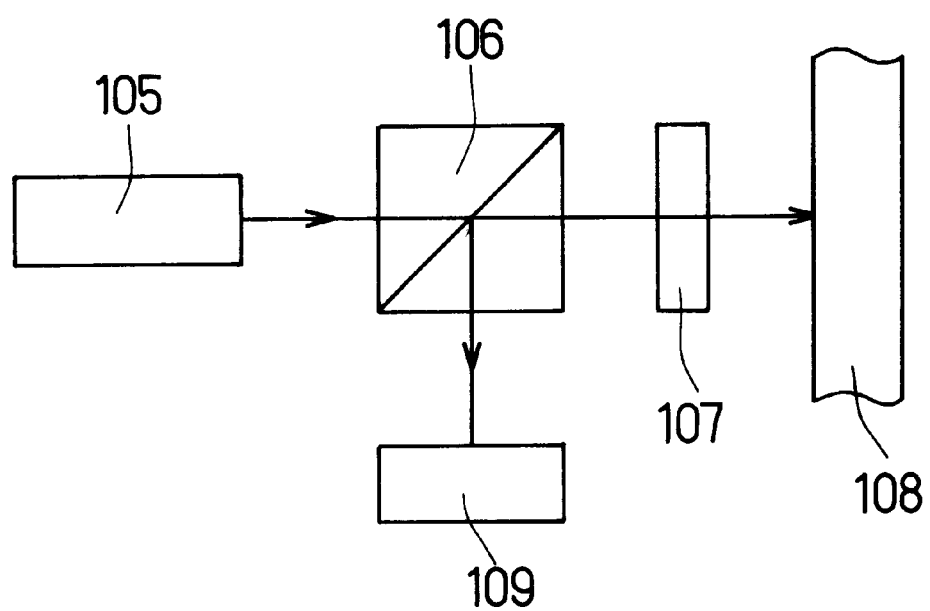
FIG. 32 is a schematic diagram to illustrate the configuration of an optical pickup of this invention.

In the present embodiment, an optical information processor of the present invention will be explained. FIG. 32 shows an optical information processor according to the present invention. A beam with an output of 10 mW emitted from a short wavelength light generator 105 shown in embodiment 1 transmits to a beam splitter 106 and is irradiated to an optical disk 108, which is an information recording medium, through a lens 107. A reflected light from the information recording medium 108 is collimated by the lens 107 and reflected with the beam splitter 106, thus reading out the signal in a detector 109. In the case where recording is possible in the information recording medium 108, information also can be written by an intensity modulation of an output of the short wavelength light generator.

A TE10 mode with sub-peaks is output from the short wavelength light generator, and a focused beam having a small spot diameter not more than that corresponding to the diffraction limit of a lens was obtained by focusing the light in the TE10 mode. As a result of obtaining the small spot diameter by a superresolution effect, a recording density can be improved to 1.2 times of the conventional recording density in addition to a focusing property by a short wavelength light.

Furthermore, not only reading out but also writing information in the information recording medium 108 was enabled, since generation of a blue light having a high output was realized. The optical information processor can be miniaturized by using a semiconductor laser as a fundamental wave light source and can be utilized in a small optical disc reading and recording device for private use.

The light wavelength conversion element optimizes an aspect ratio of an outgoing beam by optimizing a width of a waveguide. For example, the aspect ratio of an output beam can reach to 1:1 by forming a waveguide so as to have a layer with a high refractive index narrower than a width of the waveguide on an optical waveguide.

In order to improve the focusing property of a light pick-up, a prism for forming a beam and the like are not needed and high transmission efficiency, an excellent focusing property and cost reduction were realized. Moreover, a noise of a scattered light generated at the time of forming a beam was decreased and simplification of a pick-up was achieved.

This invention also aims to provide a method for forming a homogeneous and deep polarization inversion structure on a ferroelectric substrate having a surface that is substantially parallel to the polarization direction. More specifically, the following techniques can be considered.
1) Controlling the electric field in the substrate thickness direction of the electric field applied to the crystal, by forming two electrodes in the polarization direction of the ferroelectric surface and then forming a low resistance part on the crystal between the two electrodes.
2) A technique for using a substrate that is inclined in the polarization direction of the crystal with respect to the substrate surface, and positioning two electrodes apart from each other on the crystal and an insulating plate therebetween.
3) A technique for forming a concavity by etching the substrate surface and forming a filled electrode therein.

A highly-efficient optical wavelength conversion element is formed by forming a periodic polarization inversion structure by using the above-mentioned polarization inversion method.

Figure 33:
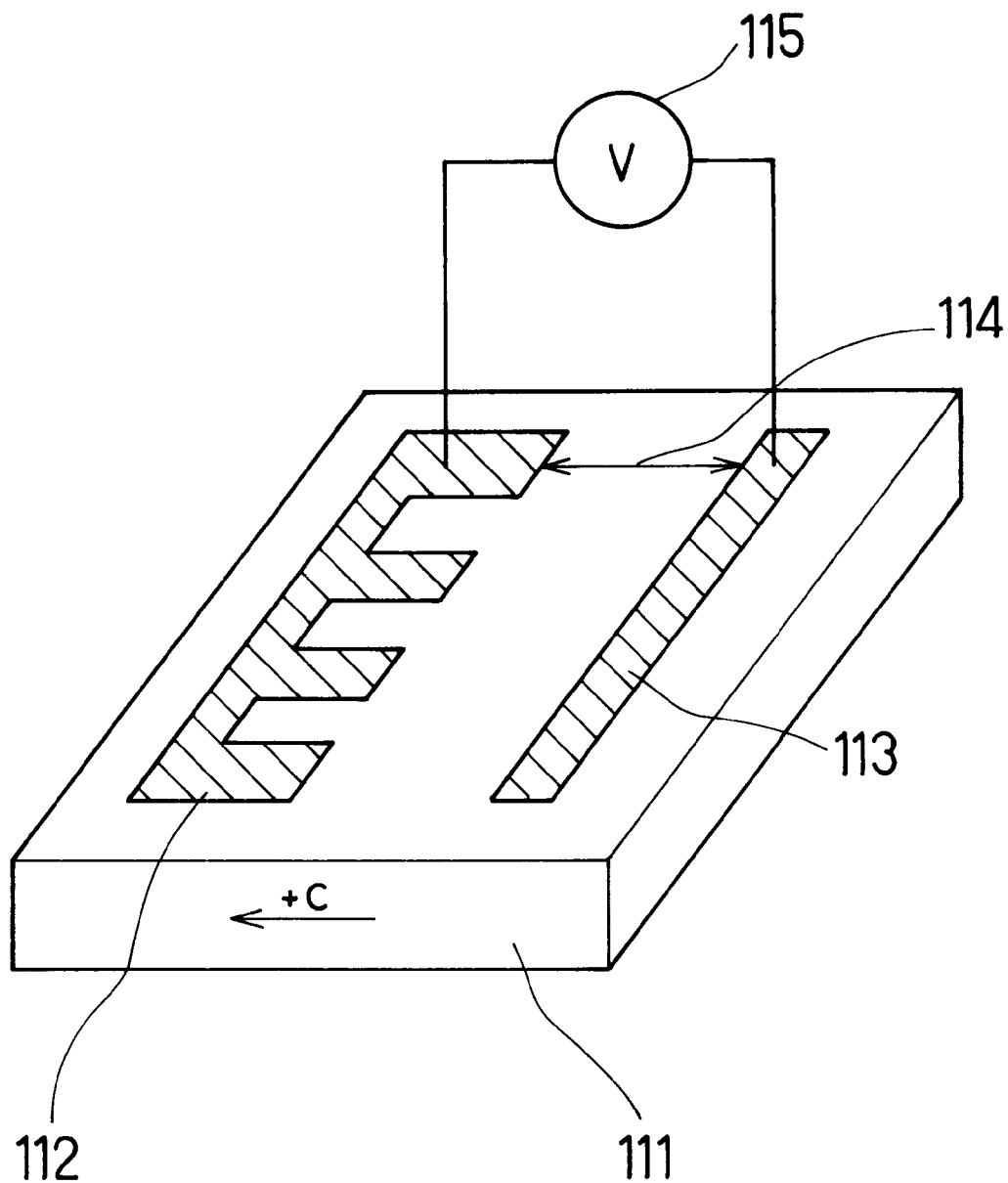
FIG. 33 is a perspective view to illustrate a method for producing polarization inversion parts of the prior art.

First, the polarization inversion property by the conventional method was examined. FIG. 33 shows the conventional polarization inversion method. In FIG. 33, a comb-shaped electrode 112 and a bar-shaped electrode 113 are formed on the MgO: LiNbO$_3$ substrate 111 of an X plate. The X plate is a substrate in which the X axis of the crystal is parallel to the normal line and the Z axis (the spontaneous polarization direction) is parallel to the flat surface of the crystal. High voltage is applied from the electric source 115 to the space between the comb-shaped electrode 112 and the bar-shaped electrode 113 in order to invert the polarization between the electrodes. The comb-shaped electrode 112 is formed in the +C direction of the substrate, and the bar-shaped electrode 113 is formed in the −C direction. During the voltage application, the entire substrate is dipped in an insulating solution to prevent discharge.

Figure 34:
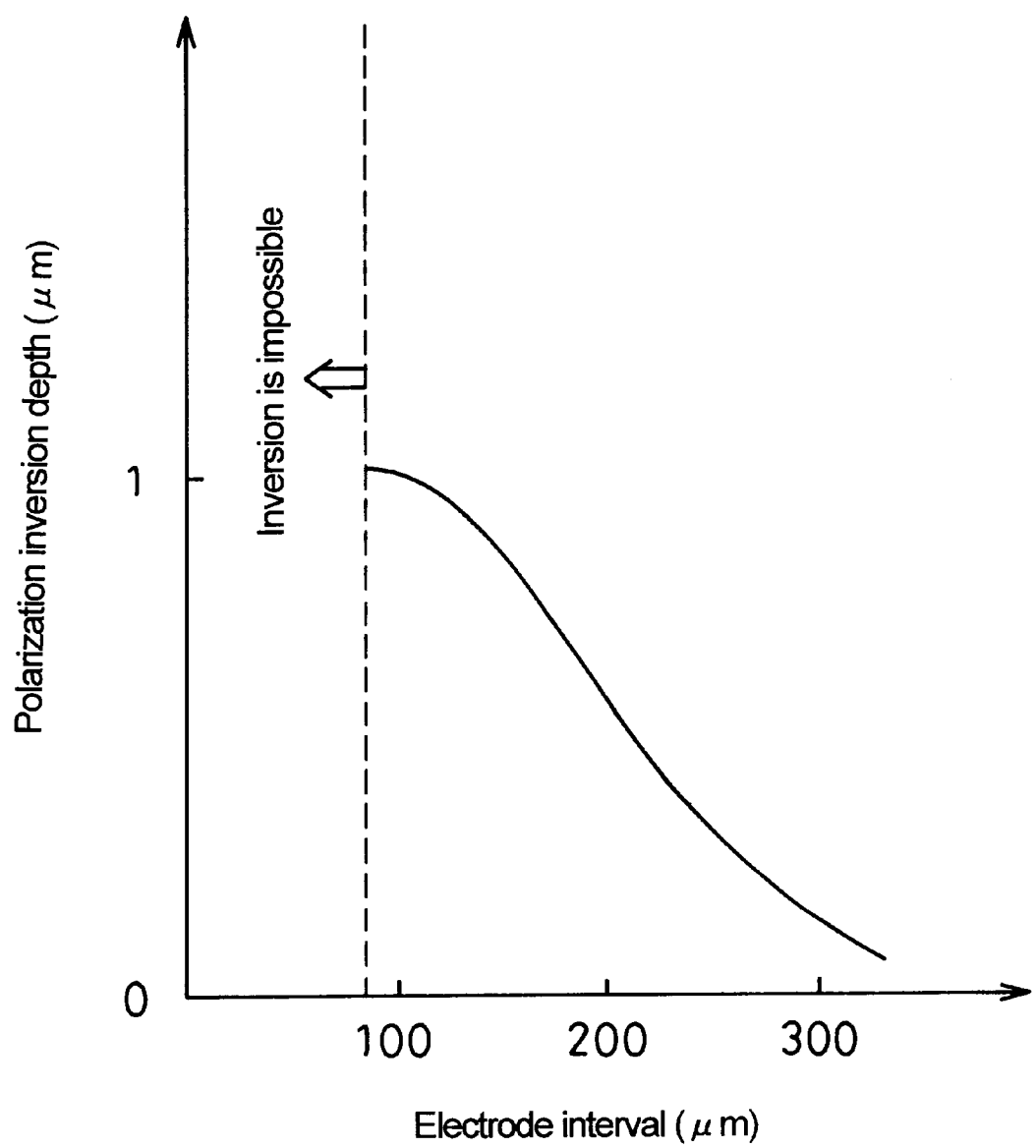
FIG. 34 is a graph based on the method in FIG. 33, illustrating the relationship between the electrode interval and the polarization inversion depth.
Figure 35:
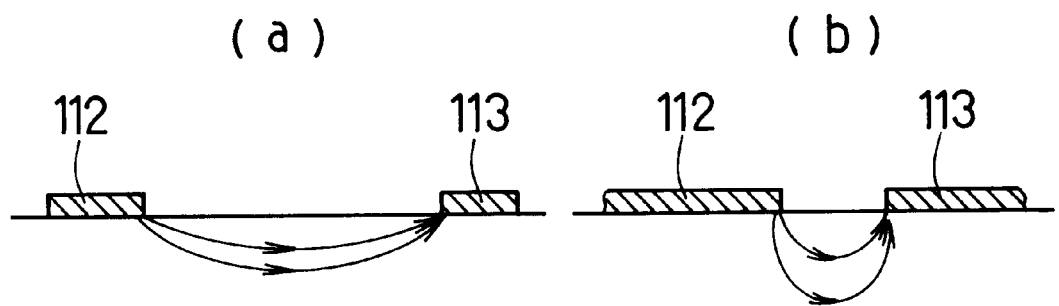
FIGS. 35(a) and 35(b) are cross-sectional views based on the method in FIG. 33, illustrating the electric field distribution between the electrodes.

First, the relationship between the distance 114 between the electrodes (112, 113) and the polarization inversion depth is considered. The result is shown in FIG. 34. The polarization inversion parts get deeper as the space between the electrodes is narrower. When the space is about 100 $\mu$m, the depth of the polarization inversion is about 100 $\mu$m. The reason is shown in FIG. 35, which illustrates the comparison between an electric field distribution (a) and another electric field distribution (b). When the space is narrow (distribution (b)), the electric field component in the depth direction is increased at the tips of the electrode, so that deep polarization inversion parts are formed. However, when the space between the electrodes is less than 100 $\mu$m, electric breakdown occurs between the electrodes and polarization inversion parts are not formed. Therefore, the electric field direction applied to the crystal should be controlled without decreasing the space between the electrodes.

Embodiment 19

Figure 36:
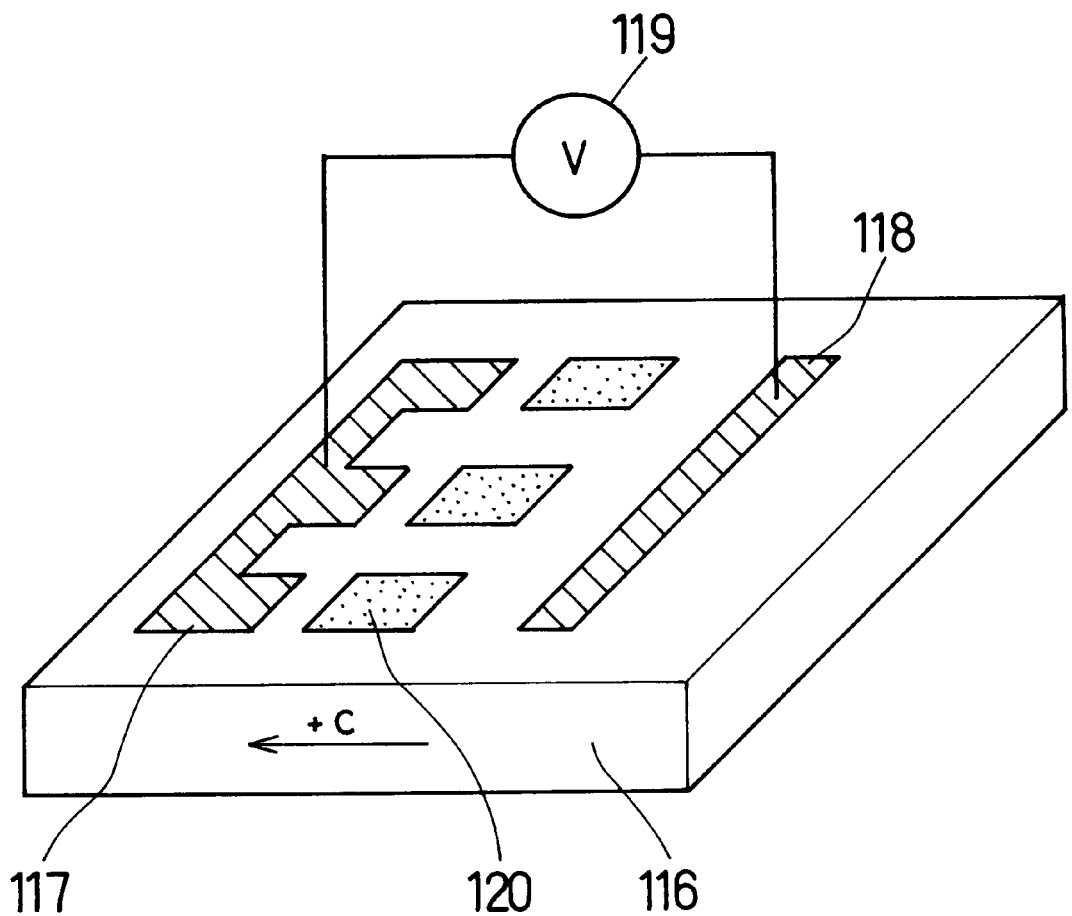
FIG. 36 is a perspective view to illustrate a method for producing polarization inversion parts of this invention.
Figure 37:
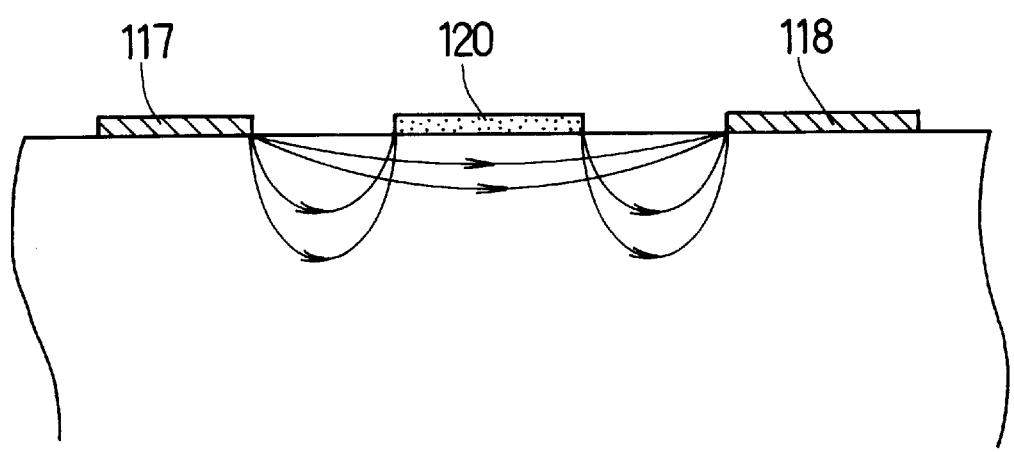
FIG. 37 is a cross-sectional view based on the method in FIG. 36, illustrating the electric field distribution between the electrodes.

FIG. 36 shows a polarization inversion method for this embodiment. In FIG. 36, a comb-shaped electrode 117 and a bar-shaped electrode 118 are formed on the surface of MgO:LiNbO$_3$ substrate 116. In addition, a low resistance part 120 is formed between these electrodes. High voltage is applied from an electric source 119 to the space between the electrodes (117, 118) in order to invert the polarization between the electrodes. The comb-shaped electrode 117 is formed in the +C direction and the bar-shaped electrode 118 is formed in the −C direction. Voltage is applied to the low resistance part 120 comprising a metal film. FIG. 37 shows the electric field distribution. When voltage is applied to the low resistant part 120 by using a metal film, electric fields are generated at the low resistant part 120 and at the tips of the electrodes (117, 118). The applied voltage has a larger electric field component in the depth direction compared to the electric field without a low resistant part (FIG. 35($a$)). When the distance between the low resistant part and each electrode is 30 $\mu$m, a polarization inversion structure of at least 1.5 $\mu$m deep can be formed. The depth is 1.5 times compared to that of a conventional method.

Another feature is the shape of the low resistant part 120. The electric field component at the tips of the electrode depends on the shape of the low resistant part 120. When the length of the low resistant part (in the polarization direction) is less than 5 $\mu$m, the polarization inversion depth is not different substantially from that of the case without the part. The polarization inversion depth can be increased when the low resistant part is 10 μm or more. When the length is about 30 μm, the deepest inversion part is obtained. The depth is not increased if the length exceeds 30 μm. The preferable length of the low resistant part is at least 10 μm, more preferably, at least 30 μm.

When one low resistant part is formed, only two polarization inversion parts can be formed between the electrodes (the tips of the comb-shaped electrode and the end of the low resistant part), and thus, polarization inversion parts cannot be formed in a large area. In order to solve this problem, plural low resistant parts are formed as a technique to utilize the crystal effectively.

Figure 38:
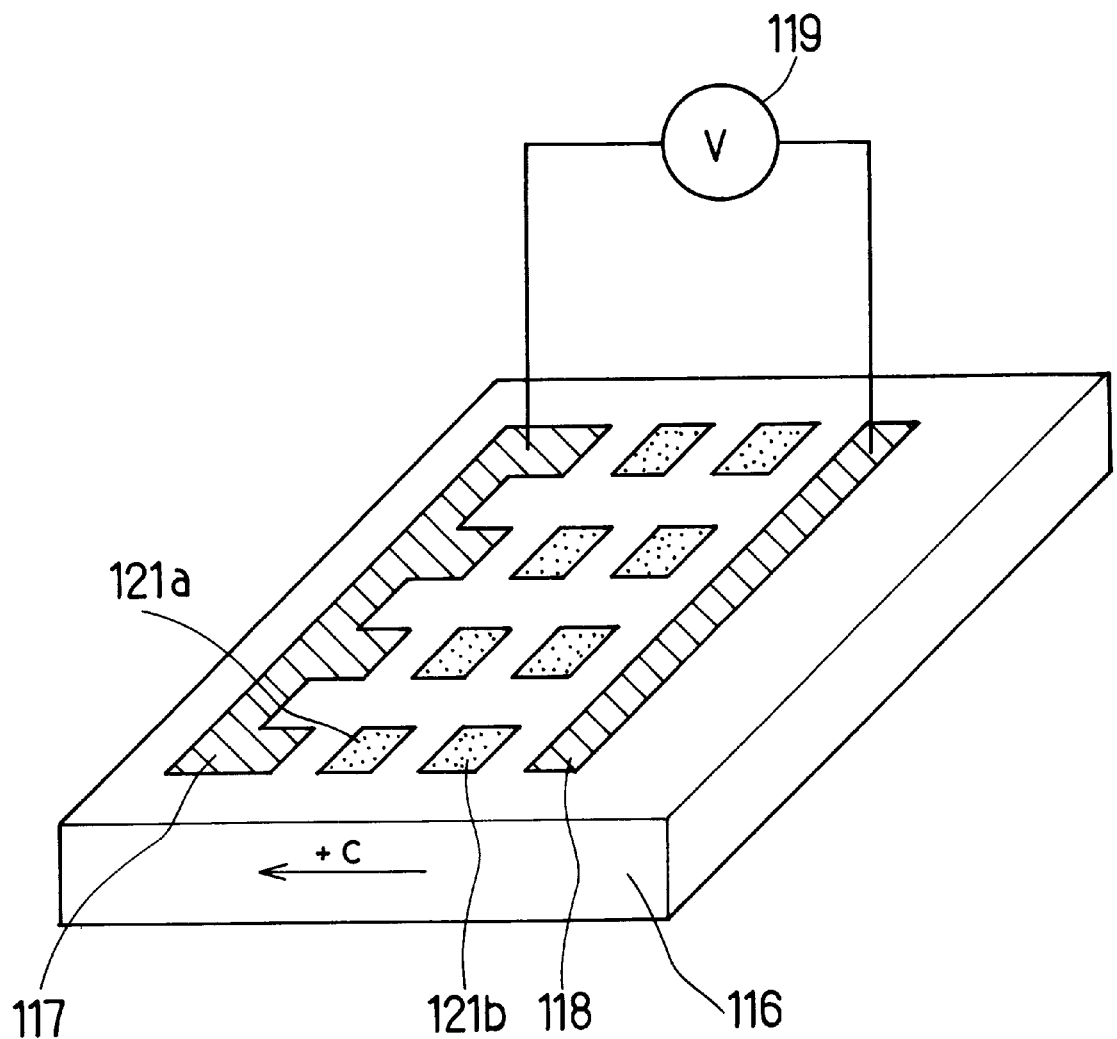
FIG. 38 is a perspective view to illustrate a method for producing polarization inversion parts of this invention.

FIG. 38 shows another polarization inversion example. In FIG. 38, plural low resistant parts (121a, 121b) are formed with a substantial uniformity between the electrodes 117 and 118. When voltage is applied to the space between the electrodes, uniform voltage is applied to the space between the low resistant parts (121a, 121b) respectively. The shapes of the applied electric fields are the same at each low resistant part, and thus, deep polarization inversion parts are formed uniformly. By using this method, the electrode interval can be remarkably increased, and thus, polarization inversion parts can be formed in a large area.

In a conventional method, the best electrode interval is about 100 μm. If polarization inversion parts are formed in a larger area, the polarization invention becomes shallow (FIG. 35(a)). Plural low resistance parts formed between the electrodes can increase the interval remarkably. Homogeneous polarization inversion parts can be formed entirely by spacing the electrodes (117, 118) at 500 μm and by positioning the low resistant parts evenly between the electrodes. As a result, the polarization inversion structure can be formed in an area 5 times that of the conventional method (100 μm).

Other materials can be used for the low resistance parts as long as they have an electric resistance lower than that of the substrate. It is further preferable if the materials have electric resistance lower than that of the substrate by at least one order of magnitude.

Next, an ion exchange part is considered as the low resistance part. Here, proton exchange was used for the ion exchange. Proton exchange can lower the substrate's resistance by at least one order of magnitude. In the structure similar to that shown in FIG. 38, the low resistant parts (121a, 121b) were formed by the proton exchange, and voltage was applied to the pace between the electrodes. The depth of the formed polarization inversion parts was 1.2 times more compared to the substrate with a metal film. A proton exchange part is formed inside the substrate while the metal film is formed on the substrate, and thus, the applied electric field in the latter case is distributed deeper.

The proton exchange for forming a low resistance part in this embodiment can be replaced by other effective techniques to lower the substrate's resistance, such as an ion exchange or metal diffusion, and so on.

In this embodiment, an MgO:LiNbO$_3$ substrate was used. This substrate can be replaced by a ferroelectric material such as LiNbO$_3$, LiTaO$_3$, KTiOPO$_4$, and KNbO$_3$. These materials have a high nonlinear property and enable polarization inversion due to the electric field application.

The MgO:LiNbO$_3$ substrate in this embodiment can be replaced by another crystal thin film formed by growing crystal. Such a thin film has an excellent crystal property and high nonlinear property so that a highly-efficient optical wavelength conversion element can be formed. Furthermore, the crystal layer can be used for an optical waveguide, which will prevent the deterioration of the nonlinear property due to the waveguide formation.

Figure 39:
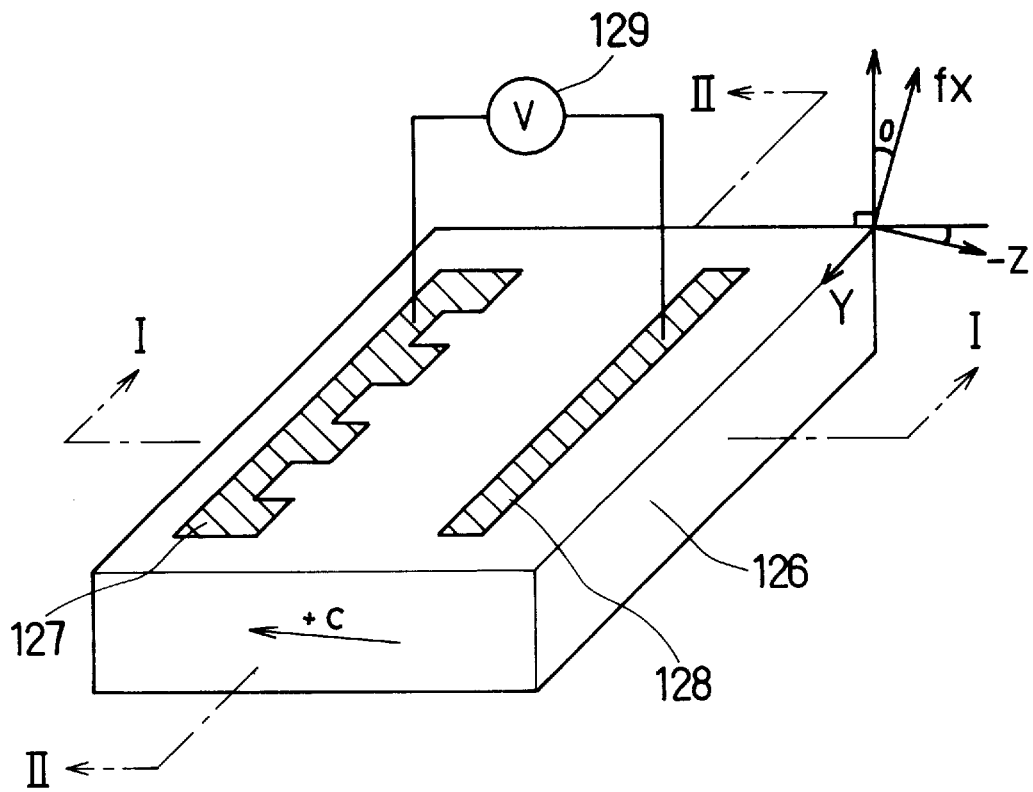
FIG. 39(a) is a perspective view to illustrate a method for producing polarization inversion parts of this invention, and FIGS. 39(b, c) are cross-sectional views thereof.
Figure 39:
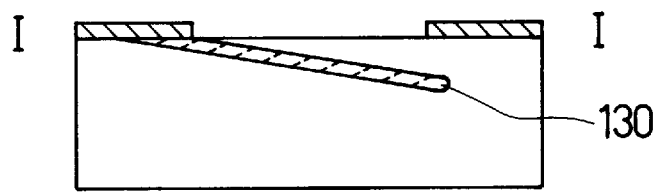
Figure 39:
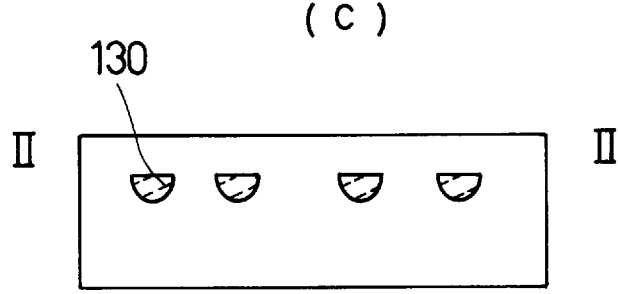

Next, polarization inversion parts were formed by using a single polarization MgO:LiNbO$_3$ substrate (hereinafter, referred to as an oblique substrate) whose polarization direction had an angle of at least 0° to the crystal surface. First, polarization inversion parts were formed in a conventional method in which an oblique substrate is used. As shown in FIG. 39(a), the substrate has a crystal +X axis that is inclined by 3° with respect to the normal line of the substrate. The +C axis (the crystal polarization direction) is also inclined by 3° with respect to the normal line of the substrate. As shown in FIG. 39(a), a comb-shaped electrode 127 and a bar-shaped electrode 128 are formed on an oblique substrate 126, and a space between the electrodes is 400 μm. Voltage was applied from a voltage source 129 to the substrate 126 in an insulating solution.

FIG. 39(b) is a cross-sectional view to show the formed polarization inversion parts 130. The polarization inversion parts 130 are generated in the vicinity of the tips of the comb-shaped electrode 127 at the +C side toward the inside of the substrate along the polarization direction. As shown in FIG. 39(c), it was observed that the polarization inversion parts get into the substrate from the tips of the electrode. When the polarization inversion period is 3.2 μm, the depth of the polarization inversion parts is about 2 μm.

This result shows that deep polarization inversion parts can be formed by using an oblique substrate in the conventional manner. However, the polarization inversion parts grow with an angle to the substrate surface, and thus, the polarization inversion parts get further into the substrate as they separate from the electrode digit tips. As a result, less area will be overlapped with the optical waveguide formed on the substrate. When the crystal axis is inclined by 3° with respect to the substrate surface, polarization inversion parts of 2 μm depth are formed from the surface in the vicinity of the electrode digit tips. At the portion separated from the tips by 20 μm, the polarization inversion parts get into the substrate by 1 μm, so only a half portion will be overlapped with the optical waveguide. The polarization inversion parts will get into the substrate by 2 μm when they are separated by 20 μm, and there is little overlap with the optical waveguide. In such a case, the part forming the optical waveguide is limited to the tips of the electrode digit, and only one or two waveguides will be formed. As a result, the effective area for using the substrate will be limited.

Figure 40:
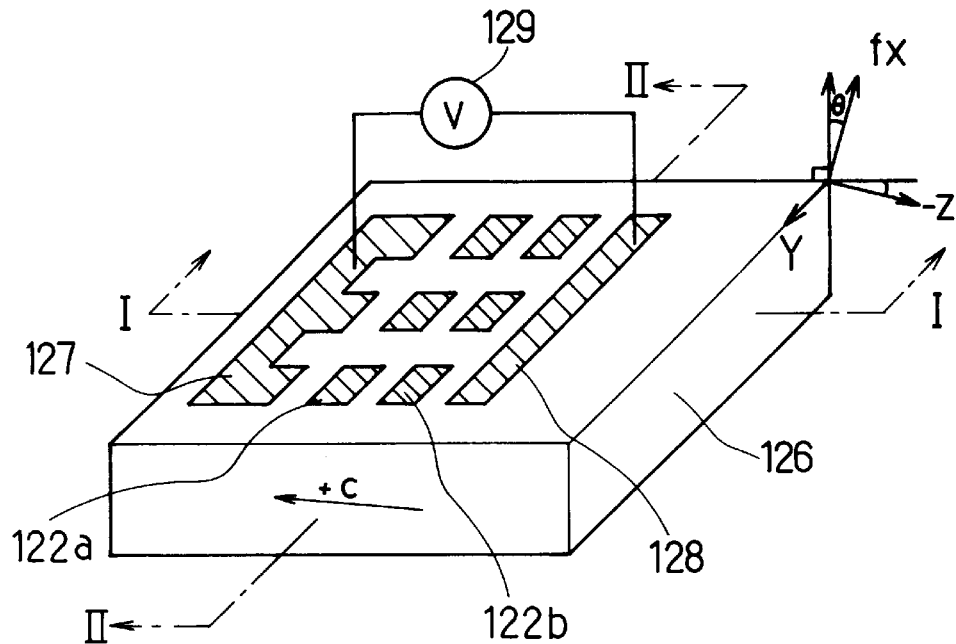
FIG. 40(a) is a perspective view to illustrate a method for producing polarization inversion parts of this invention, and FIGS. 40(b, c) are cross-sectional views thereof.
Figure 40:
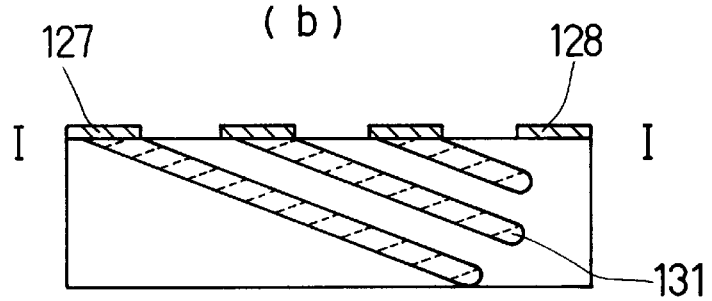
Figure 40:
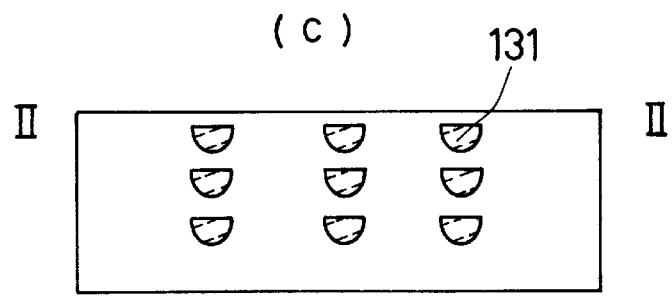

In order to form deep polarization inversion parts in a large area, the low resistance part shown in Embodiment 19 is positioned at a space between the electrodes 127 and 128. FIG. 40 shows the electrode structure and the formed polarization inversion structure.

Embodiment 20

In FIG. 40(a), the substrate 126 is an MgO:LiNbO$_3$ substrate in which the crystal X axis is inclined by 3° with respect to the substrate normal line. The comb-shaped electrode 127 is formed at the +C axis side of the crystal while the bar-shaped electrode 128 is formed at the −C axis side, and middle electrodes (122a, 122b) comprising low resistance metal materials are formed between the electrodes 127, 128. The interval between the electrodes 127 and 128 is 400 μm. The medium electrodes are formed to correspond to the comb-parts of the electrode 127 in the electrode interval direction, and the length is 20 μm. The medium electrodes are evenly positioned between the electrodes 127 and 128.

When the polarization was inverted by applying voltage to the space between the electrodes 127 and 128, polarization inversion parts 131 were respectively formed under the comb-shaped electrode 127 and the middle electrodes (122*a*, 122*b*) as shown in FIG. 40(*b*). The polarization inversion parts growing from the comb-shaped electrode 127 were about 2.2 μm deep, and the polarization inversion parts growing from the middle electrodes were about 1.8 μm deep, both of which were quite deep. Therefore, plural polarization inversion parts that were sufficiently overlapping with the optical waveguide were formed in the range of the 400 μm electrode interval, and thus, the effective area of the substrate was increased to several times.

These polarization inversion parts 131 can be used as a deep polarization inversion structure that will not be formed in a conventional manner. As shown in FIG. 40(*c*), the polarization inversion parts are periodically formed in the depth direction. By narrowing the interval between the middle electrodes (122*a*, 122*b*), the polarization inversion parts can be contacted in the depth direction. As a result, periodic polarization inversion parts that are substantially continuous were formed from the surface to the 10 μm depth. Thus, the polarization inversion depth that will not exceed 2 μm in a conventional method, can be increased to at least 10 μm by this method. As a result, the efficiency of the optical wavelength conversion element can be remarkably improved.

Figure 41:
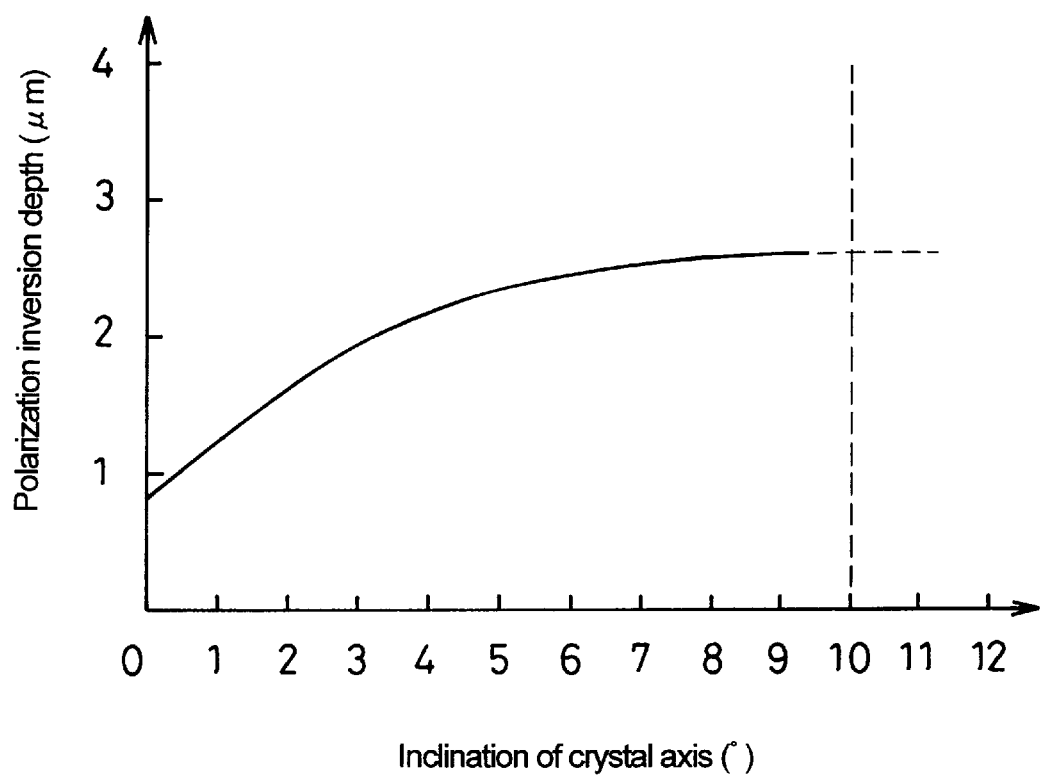
FIG. 41 is a graph to illustrate the relationship between the crystal axis inclination to the substrate surface and the depth of the polarization inversion parts.

Next. the relationship between the crystal axis of the substrate crystal and the inclination of the substrate surface is explained. The inclination of the crystal axis will affect the polarization inversion depth. When producing polarization inversion parts (FIG. 41), the depth is 0.8 μm when the angle is 0°, and the depth is 2 μm when the angle is 3°. The polarization inversion parts are difficult to be formed when the angle is 10° or more. When the crystal angle is small, the polarization inversion tends to be shallow. The preferable angle ranges from 2 to 5° in order to obtain polarization inversion parts having a depth of the same degree as the optical waveguide if the polarization inversion parts are formed on an oblique substrate by using only a comb-shaped electrode and a bar-shaped electrode. When polarization inversion parts are formed by contacting plural polarization inversion parts in the depth direction, deep polarization inversion parts can be formed even when the substrate's crystal axis has a small inclination angle. Even in a substrate whose inclination angle is 2° or less, deep polarization inversion parts of at least 10 μm can be formed. When the inclination angle is 2° or less, the inclination of the polarization inversion parts is decreased, and the homogeneity of the polarization inversion inside the surface will be improved.

The next explanation is about the relationship between the comb-shaped electrode 127 and the middle electrode 122. The length of a middle electrode 122 will affect not only the polarization inversion depth growing from the middle electrode itself, but also the polarization inversion parts growing from the comb-shaped electrode and from the other middle electrodes. First, the relationship between the polarization inversion parts growing under the electrode 122 and the electrode length. As shown in FIG. 40(*b*), the polarization inversion parts under an electrode are formed to be substantially long as the electrode, and it gets into the substrate from the tips of the electrode digit. As a result, the electrode length will affect the polarization inversion depth.

Figure 42:
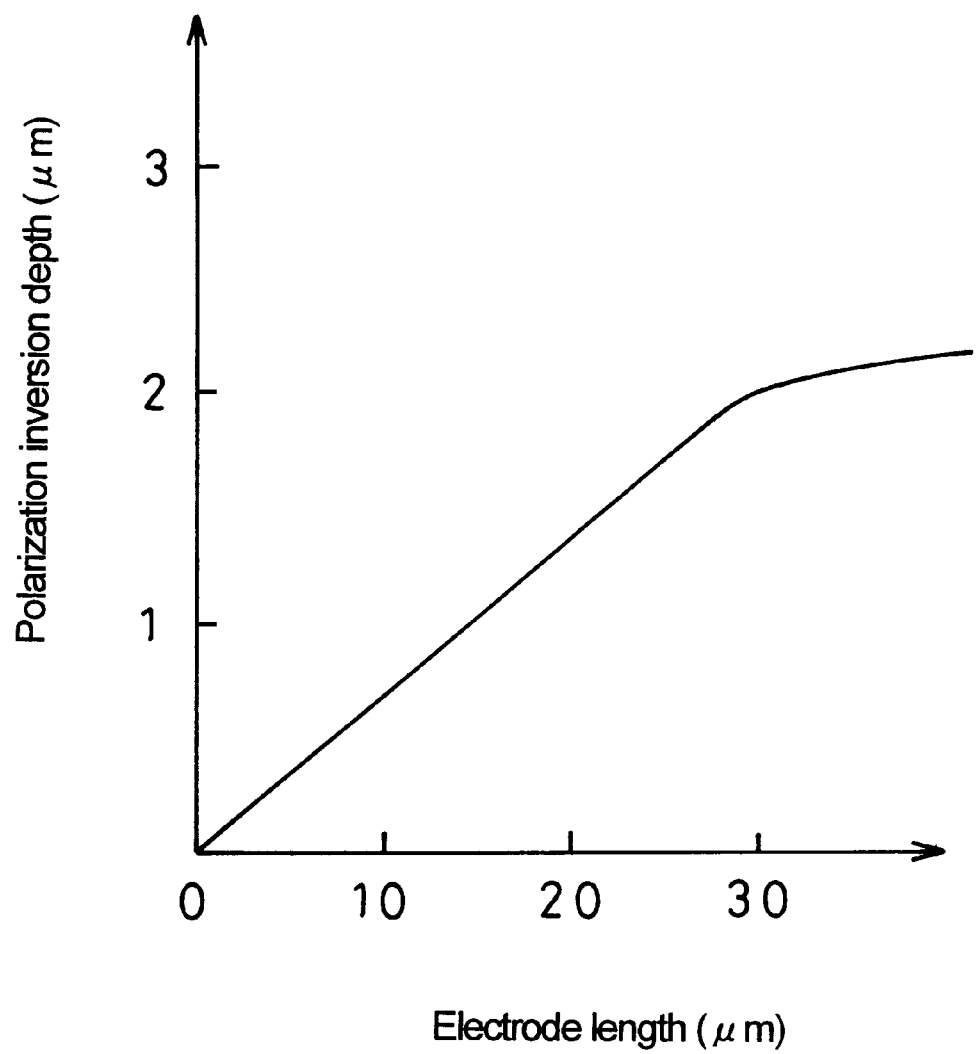
FIG. 42 is a graph to illustrate the relationship between the length in the electrode interval direction of the middle electrode and the depth of the polarization inversion parts.

FIG. 42 shows the relationship between the length of a middle electrode in the electrode interval direction and the depth of the polarization inversion parts formed under the electrode. When the electrode length is 5 μm or less, polarization inversion parts will be difficult to be formed in the depth direction. The polarization inversion parts can be formed when the length reaches 10 μm, and increase in proportion to the electrode length. The limit is about 30 μm, and the depth will not increase any longer if the length exceeds 30 μm. The preferable electrode length is from 10–30 μm.

When the electrode 122 gets long, it will affect the polarization inversion parts formed by the other electrodes. Polarization inversion parts grow from the comb-shaped electrode 127 toward the bar-shaped electrode 128. When the middle electrode 122 gets longer, the polarization inversion parts between the electrodes 127 and 128 will be limited. When the electrode length is 30 μm or less, the polarization inversion parts will be formed from the tips of the electrode digit of the comb-shaped electrode 127 to the end of the bar-shaped electrode 128. When the electrode length exceeds 30 μm, formation of the polarization inversion parts will be stopped on the way, and the growth of the polarization inversion parts will be limited to the half. The reason is that the electric fields between the electrodes are different from each other due to the electrode structures. From this point of view, the preferable length of the middle electrodes is from 10 to 30 μm. The more preferable range is 20 to 30 μm so that further polarization inversion parts will be formed.

Figure 43:
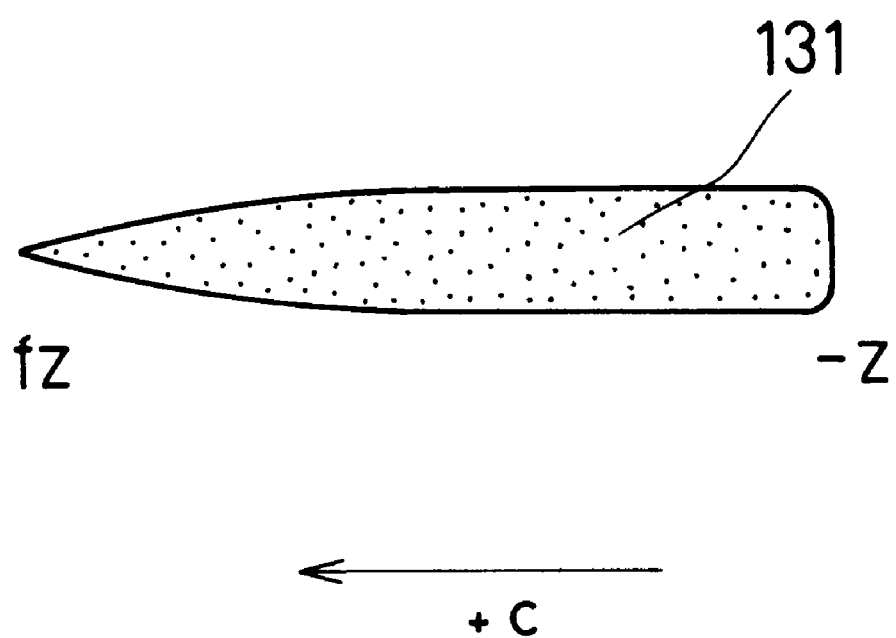
FIG. 43 is a plan view to illustrate the shape of a polarization inversion part formed by using the middle electrodes.

The shape of an electrode will affect the homogeneity of the polarization inversion. FIG. 43 shows the polarization inversion part 131 (observed from the top) formed under the electrode. The polarization inversion is thin at first, and it gets thicker as it closes to the tips of the electrode digit, and gets into the substrate. In order to improve the homogeneity of the polarization inversion, the electrode structure should resemble the shape of the polarization inversion part. For example, triangular middle electrodes were formed to examine the homogeneity of the shape of the polarization inversion parts formed by using a bar-shaped electrode. The homogeneity was 1.5 times better as the triangle electrodes were used. This is considered to be caused by the electrode structure resembling the polarization inversion part shape more closely.

The X plate used in this embodiment can be replaced by a Y plate. The MgO:LiNbO$_3$ used in this embodiment can be replaced by LiNbO$_3$, LiTaO$_3$ and the mixture (LiNbXTa$_{1-x}$)O$_3$). A similar element can be produced by using KTP(KTiOPO$_4$). Since LiTaO$_3$, LiNbO$_3$, and KTP have a high nonlinear property, they can provide an optical wavelength conversion element with a high efficiency.

Furthermore in this embodiment, MgO: LiNbO$_3$ was used, however, similar effects can be obtained by using MgO-doped LiTaO$_3$, MgO-doped LiNbO$_3$, and the mixture (MgO:LiNb$_x$Ta$_{(1-x)}$O$_3$). The doped MgO has improved resistance against optical damage. Thereby stable properties can be obtained for SHG with high output power.

The MgO:LiNbO$_3$ substrate in this embodiment can be replaced by another crystal thin film formed by growing crystal. Such a thin film has an excellent crystal property and high nonlinear property so that a highly-efficient optical wavelength conversion element can be formed. Furthermore, the crystal layer can be used for an optical waveguide, which will prevent the deterioration of the nonlinear property due to the waveguide formation.

Embodiment 21

Figure 44:
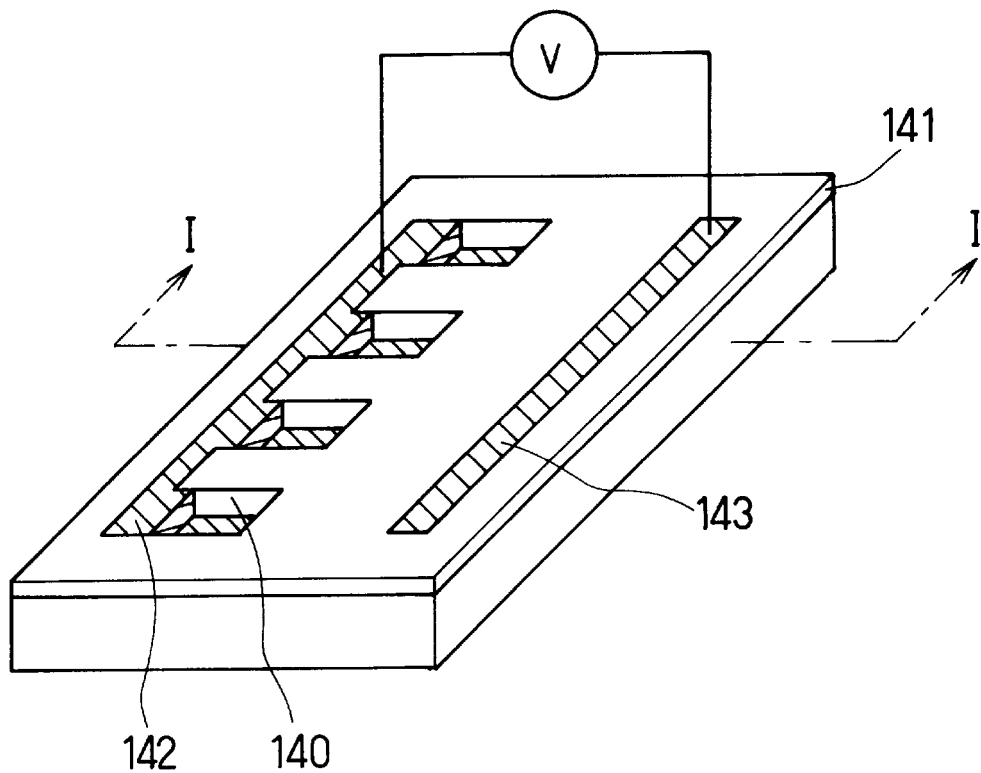
FIG. 44(a) is a perspective view to illustrate a method for producing polarization inversion parts of this invention.
FIG. 44(b) is a cross-sectional view thereof.
Figure 44:
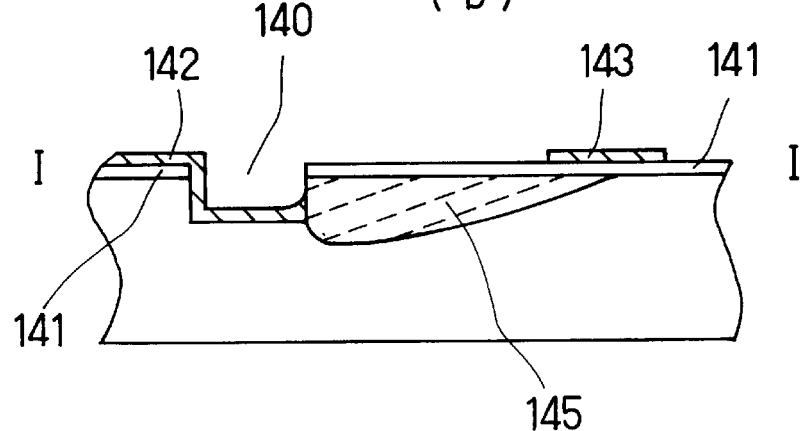

The following is another method for forming a deep polarization inversion structure. As shown in FIG. 44(*a*), concavities 140 are formed periodically on the one side of the substrate, and a first electrode 142 is formed therein. In addition, a bar-shaped electrode 143 is formed, and voltage is applied to the space between the electrodes to form a periodic polarization inversion. In the process, at least the crystal surfaces of the concavities 140 are covered with an $SiO_2$ insulating film 141 (FIGS. 44(*a* and *b*)). Electrodes are formed in the concavities 140, so that polarization inversion parts 145 are generated at a deep portion of the substrate, and deep polarization inversion parts can be formed. When the depth of the concavities is at least 1 μm, the depth of the polarization inversion parts is 2 μm, namely, the depth can be doubled compared to a conventional method.

The advantage of the insulating film 141 between the concavities 140 is formation of a homogeneous and periodic structure. Without covering with the insulating film 141, the adjacent polarization inversion parts generated between the concavities 140 are contacted with each other, resulting in the difficulty in forming a polarization inversion of a short period. An inversion structure having an inversion period of 5 μm or more is especially difficult to produce. The insulation between the electrodes can be increased by covering with an insulating film, and thus, polarization inversion of a short period can be provided. As a result, a periodic polarization inversion structure of no more than 3 μm can be formed.

The depth of the polarization inversion depends on the depth of the concavities for the electrodes. The polarization inversion parts spread upwards and/or downwards by about 1 μm. As a result, the concavities having a depth of 0.5 μm or more can be formed and when the depth of the polarization inversion is 1.5 μm or more, an optical wavelength conversion element with high efficiency can be produced. However, when the depth of the concavities is 3 μm or more, the polarization inversion parts are formed inside the substrate. Accordingly, it is preferable that the depth of the concavities is 3 μm or less.

A technique to facilitate formation of such an electrode has been newly found. In order to form the electrode structure in FIGS. 44(*a,b*), metal films should be formed selectively on the concave parts, resulting in a complex process including mask alignment. As a result of experiments about methods to enable self-alignment, a new method for producing polarization inversion parts was found. The process is indicated in FIGS. 45(*a*)–45(*d*).

Figure 45:
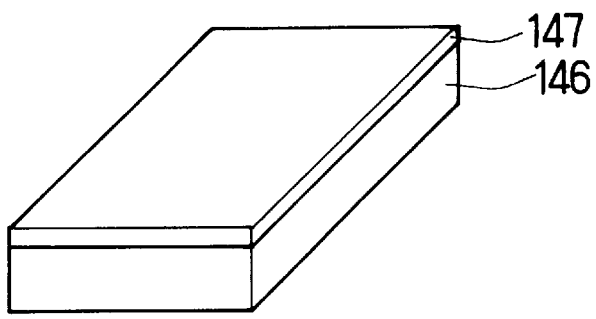
FIGS. 45(a)–(d) are perspective views of a substrate, illustrating a method for producing polarization inversion parts of this invention.
Figure 45:
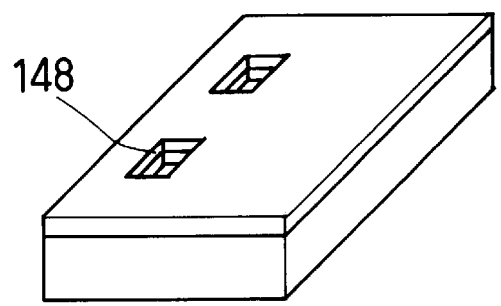
Figure 45:
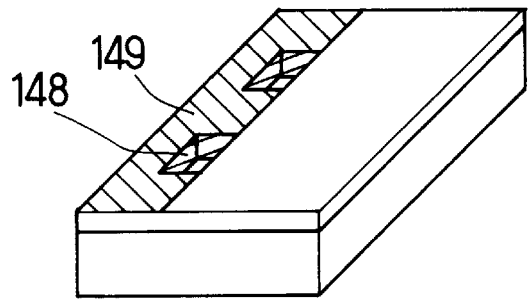
Figure 45:
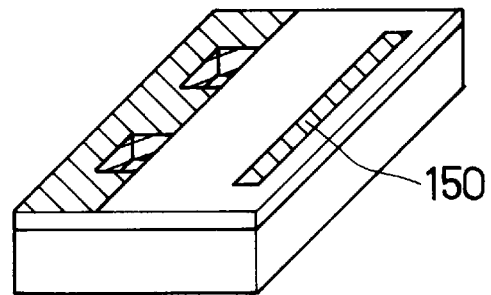

In FIG. 45(*a*), an $SiO_2$ film 147 (an insulator) is deposited on an $MgO:LiNbO_3$ substrate 146 (X plate). Later, the $SiO_2$ film 147 and the substrate 146 are simultaneously etched by photolithography and etching in order to form concavities 148 of about 2 μm depth periodically (FIG. 45(*b*)). In the next step (FIG. 45(*c*), metal is evaporated on the dents 148 so that a first electrode 149 is formed. Next, a bar-shaped electrode 150 is formed at the other side of the substrate (FIG. 45(*d*)). When voltage is applied to the space between the electrodes, polarization inversion parts are generated from the sides of the concavities, and they grow toward the bar-shaped electrode. The polarization inversion depth is about 2 μm, since it depends on the concavity depth. The principle is as follows. FIG. 44(*b*) shows the cross section of a concavity. The substrate is exposed at the bottom of the concavity, while the protruding part is insulated with the $SiO_2$ film 141 Therefore, the metal is directly contacted with the substrate surface at the bottoms of the concavities. As the polarization inverts remarkably at the metal-contacting parts, polarization inversion is generated only at the bottoms of the concavities, and grows toward the bar-shaped electrode. On the other hand, less polarization will be generated at the protruding part since the part is covered with the insulating film 141.

Since the bottoms of the dents are positioned at 2 μm depth from the surface, a polarization inversion structure 3 μm deep can be formed. This depth is three times greater compared to a conventional one, and thus, an optical wavelength conversion element with high efficiency can be produced.

Polarization inversion parts grow from the inside of the substrate by digging the substrate, and simultaneously, the substrate surface is covered with an insulating film to prevent polarization inversion at this area, and thus, periodic and deep polarization inversion will be generated. In this method, selective electrode formation at concave parts is not required, while an electrode structure can be selectively formed at the concavities by self-alignment, which facilitates the production process.

Figure 46:
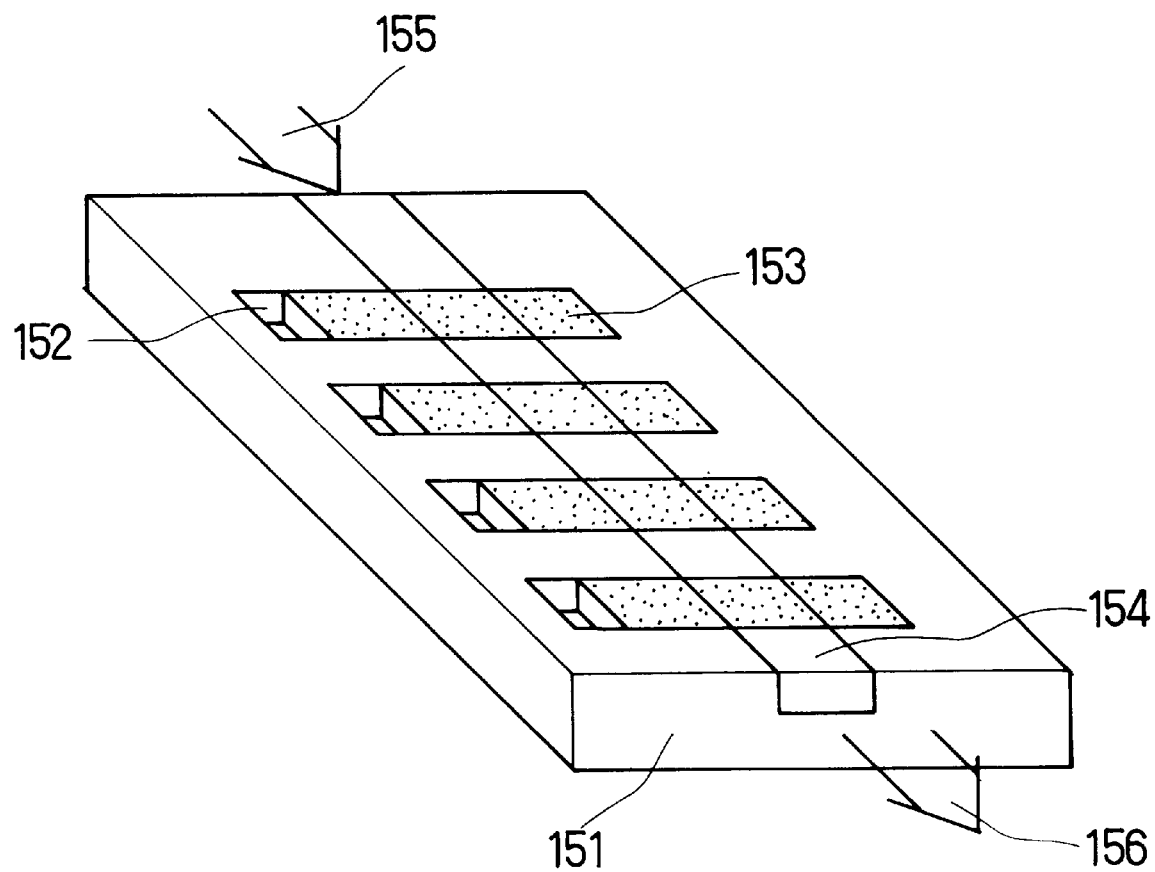
FIG. 46 is a perspective view to illustrate an optical wavelength conversion element of this invention.

Next, an optical wavelength conversion element was formed by using a periodic polarization inversion structure provided by the method for this invention. FIG. 46 is a perspective view to show the configuration of an optical wavelength conversion element of this invention. As shown in FIG. 46, an optical waveguide 154 and polarization inversion parts 153 are formed on an $MgO:LiNbO_3$ substrate 151. The polarization inversion parts 153 cross the optical waveguide 154 periodically. At one end of each periodic polarization inversion part, a concavity 152 is formed.

When polarization inversion parts are formed by providing concavities in the substrate, deeper polarization inversion parts can be formed compared to the case using an oblique substrate. Though the polarization inversion of the MgO doped $LiNbO_3$ substrate expands to the periphery of the electrode, the expansion degree is greater in the depth direction than in the width direction. As a result, the polarization inversion parts formed on the substrate will be substantially semicircular. By using the above-mentioned electrode structure, the polarization inversion parts will be substantially circular. As a result, polarization inversion parts at least 3 μm thick (1.5 times greater than the case using an oblique substrate) can be formed. The efficiency obtained by this optical wavelength conversion element is doubled compared to the case using the oblique substrate.

Another advantage of this method is that all the polarization inversion parts are sufficiently overlapped with the optical waveguide since the polarization inversion parts are formed in parallel to the substrate surface. In a conventional oblique substrate, the effective area of the available polarization inversion parts is insufficient. By using the concave electrodes, the effective area of the polarization inversion parts can be remarkably increased.

In addition to that, the concavities formed at one part of the polarization inversion parts are specifically useful for producing an optical wavelength conversion element and for forming a short wavelength light source using the same. In order to form an optical wavelength conversion element, optical a waveguide should be formed by aligning the produced polarization inversion structure. The polarization inversion structure cannot be observed visually and thus, markers should be formed for alignment, which complicates the producing process. On the other hand, the alignment with the optical waveguide can be easily conducted by matching concavities formed at one end of the polarization inversion part.

Forming concavities is also effective for producing a short wavelength light generator. In such a short wavelength light generator, an optical wavelength conversion element and a semiconductor laser are directly coupled and fixed. So the optical waveguides of these elements should be aligned with precision on the order of submicrons. In order to conduct the above-mentioned alignment, it is required to indicate the mark on the respective optical waveguide for alignment. Each mark is detected as a picture in order to align the waveguides automatically.

Upon the above-mentioned request, it is very easy to picture-detect the mark when the concavity is formed at the top of a polarization inversion part. Further, the optical waveguide is formed aligned to the concavity and the position of the optical waveguide is detected from the position of the concavities with precision on the order of submicrons. Moreover, the concavities in the substrate will not be removed easily, and will not be damaged in the other producing steps, so that the concavities can be detected with certainty.

In this embodiment, a resist also can be used in place of $SiO_2$ as an insulator. In such a case, a similar polarization inversion structure can be formed by using the resist for etching in order to form electrodes on the resist, and thus, the producing process can be simplified.

The X plate used in this embodiment can be replaced by a Y plate. The $MgO:LiNbO_3$ used in this embodiment can be replaced by $LiNbO_3$, $LiTaO_3$ and the mixture ($LiNb_xTa_{(1-x)}O_3$). A similar element can be produced by using $KTP(KTiOPO_4)$. Since $LiTaO_3$, $LiNbO_3$, and KTP have a high nonlinear property, they can provide an optical wavelength conversion element with a high efficiency.

Furthermore, similar effects can be obtained by using MgO-doped $LiTaO_3$, MgO-doped $LiNbO_3$, and the mixture (MgO: $LiNb_xTa_{(1-x)}O_3$). The doped MgO has improved resistance against optical damage. Thereby, stable properties can be obtained for SHG with high output power.

Embodiment 22

Figure 47:
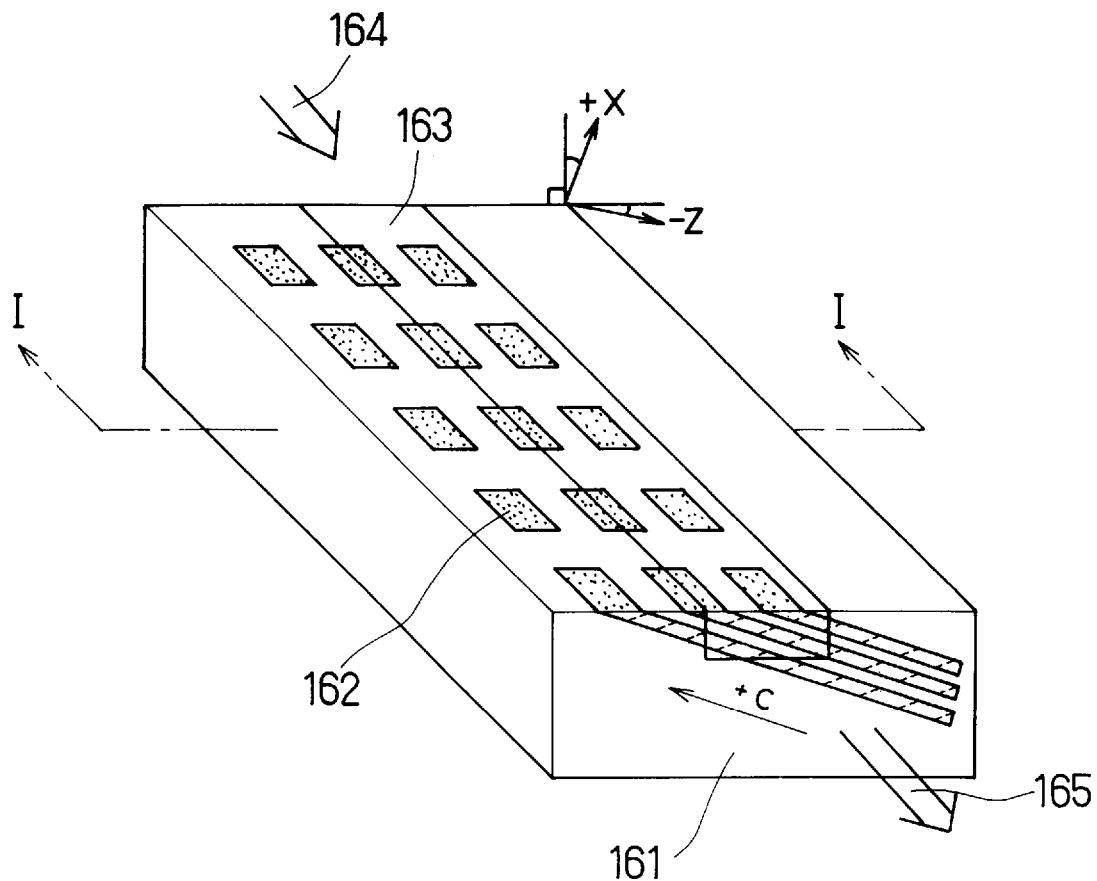
FIG. 47(a) is a perspective view to illustrate an optical wavelength conversion element of this invention and FIG. 47(b) is a cross-sectional view thereof.
Figure 47:
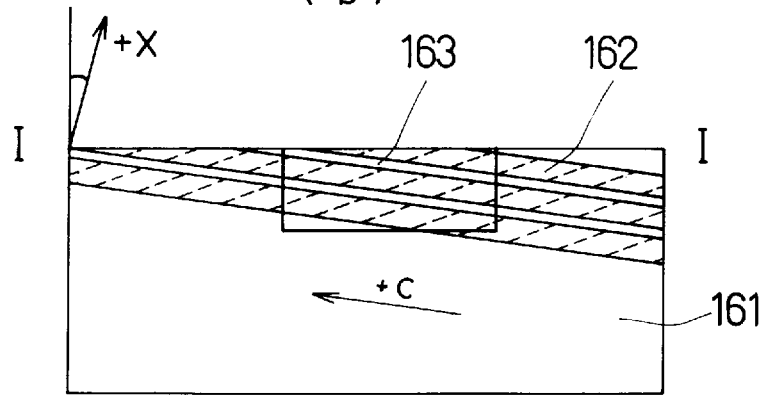

Another optical wavelength conversion element is explained below referring to FIGS. 47(a,b). As shown in FIG. 47(a), polarization inversion parts 162 and an optical waveguide 163 are formed on an MgO: LiNbO, substrate 161. In the substrate 161, the crystal axis is cut out so as to incline from the substrate surface. As shown in the cross-sectional view of FIG. 47(b), the polarization inversion parts 162 had a periodic structure in the waveguide-proceeding direction and in the depth direction. Regarding the depth direction, the thickness of the polarization inversion parts was 2 μm and the interval between the polarization inversion parts was 0.3 μm. The thickness of the optical waveguide was 4 μm. The waveguide was enlarged to lower its power density and to enable generation of the harmonic with high output power. As the polarization inversion parts 163 were formed periodically in the depth direction, a deep polarization inversion structure can be formed, which was difficult with the conventional method, and the parts were overlapped sufficiently with the deep waveguide.

As a result of evaluation of the optical wavelength conversion element, 100 mW blue light 165 was obtained from 200 mW radiating light 164, and the output power was 5 times that of a conventional method. The output power was stable and changes caused by optical damage were not observed in the output power. The efficiency was improved due to the deep waveguide and optical damage due to the increasing power density was reduced by enlarging the waveguide cross section area. As a result, an optical wavelength conversion element with high output power can be formed.

Conventionally, it was difficult to form deep polarization inversion parts in a short period since the polarization inversion parts would be enlarged in the width direction as well as the depth direction. For converting the wavelength to short light beams ranging from blue to violet, the polarization inversion period should be as short as 3.5 μm or less. For this purpose, the width of the polarization inversion parts should be decreased to be no more than 2 μm. As the depth of the polarization inversion parts is sufficiently overlapped with the optical waveguide, the depth should be at least 2 μm. Forming a deep polarization inversion structure by limiting the width is difficult since the extension speed in the width direction is substantially equal to that in the depth direction.

In the above-mentioned embodiment, a substantially deep polarization inversion structure can be formed by periodically overlapping the polarization inversion structure in the depth direction. The extension in the depth direction is controlled at every polarization inversion part, and at the same time, a deep polarization inversion structure can be provided Moreover, the existence of the polarization inversion structure improved remarkably the optical damage resistance. Optical damage is caused as follows. Once optical damage occurs, impurities are excited by light beams and distributed in the polarization direction, generating an electric field, and the refraction index will change. If the polarization is inverted, the movement of the excited impurities is reversed at the polarization inversion parts, and thus, the generated electric field is offset and the optical damage is controlled. The electric field offset effect can be further increased by forming the polarization inversion parts periodically in the depth direction. As a result, the optical damage resistance can be doubled.

In order to use the polarization inversion structure as a deep inversion, the thickness of the inversion part should be reduced to the period in the depth direction, since the area overlapping with the optical wavelength will be decreased if the polarization inversion parts are separated from each other. In order to obtain a proper overlapping area with the optical waveguide, the thickness of the polarization inversion parts should be a half or less of the polarization inversion period in the depth direction, more preferably, about a quarter.

The X plate used in this embodiment can be replaced by a Y plate. The $MgO:LiNbO_3$ used in this embodiment can be replaced by $LiNbO_3$, $LiTaO_3$ and the mixture ($LiNb_xTa_{(1-x)}O_3$). A similar element can be produced by using $KTP(KTiOPO_4)$. Since $LiTaO_3$, $LiNbO_3$, and KTP have a high nonlinear property, they can provide an optical wavelength conversion element with a high efficiency.

Furthermore, similar effects can be obtained by using MgO-doped $LiTaO_3$, MgO-doped $LiNbO_3$, and the mixture (MgO: $LiNb_xTa_{(1-x)}O_3$). The doped MgO has improved resistance against optical damage. Thereby stable properties can be obtained for SHG with high output power.

The $MgO:LiNbO_3$ substrate in this embodiment can be replaced by another crystal thin film formed by growing crystal. Such a thin film has excellent crystal property and high nonlinear property so that a highly-efficient optical wavelength conversion element can be formed. Furthermore, the crystal layer can be used for an optical waveguide, which will prevent the deterioration of the nonlinear property due to the waveguide formation.

Embodiment 23

When an oblique substrate is used, polarization inversion parts are formed along the direction of the spontaneous polarization. A bulk polarization inversion structure can be formed by using this characteristic.

Figure 48:
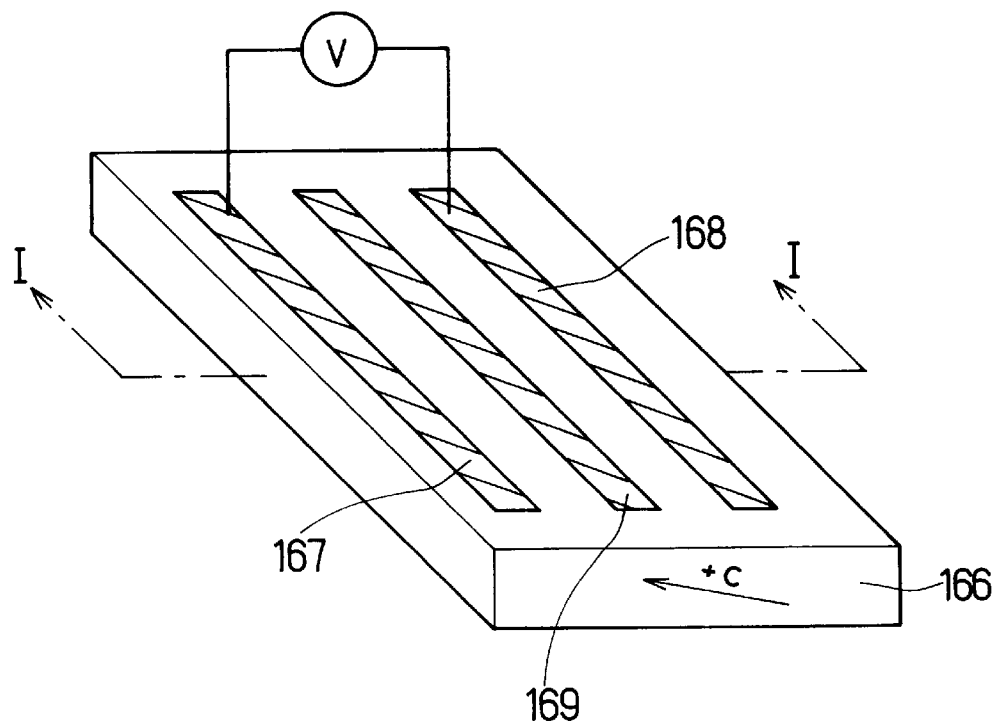
FIG. 48(a) is a perspective view to illustrate a method for producing polarization inversion parts of this invention.
FIG. 48(b) is a cross-sectional view thereof.
Figure 48:
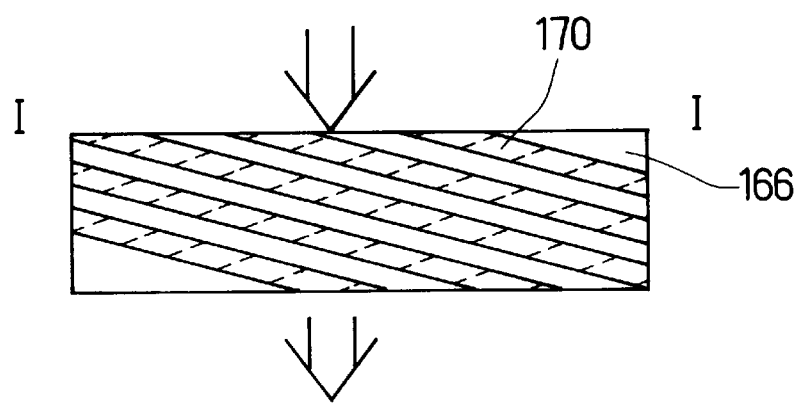

The method for producing the same is explained referring to FIGS. 48(a,b). Electrodes (167, 168) are formed on an MgO:LiNbO$_3$ substrate 166 on which the X axis is inclined by 3° from the normal line of the substrate. Between the electrodes, a bar-shaped medium electrode 169 is formed. When voltage is applied to the space between the electrodes 167, 168, polarization inversion parts are formed under the electrodes (167, 169), and the polarization inversion parts grow in the crystal polarization direction of the substrate 166. FIG. 48(b) is a cross-sectional view to show the formed polarization inversion parts. The polarization inversion parts are formed in the substrate 166 periodically in the oblique direction.

When the bulk element is used, a light beam that is radiated substantially perpendicularly to the substrate is propagated in the periodic polarization, and its wavelength is converted. This optical wavelength conversion element is characterized in that the polarization inversion parts 170 with a short period are easily formed. As shown in FIG. 48, the polarization inversion period that is substantially perpendicular to the substrate 166 is very short compared to that of the electrode 167. When the crystal axis is inclined by 3° as shown in FIGS. 48(a,b), the period of the polarization inversion is $\frac{1}{20}$ of the electrode. In other words, a polarization inversion period of 1 μm will be formed every time that the bar-shaped electrode with a period of 20 μm is formed. As mentioned above, polarization inversion parts 170 with a very short period can be formed. If such a polarization inversion part having a short period can be formed, the period of the converted wavelength also will be shortened.

It is preferable that the bar-shaped electrode 167 (FIG. 48) in this embodiment be replaced by a comb-shaped electrode. Although a bar-shaped electrode provides polarization inversion, the crystal will be distorted due to the piezoelectric effect upon the application of an electric field, and the periphery of the electrode may be cracked. If a comb-shaped electrode is used, crystal distortion is reduced and no cracks will occur. However, the polarization inversion parts should be patterned to correspond to the comb-shaped electrode. In order to solve this problem, the width of the combs is determined to be a half of the period, so that the adjacent polarization inversion parts are connected with each other, and the formed polarization inversion parts will be equal to that of the case using a bar-shaped electrode.

The X plate used in this embodiment can be replaced by a Y plate. The MgO:LiNbO$_3$ used in this embodiment can be replaced by LiNbO$_3$, LiTaO$_3$ and the mixture (LiNb$_x$Ta$_{(1-x)}$O$_3$). A similar element can be produced by using KTP(KTiOPO$_4$). Since LiTaO$_3$, LiNbO$_3$, and KTP have a high nonlinear property, they can provide an optical wavelength conversion element with a high efficiency.

Furthermore, similar effects can be obtained by using MgO-doped LiTaO$_3$, MgO-doped LiNbO$_3$, and the mixture (MgO: LiNb$_x$Ta$_{(1-x)}$O$_3$). The doped MgO has improved resistance against optical damage. Thereby stable properties can be obtained for SHG with high output power.

The MgO:LiNbO$_3$ substrate in this embodiment can be replaced by another crystal thin film formed by growing crystal. Such a thin film has excellent crystal property and high nonlinear property so that a highly-efficient optical wavelength conversion element can be formed. Furthermore, the crystal layer can be used for an optical waveguide, which will prevent the deterioration of the nonlinear property due to the waveguide formation.

Embodiment 24

Figure 49:
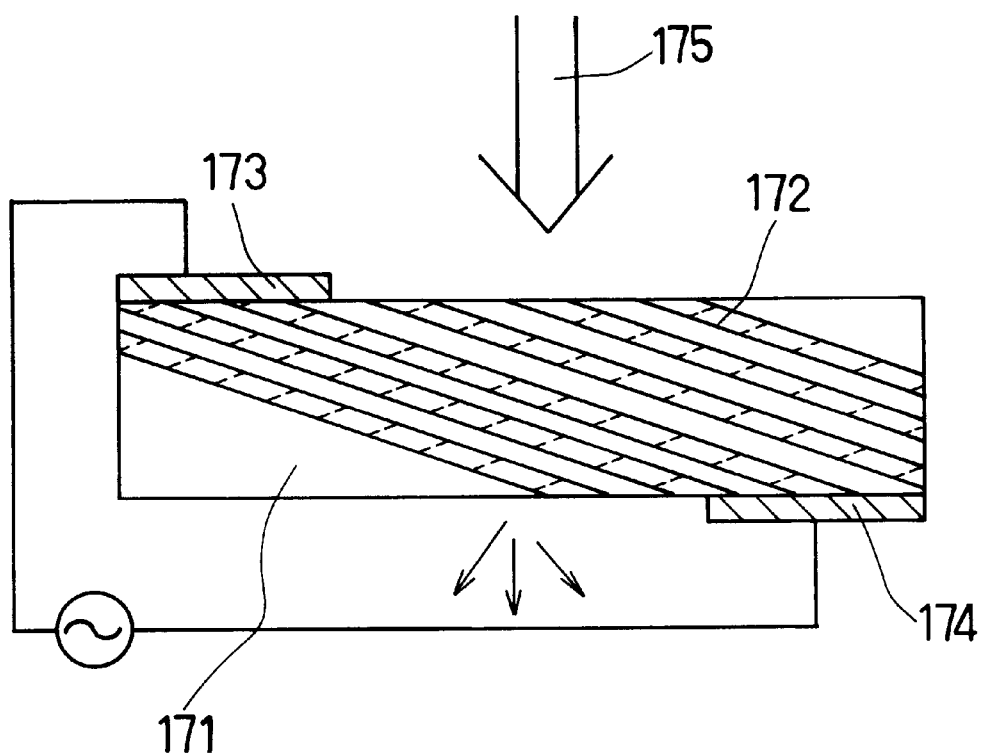
FIG. 49 is a cross-sectional view to illustrate a diffraction element of this invention.

An optical diffraction element can be provided by using the bulk periodic polarization inversion structure. FIG. 49 shows the configuration of the diffraction element of this embodiment. In FIG. 49, periodic polarization inversion parts 172 are formed on an MgO:LiNbO$_3$ oblique substrate, and electrodes 173 and 174 are formed on the front and back sides of the substrate respectively. If voltage is applied to the space between the electrodes as a light beam 175 is radiated on the substrate, the refractive indexes of the polarization inversion parts and of the non-inversion parts change respectively, and a grating having a structure of polarization inversion is formed. Therefore, light beams passing through the substrate can be changed. As indicated in Embodiment 22 of this invention, the polarization inversion parts can be formed periodically and two-dimensionally in the width and depth directions. As a result, a two-dimensional diffraction element can be formed. Furthermore, the diffraction force can be modified depending on the voltage applied.

In this embodiment, diffraction is generated from the polarization inversion. It is also possible to integrate the diffraction element by etching on the substrate. Complicated functions can be integrated in an element by forming the diffraction element on the substrate, and thus, farther complicated diffraction functions can be provided.

In this embodiment, electrodes for modulating the refractive index are formed on front and back surfaces. It is also possible to provide plural electrodes on either the front or back surface. If the applied electric field is controlled by plural electrodes, the efficiency of the diffraction element can be distributed two-dimensionally. In this case, influence by the electrodes on the diffraction light can be prevented by using transparent electrodes, and thus, the position of the electrodes will not be limited.

Figure 50:
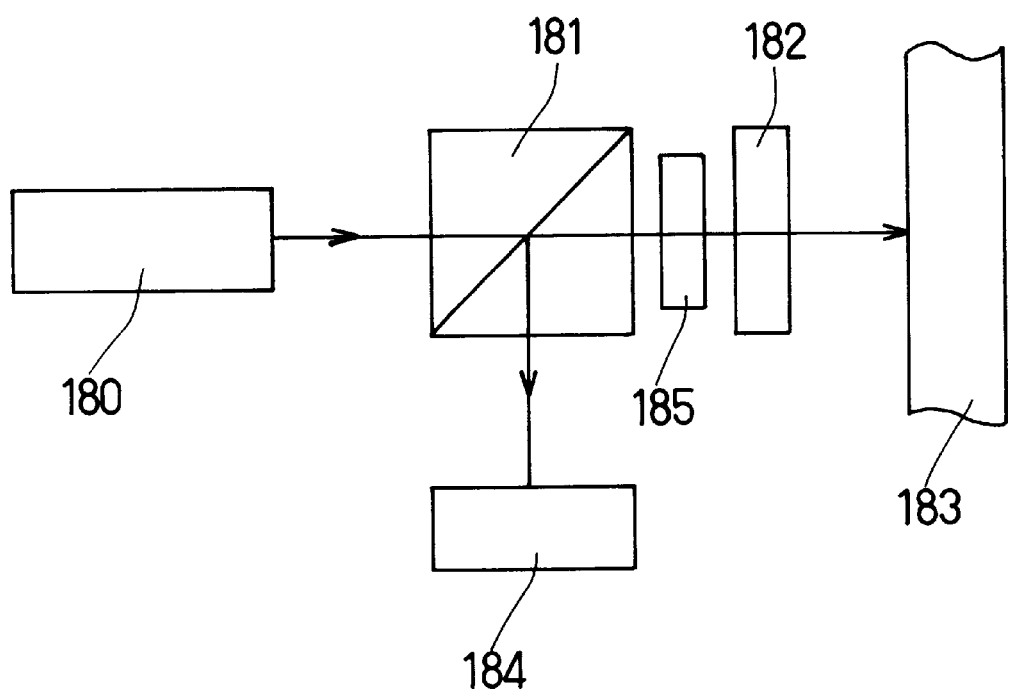
FIG. 50 is a schematic diagram to illustrate the configuration of an optical pickup of this invention.

Moreover, an optical information processing device can be produced by using an diffraction element of this embodiment. FIG. 50 is a schematic view showing an optical information processing device of this invention. A beam from a semiconductor laser 180 will pass a beam splitter 181, and is irradiated to a diffraction element 185 of this embodiment and a lens 182 in order to be radiated to the optical disk 183 as an information recording medium. The reflected light is inversely collimated by the lens 182, reflected by the beam splitter 181, and thus, signals are read at the detector 184. The diffraction element 185 controls the focus spot to focus on the optical disk 183. In order to read the signals from the optical disk 183, the focus spot should be focused at a predetermined position. For this purpose, the focus spot was controlled by using the diffraction element 185. As the diffraction element 185 can respond at high speed, the diffraction can be controlled at a speed of at least 500 MHz. As a result, an optical information processing device that can process information at a stable and high speed will be provided.

Embodiment 25

In this embodiment, polarization inversion parts are produced by providing an insulating film between two electrodes positioned apart from each other on the crystal in order to apply voltage. The substrate used for this purpose comprises crystal whose polarization direction is inclined to the substrate surface.

Figure 51:
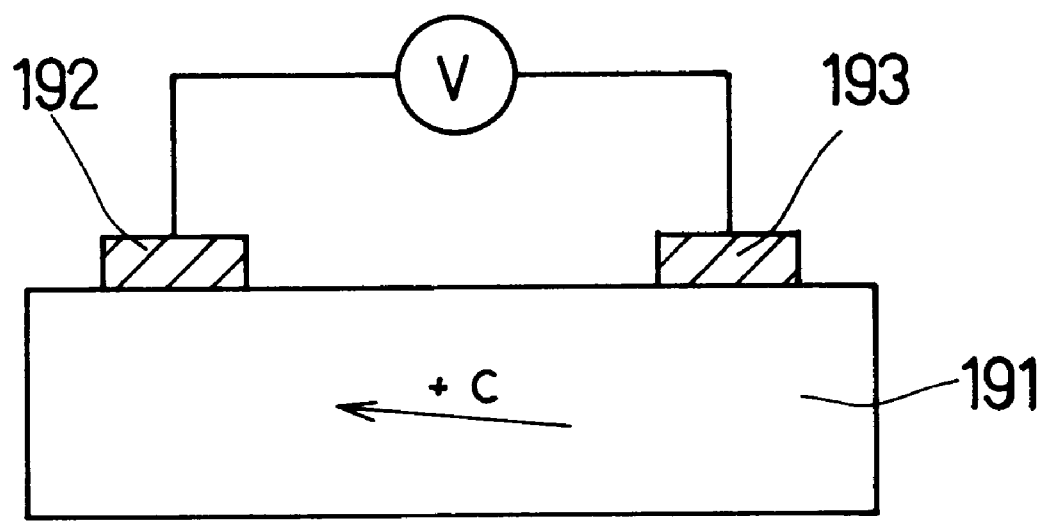
FIGS. 51–53 and 55 are cross-sectional views to illustrate the position relationship between a pair of electrodes for forming polarization inversion parts and an insulating film.

The substrate 191 is an MgO-doped LiNbO$_3$. The polarization direction is inclined by 3° with respect to the substrate surface. First, electrodes were formed directly on the substrate (FIG. 51) and voltage was applied thereto. The first electrode 192 was a comb-shaped electrode, and the second electrode 193 was a bar-shaped electrode. The voltage was applied in an insulating solution in order to prevent discharging. In many cases, electric breakdown occurred between the electrodes during polarization inversion, and it was impossible to apply high voltage. In other words, the percentage of forming homogeneous polarization inversion parts is low.

In this embodiment, the polarization inversion parts were thin (about 1.2 μm), since the voltage between the electrodes was lowered due to the generation of the polarization inversion, and the applied voltage was lowered temporarily. The applied voltage was 3 kV when the electrode interval was 400 μm. When higher voltage was applied, electric breakdown occurred and further voltage was not applied.

Figure 57:
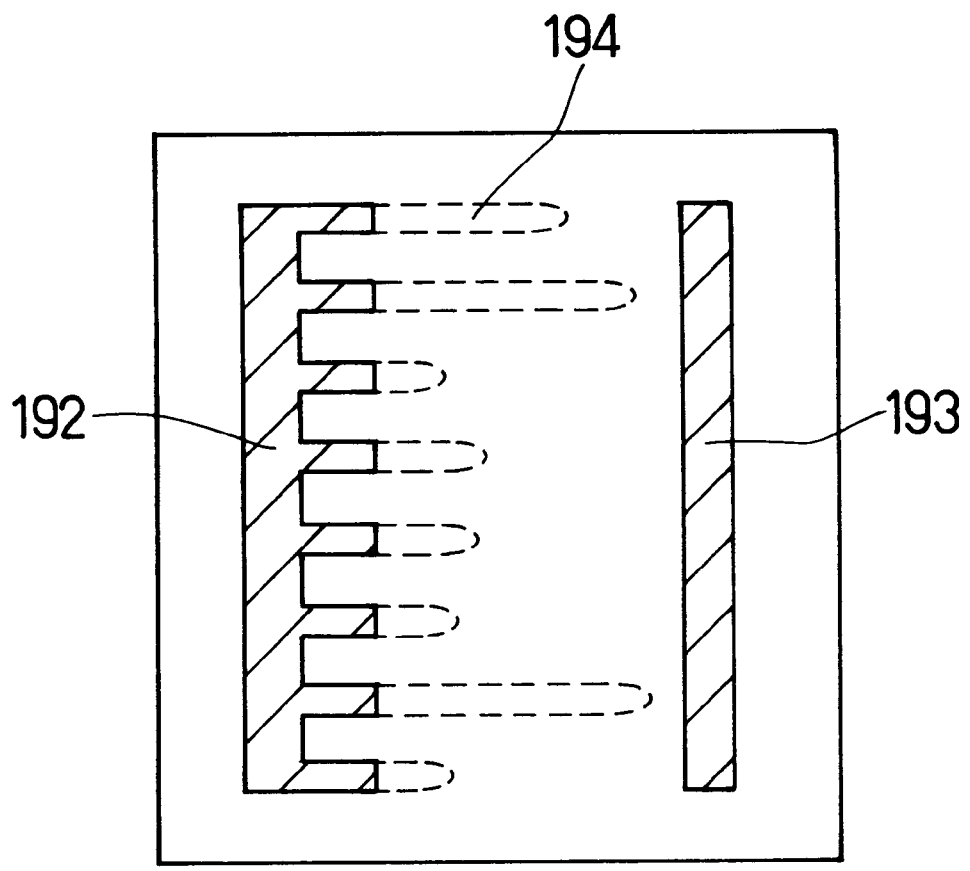
FIG. 57 is a plan view to illustrate the polarization inversion parts formed in the method shown in FIG. 51.
Figure 58:
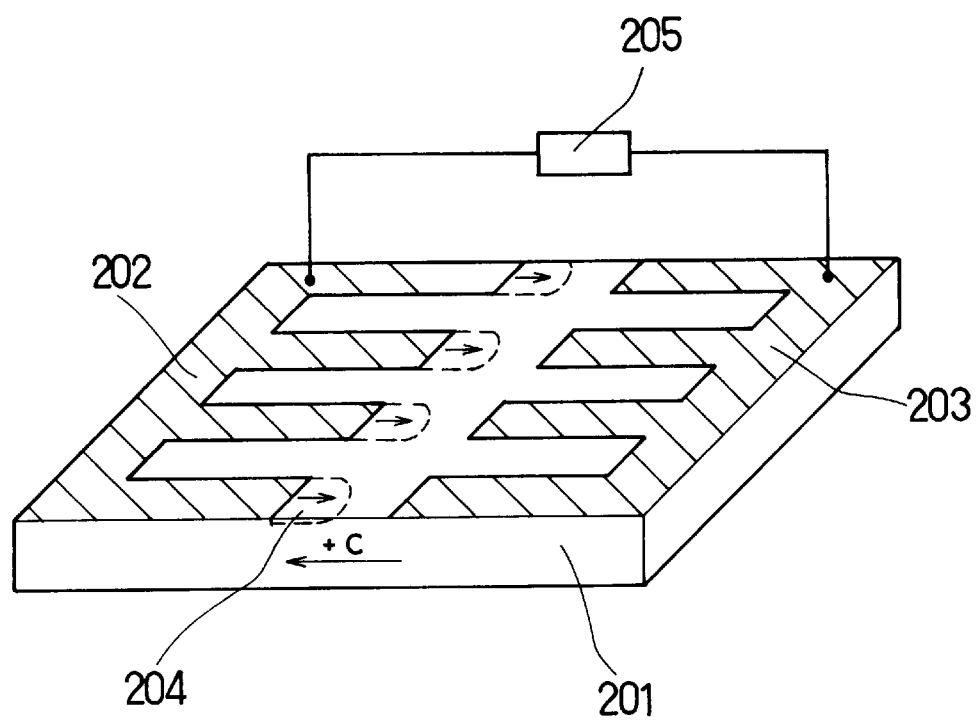
FIGS. 58–60 are perspective views to illustrate conventional methods of producing polarization inversion parts.
Figure 59:
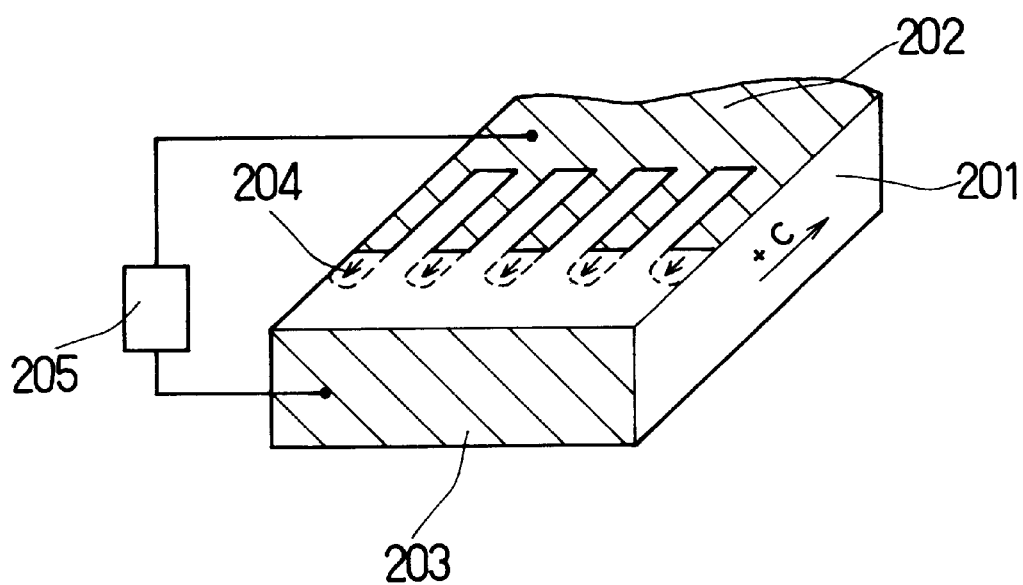
Figure 60:
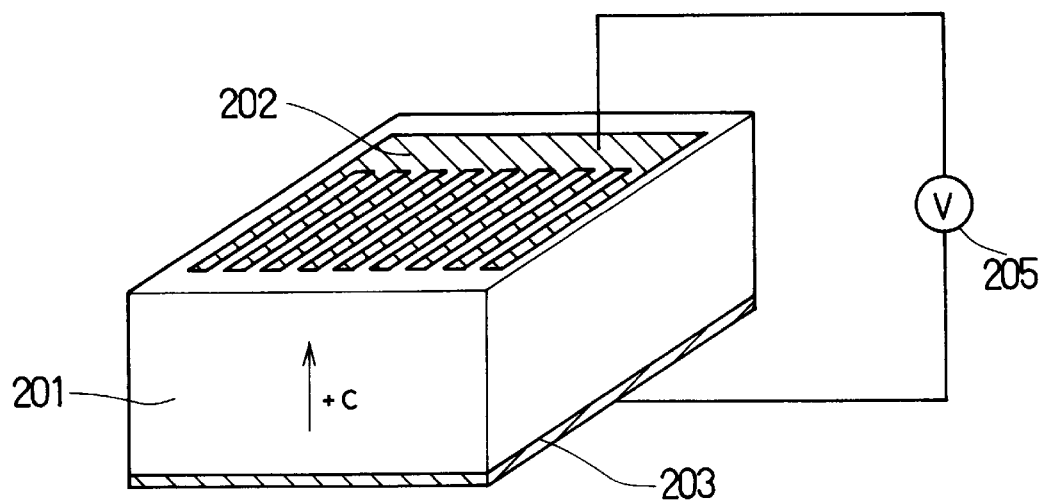
Figure 61:
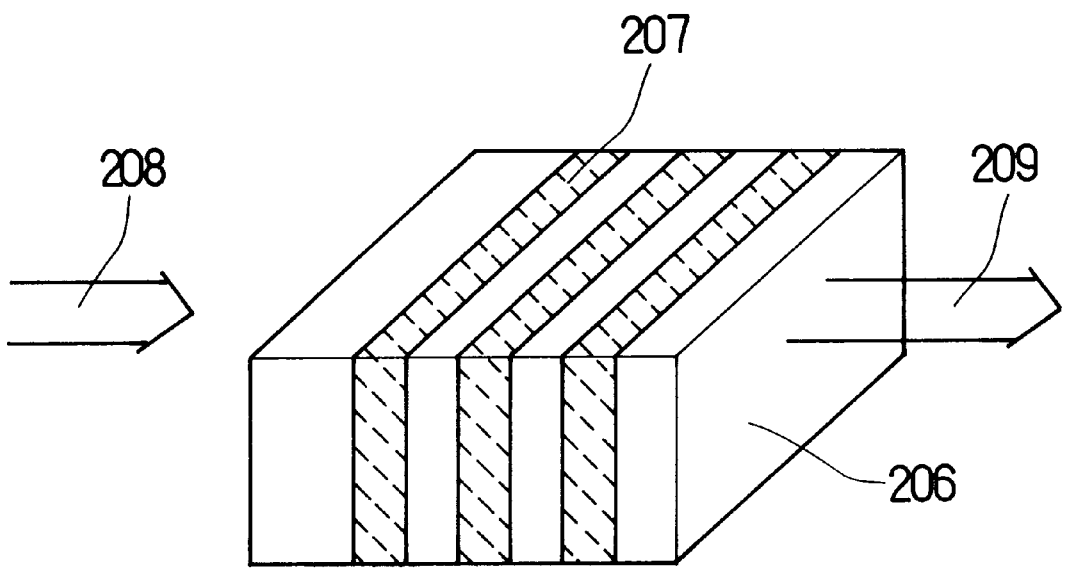
FIGS. 61–63 are perspective views to illustrate conventional optical wavelength conversion elements.
Figure 62:
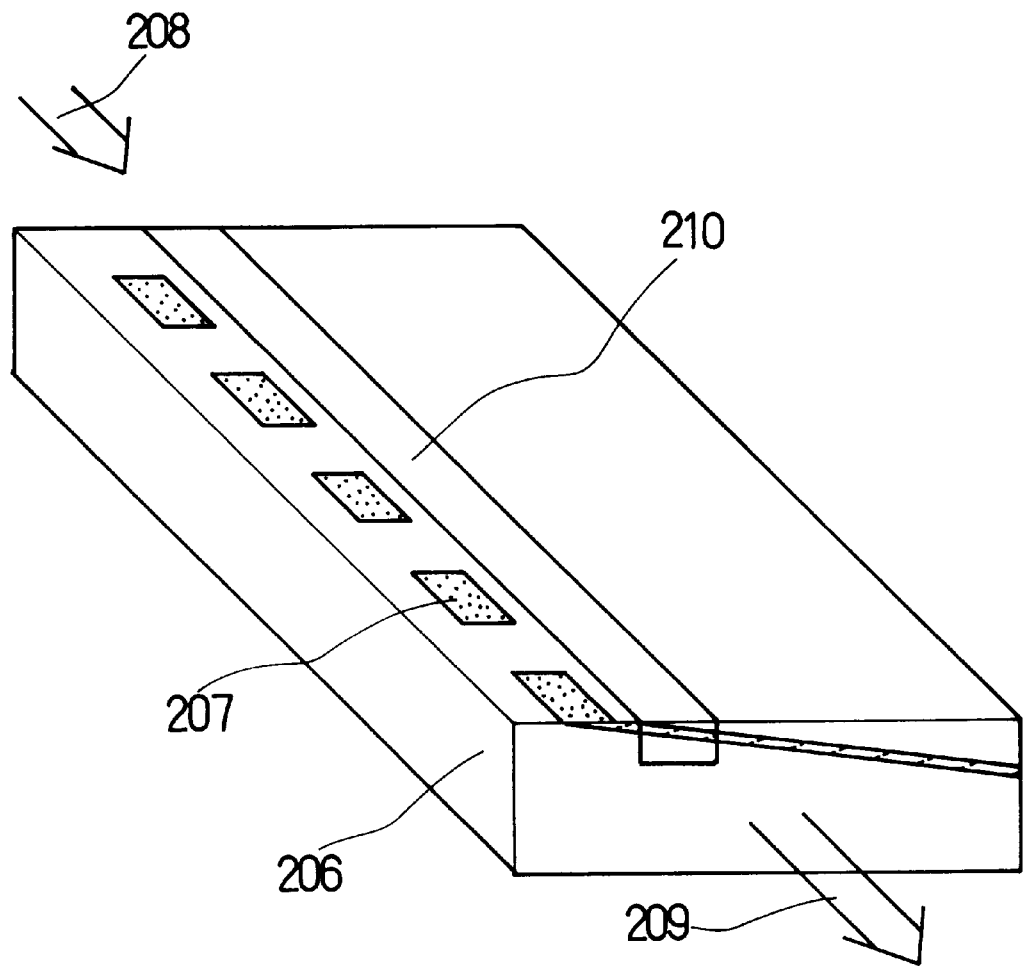
Figure 63:
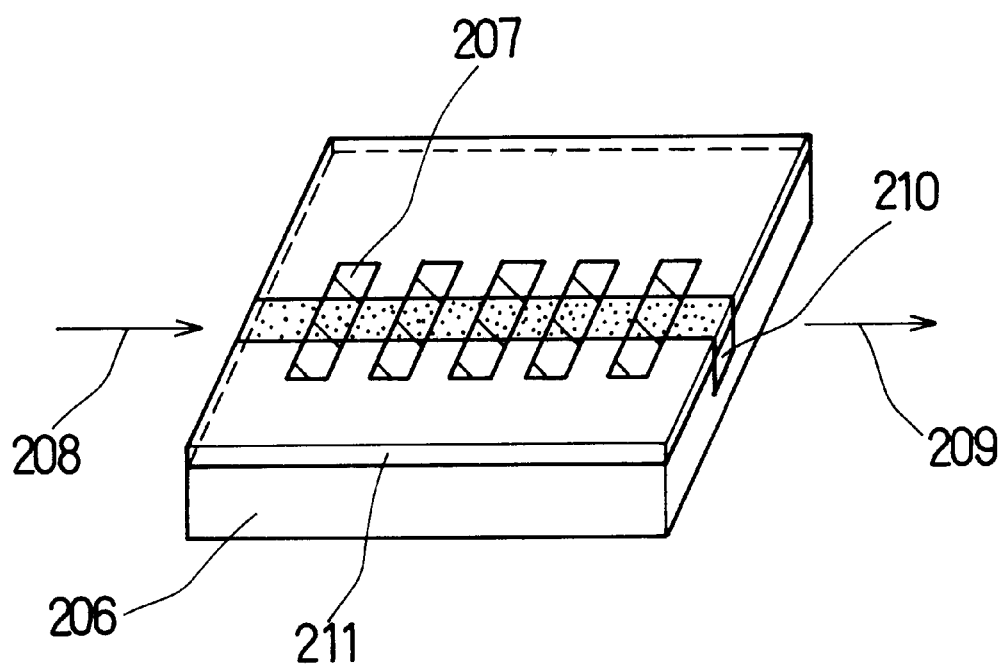

When the polarization inversion parts were formed to be 10 mm, many heterogeneous polarization inversion parts existed (FIG. 57). This phenomenon occurs because the comb-shaped electrode is partially energized or some parts of the polarization inversion parts grow due to the heterogeneity of the crystal when high voltage is applied to invert the polarization. That is, it is considered that the phenomenon occurs due to the heterogeneity of the voltage applied to the crystal.

Figure 52:
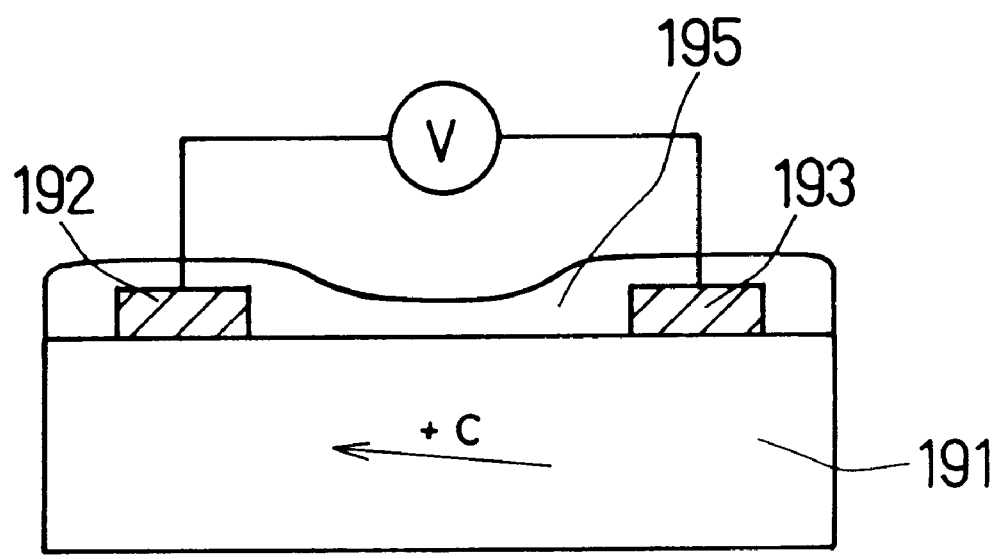

Next, voltage was applied to the substrate on which entire electrodes were covered with an insulating film 195 (FIG. 52). As a result, the insulating property between the electrode was increased and the homogeneity of the polarization inversion parts was improved. However, the heterogeneity of the polarization inversion parts exits and it is difficult to form the polarization inversion parts in the whole length of 10 mm. This is considered to be caused by the electrodes contacting to the substrate surface. Due to the electrodes, the resistance value changes at the parts with heterogeneous crystal and the applied voltage is not homogeneous. When the thickness of the $SiO_2$ film (insulating film) is at least 50 nm, the inversion property will not change regardless of the deposit degree.

Figure 53:
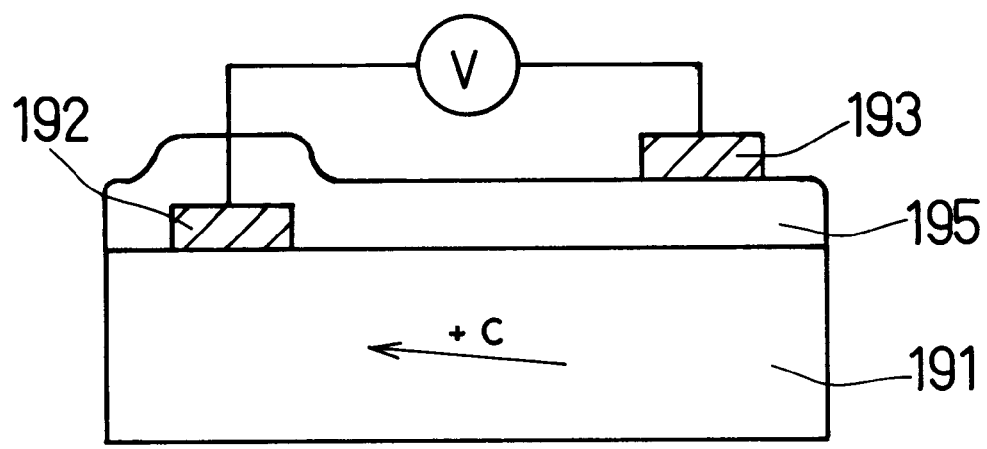
Figure 54:
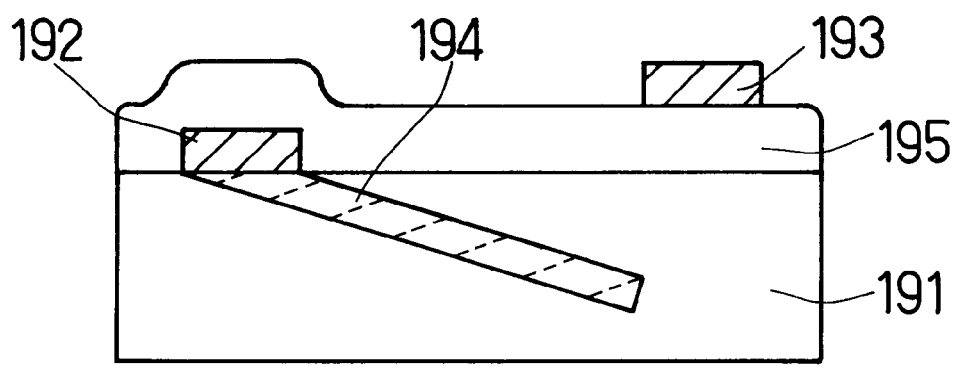
FIG. 54 is a cross-sectional view to illustrate the polarization inversion parts formed in the method shown in FIG. 53.

FIG. 53 shows another example of polarization inversion. Polarization inversion parts were formed as shown in FIG. 54 when voltage was applied to the space between the electrodes via the $SiO_2$ insulating film. In the method shown in FIGS. 51 and 52, voltage of 3 kV can be applied without causing breakdown. In the method shown in FIG. 53, the voltage can be raised to 3.5 kV without breakdown. As a result, the polarization inversion part thickness can be increased to at least 2 μm by increasing the applied voltage, and deeper polarization inversion parts can be formed.

In addition, the homogeneity of the polarization inversion is found to be improved remarkably in this method. The heterogeneity of the applied voltage due to the crystal heterogeneity can be controlled by forming electrodes via an insulating film. As a result, homogeneous polarization inversion parts can be formed to be at least 30 mm. The insulating film is $SiO_2$ that is deposited by sputtering. An $SiO_2$ film of less than 100 nm thick cannot provide any affects on the insulating film. The thickness should be at least 200 nm to form deep polarization inversion parts. Deposition of 1000 nm or more will not change the inversion property, but it takes at least ten hours, that is, it deteriorates the productivity.

Figure 55:
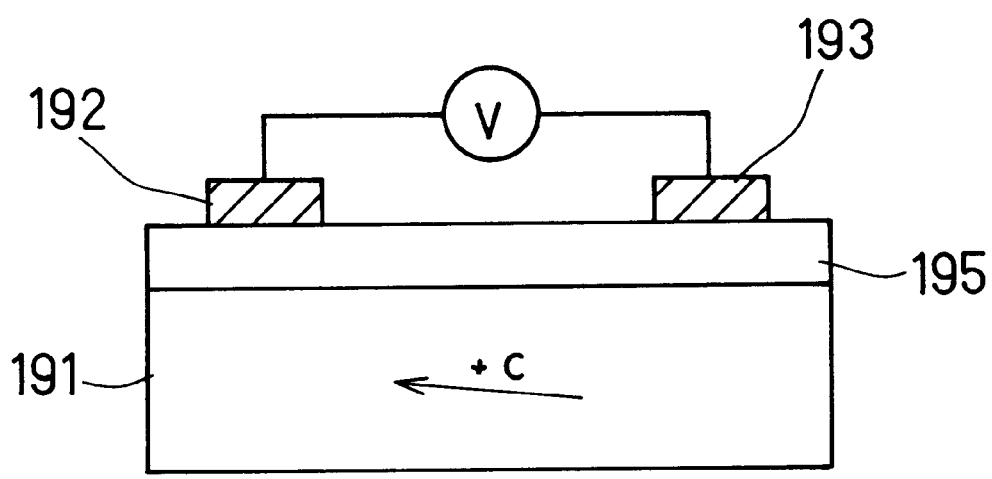

Next, a method for depositing $SiO_2$ under the electrodes (FIG. 55) is explained. In this method, the electrodes can be separated from the crystal surface and heterogeneous applied voltage can be prevented. As a result, homogeneous polarization inversion parts can be formed. However, the electric field components between the electrode digits of the comb-shaped electrode will be overlapped if the insulating film gets thicker. So periodic polarization inversion cannot be obtained but the adjacent polarization inversion parts adhere to each other. When the thickness of an $SiO_2$ film ranges from 20 nm to 100 nm, a periodic polarization inversion will be provided. The polarization inversion becomes uneven if the thickness is less than 20 nm, while a periodic polarization inversion will not be provided if the thickness exceeds 100 nm. The $SiO_2$ film should be at least 10 nm thick to prevent discharging, though an $SiO_2$ film with a thickness more than 100 nm will prevent the periodic polarization inversion. Therefore, the film thickness should not be less than 10 nm nor more than 100 nm to prevent discharging and to provide a periodic polarization inversion. The properties including the homogeneity of the polarization inversion are further improved when the film thickness ranges from 20 nm to 60 nm.

In this embodiment, the substrate whose polarization direction is inclined with respect to the substrate surface is used. This substrate can be replaced by an X plate or Y plate having a polarization direction parallel to the substrate surface.

Embodiment 26

Figure 56:
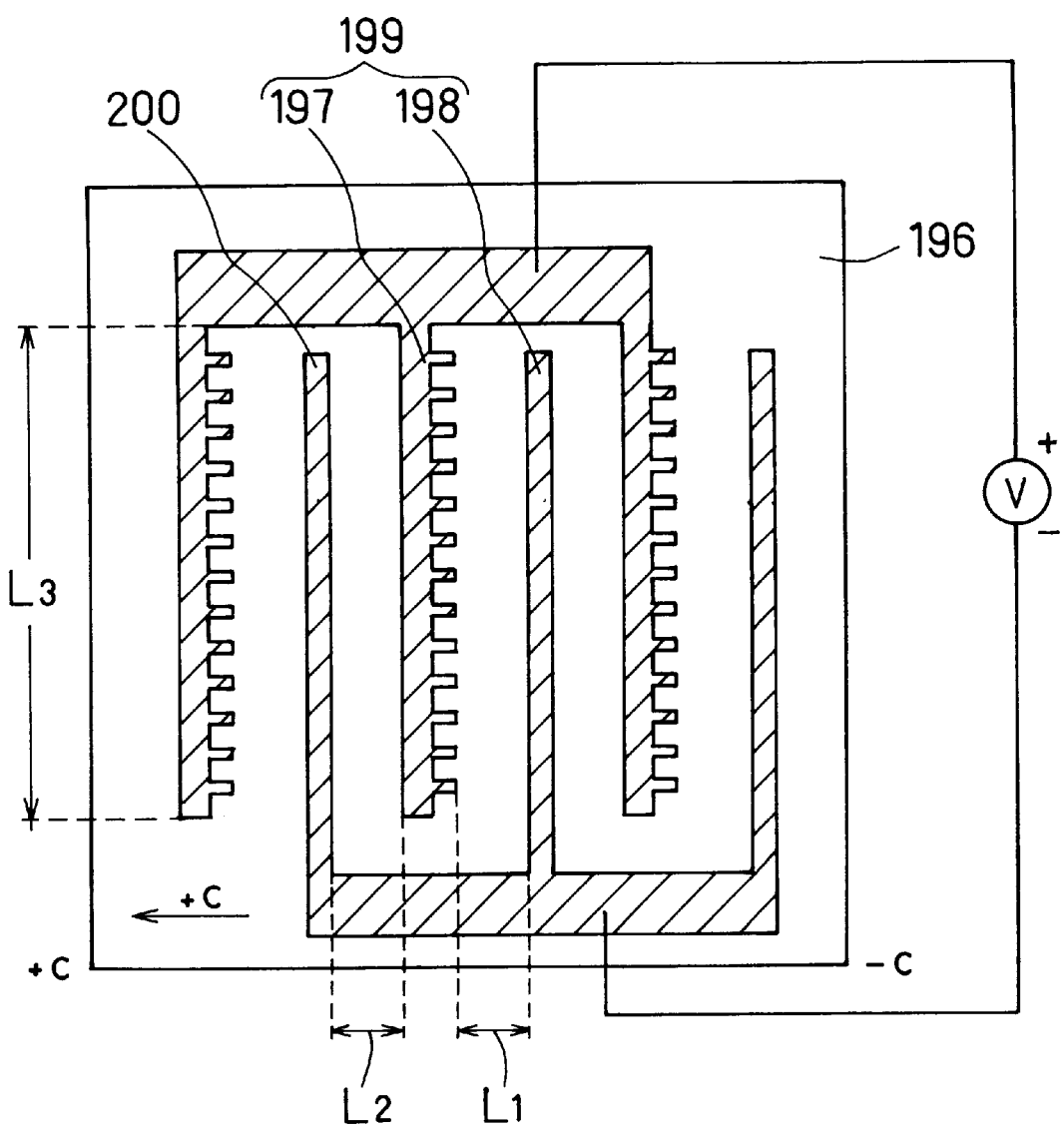
FIG. 56 is a plan view to illustrate a method for producing polarization inversion parts of this invention.

In order to form polarization inversion parts in a large area simultaneously, at least one pair of electrodes comprising a comb-shaped electrode and a bar-shaped electrode were formed to which voltage was applied simultaneously. FIG. 56 is a plan view to show the embodiment. The efficiency was remarkably improved by inverting the polarization with the at least one pair of electrodes.

In this embodiment, the bar-shaped electrode 198 is positioned in front and back of the comb-shaped electrode 197. As a result, the homogeneity and the depth of the polarization inversion parts were remarkably improved. When only one pair of electrodes 199 are used, the electric field applied to the tips of the electrode 197 is affected only at the space between the bar-shaped electrode opposing the comb-shaped electrode. By positioning the bar-shaped electrode 198 at the backside of the comb-shaped electrode 197, the electric field is also affected by the back electrode. Namely, the electric field component at the tips of the electrode digit generating the polarization inversion generates an electric field component in the direction of the substrate thickness. $L_1$ is the distance between the comb-shaped electrode 197 and the opposing bar-shaped electrode 198, and $L_2$ is the distance between the electrode 197 and a bar-shaped electrode 200 at the other side. The distances ($L_1$, $L_2$) were adjusted to compare the properties of the formed polarization inversion parts.

For the substrate, an MgO: $LiNbPO_3$ substrate 196 was used. The substrate had crystal polarization inclined by 3° with respect to the substrate surface. A proper L, distance was from 100 μm to 1000 μm. When the value is less than 100 μm, discharging may occur. When the value exceeds 1000 μm, the applied voltage can reach about 10 kV and cause breakdown. It is more preferable that the value ranges from 200 μm to 800 μm, since the homogeneity of the polarization inversion will be improved.

The distance $L_2$ also was examined. When it is less than 100 μm, discharging will occur frequently between the electrodes at voltage application, and the polarization invention parts formation ratio will deteriorate. The thickness of the formed polarization inversion parts is decreased to about 1 μm. When the value of $L_2$ exceeds 200 μm, periodical polarization inversion parts were not obtained. Therefore, in this method for directly forming electrodes on a substrate, a proper value for $L_2$ is from 100 μm to 200 μm.

A similar polarization inversion was conducted by covering the comb-shaped electrode 197 with an $SiO_2$ insulating film and by forming bar-shaped electrodes (198, 200) on the insulating film. The value of $L_2$ can be maintained to be at least 200 μm by covering with the insulating film. By covering the comb-shaped electrode 197 with an insulating film, the electrode digits can be separated from each other, which enables formation of periodic polarization inversion parts. In addition, leakage of current between the opposing electrode 200 and the comb-shaped electrode 197 can be prevented, and the electric field component of the electrode digit can be controlled. When the $L_2$ value ranges from 100 μm to 1000 μm, the homogeneity of the polarization inversion parts is remarkably improved. And the thickness of the polarization inversion is substantially doubled, 2 μm or more, compared to a conventional one due to the electric field component provided by the opposing electrode 200.

The homogeneity of the formed polarization inversion parts depends on the total length of the comb-shaped electrode ($L_3$). The homogeneity gradually deteriorates as the total length (total of the plural electrodes) increases. The polarization inversion currents will lose the homogeneity as the current for polarization inversion is increased in proportion to the total length of the comb-shaped electrode. In this experiment, a substantially-homogeneous polarization inversion is provided when the total length is in the range of 10 mm to 100 mm. The homogeneity will deteriorate once the length exceeds 200 mm, and polarization inversion parts will be formed only partially when the value exceeds 300 mm. The total length should be controlled under 200 mm in order to form homogeneous polarization inversion.

Embodiment 27

Figure 65:
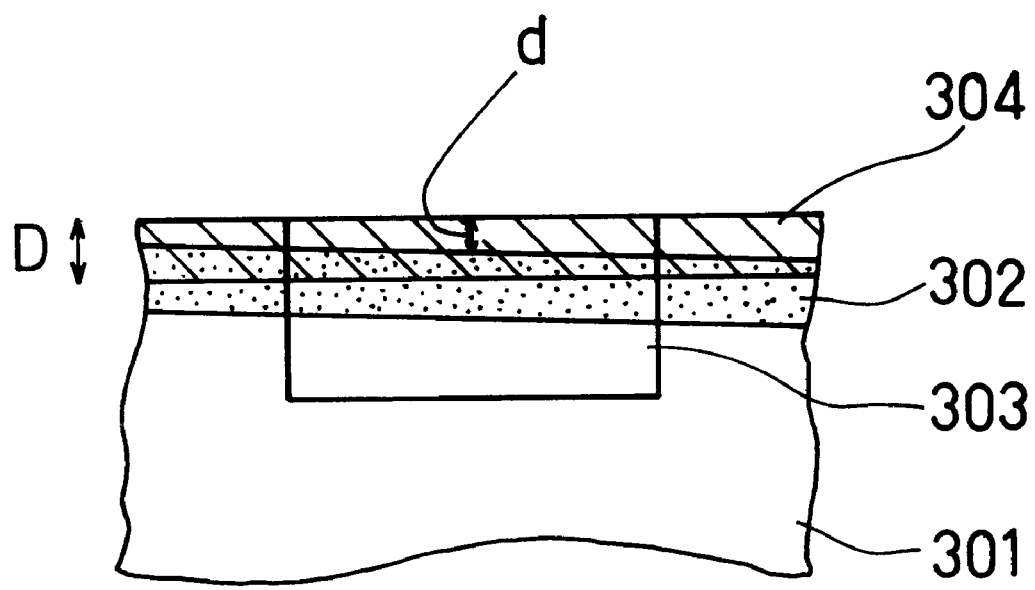
FIG. 65 is a partial cross-sectional view of the optical wavelength conversion element shown in FIG. 64.

An still another light wavelength conversion element using an ion exchanged layer will be explained referring to FIGS. 64 and 65.

As shown in FIG. 64, an ion exchanged layer 304 and an optical waveguide 303 are formed along a surface in the substrate 301 of a crystal having a nonlinear optical effect. The ion exchanged layer 304 can be formed by proton exchange and is a layer with a higher refractive index than that of the substrate 301 as mentioned above. A polarization inversion part 302 is formed in the surface of the substrate so as to traverse the optical waveguide 303 periodically. In the substrate 301, the polarization inversion part 302 also has an angle with respect to the surface of the substrate in this range, since the angle between a polarization direction and a surface of the substrate is 1°–5°.

In such a light wavelength conversion element, the relationship between the depth of the polarization inversion part in the optical waveguide and the light wavelength conversion element was examined. As shown in FIG. 65, the depth of the polarization inversion part is shown by the distance d between the surface of the substrate and the upper end of the polarization inversion part 302 at the center of the width of the optical waveguide 303. The layer 304 with a high refractive index was formed by proton exchange. The thickness of the polarization inversion part and the optical waveguide was about 2 μm and about 3 μm respectively. MgO-doped $LiNbO_3$ was used as the substrate 301 having an inclination angle of 3° between a polarization direction and a surface of the substrate.

As a result, the conversion efficiency in the case of d=0.2–0.5 μm doubled compared to the case of d=0. The conversion efficiency in the case of d=0.2–0.3 μm was further improved. On the other hand, the conversion efficiency in the case of d>1 μm was almost the same as that in the case of d=0. It is preferable that the d is determined so that overlap of the optical waveguide and the polarization inversion part increases according to the depth of the optical waveguide, since a most preferable range of the d depends on the depth of the optical waveguide.

Furthermore, optical damage in this light wavelength conversion element was examined, since in the case that the d was a preferable value in the examination above, the conversion efficiency was improved but the strength for the optical damage decreased in some cases. It can be considered that the optical damage is generated in the vicinity of the surface of the optical waveguide in which no polarization inversion part exists. Then, it was found that the optical damage could be improved in the case of D>d, as the relationship between the d and the thickness D of the layer with a high refractive index was adjusted. On the other hand, an effect of the layer was not found remarkably in the case of D<d. It can be considered that this occurs, since the layer that is a proton exchanged layer restrains the generation of optical damage by the deterioration of the electro-optic constant and the improvement of the electric conductivity. In addition, overlap of guided light increased and the conversion efficiency also was improved by forming the layer in the surface of the optical waveguide.

The layer with a high refractive index can be formed in an entire surface of the substrate as shown in the figures, but it also may be formed only in a surface of the substrate near the surface of the optical waveguide.

It is preferable that substrates prepared by using liquid phase growth are used for the respective Embodiments, since homogeneous optical crystal can be produced at a low cost. Specifically, parts that are epitaxially grown from the liquid phase can be used for forming an optical waveguide in a substrate, as the optical waveguide uses only the several μm range from the crystal surface. The use of the liquid phase growth facilitates doping $LiNbO_3$ with MgO. An MgO-doped substrate will have improved resistance to optical damage. Or an Nd-doped substrate can be used as a laser medium.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method for manufacturing a polarization inversion part comprising:

forming a polarization inversion part by applying a voltage in the polarization direction of a ferroelectric crystal substrate;

conducting a treatment for reducing an internal electric field generated in the substrate by having applied the voltage; and then reinverting polarization in at least a part of the polarization inversion part by applying a reverse direction voltage against the voltage having been applied.

2. A method for manufacturing a polarization inversion part according to claim 1, wherein the treatment for reducing an internal electric field is at least one treatment selected from a heat treatment of the substrate at a temperature between 150° C. and a temperature less than the Curie temperature of the substrate and a treatment applying to the substrate a reverse direction electric field against the internal electric field.

3. A method for manufacturing a polarization inversion part according to claim 1, further comprising forming a polarization inversion stabilized part in an area near the surface of the substrate where polarization has been inverted at least once after reinverting the polarization.

4. A method for manufacturing a polarization inversion part according to claim 3, wherein the polarization inversion stabilized part is formed by a process comprising an ion exchange in the area.

5. A method for manufacturing a polarization inversion part according to claim 4, wherein the polarization inversion stabilized part is formed by a process comprising the ion exchange and a heat treatment at a temperature less than the Curie temperature of the substrate and not less than a temperature lower than the Curie temperature by 150° C., which is carried out after the ion exchange.

6. A method for manufacturing a polarization inversion part according to claim 1, comprising:
    forming a first electrode and a second electrode having a stripe pattern part on a surface or opposed surfaces of the substrate so that projection of the stripe pattern part of the one electrode in the polarization direction of the substrate fits into the stripe pattern part of the other electrode;
    developing the polarization inversion part from the first electrode side; and
    reinverting polarization in at least a part of the polarization inversion part from the second electrode side.

7. A method for manufacturing a polarization inversion part according to claim 1, comprising:
    forming a first electrode and a second electrode on a surface or opposed surfaces of the substrate, the second electrode having a stripe pattern part, the electrodes being formed so that projection of the stripe pattern part of the second electrode in the polarization direction of the substrate is included in the first electrode;
    developing the polarization inversion part from the first electrode side; and
    reinverting polarization in at least a part of the polarization inversion part from the second electrode side.

8. A method for manufacturing a polarization inversion part comprising:
    forming a polarization inversion part by applying a voltage in the polarization direction of a ferroelectric crystal substrate; and
    forming a polarization inversion stabilized part near the surface of the substrate in the polarization inversion part.

9. A method for manufacturing a polarization inversion part according to claim 8, wherein the polarization inversion stabilized part is formed by a process comprising an ion exchange of the polarization inversion part.

10. A method for manufacturing a polarization inversion part according to claim 9, wherein the polarization inversion stabilized part is formed by a process comprising the ion exchange and a heat treatment at a temperature lower than the Curie temperature of the substrate but not lower than the Curie temperature minus 150° C., which is carried out after the ion exchange.

11. A method for manufacturing a polarization inversion part according to claim 8, wherein the polarization part has a depth of 0.1 μm to 0.2 μm.

12. A method for manufacturing a polarization inversion part comprising a process for developing a polarization inversion part in the polarization direction by applying an electric field on a ferroelectric crystal substrate, the electric field having a first electric field element being parallel to the polarization direction of the ferroelectric crystal and a second electric field element being perpendicular to the polarization direction.

13. A method for manufacturing a polarization inversion part according to claim 12, wherein the second electric field element is larger than the first electric field element.

14. A method for manufacturing a polarization inversion part according to claim 12, wherein the second electric field element is 4 kV/mm or more and is lower than an electric field generating dielectric breakdown of the substrate.

15. A method for manufacturing a polarization inversion part according to claim 12, wherein the second electric field element is generated by a pulse voltage.

16. A method for manufacturing a polarization inversion part according to claim 15, wherein the first electric field element is generated by a pulse voltage whose pulse width is narrower than that of the pulse voltage generating the second electric field element.

17. A method for manufacturing a polarization inversion part according to claim 12, wherein the polarization direction and the surface of the substrate are substantially parallel.

18. A method for manufacturing a polarization inversion part according to claim 17, wherein a thickness of the substrate is 0.1 mm–0.4 mm.

19. A method for manufacturing a polarization inversion part according to claim 17, wherein the electric field is generated by a pair of electrodes arranged in the direction forming an angle of 2°–80° with the surface of the substrate.

20. A method for manufacturing a polarization inversion part according to claim 12, wherein the angle between the polarization direction and the surface is 1°–5°.

21. A method for manufacturing a polarization inversion part comprising:
    forming a first electrode, a second electrode and a low resistance part on a substrate of a ferroelectric crystal, the low resistance part having a value of resistance lower than that of a ferroelectric crystal and being formed between the first electrode and the second electrode; and
    developing a polarization inversion part in the polarization direction of the ferroelectric crystal by applying a voltage between the first electrode and the second electrode.

22. A method for manufacturing a polarization inversion part according to claim 21, wherein the low resistance part is formed by a process comprising an ion exchange.

23. A method for manufacturing a polarization inversion part according to claim 21, wherein two or more of the low resistance parts are substantially equally spaced between the first electrode and the second electrode.

24. A method for manufacturing a polarization inversion part according to claim 21, wherein the polarization direction and the surface are substantially parallel.

25. A method for manufacturing a polarization inversion part according to claim 21, wherein the angle between the polarization direction of the ferroelectric crystal and the surface is 1°–5°.

26. A method for manufacturing a polarization inversion part according to claim 25, wherein the low resistance part is formed with metal.

27. A method for manufacturing a polarization inversion part according to claim 26, wherein the low resistance part has a length of 10 μm–30 μm on the surface in the polarization direction.

28. A light wavelength conversion element comprising:
a ferroelectric crystal substrate; a polarization inversion part formed within the substrate so as to form layers substantially parallel to each other; and
a polarization inversion stabilized part formed within the polarization inversion part near the surface of the substrate, wherein the polarization inversion stabilized part is formed by a process including an ion exchange of the polarization inversion part, and has a depth of 0.01 μm to 0.2 μm.

29. A light wavelength conversion element comprising:
a crystal having a nonlinear optical effect;
an optical waveguide formed alone a surface in the crystal;
two or more polarization inversion parts formed so as to traverse the optical waveguide periodically;
an ion exchanged layer formed in a surface of the optical waveguide,
wherein the ion exchanged layer has a refractive index larger than that of the optical waveguide and a thickness that is determined so that a fundamental wave propagating in the optical waveguide cannot propagate in the ion exchanged layer but a higher harmonic of the fundamental wave can propagate in the ion exchanged layer; and
wherein the thickness of the ion exchanged layer corresponds to a diffraction limit of the higher harmonic or less.

30. A light wavelength conversion element according to claim 29, wherein a width of the ion exchanged layer is narrower than that of the optical waveguide.

31. A light wavelength conversion element according to claim 29, wherein the fundamental wave of a fundamental mode and the higher harmonic of a higher-order mode are in the state of phase matching within the optical waveguide.

32. A light wavelength conversion element according to claim 29, wherein the crystal is a ferroelectric crystal and the angle between the polarization direction of the crystal and the surface is 1°–5°.

33. A light wavelength conversion element according to claim 29, wherein a width of the ion exchanged layer is narrowed to a tapered end at an end of the optical waveguide.

34. A light wavelength conversion element comprising:
a crystal having a nonlinear optical effect;
an optical waveguide formed along a surface in the crystal;
two or more polarization inversion parts formed so as to traverse the optical waveguide periodically; and
an ion exchanged layer formed in a surface of the optical waveguide,
wherein the ion exchanged layer has a refractive index larger than that of the optical waveguide, a width narrower than that of the optical waveguide and a depth shallower than the half depth of the optical wave guide.

35. A light generator comprising a light wavelength conversion element and a semiconductor laser, converting a wavelength of an outgoing beam from the semiconductor laser by the light wavelength conversion element,
wherein the light wavelength conversion element comprises:
a crystal having a nonlinear optical effect,
an optical waveguide formed along a surface in the crystal;
two or more polarization inversion parts formed so as to traverse the optical waveguide periodically;
an ion exchanged layer formed in a surface of the optical waveguide,
wherein the ion exchanged layer has a refractive index larger than that of the optical waveguide and a thickness that is determined so that a higher harmonic of a fundamental wave can propagate in the ion exchanged layer but for the fundamental wave propagating in the optical waveguide can not propagate in the ion exchanged layer; and
wherein a fundamental mode of a fundamental wave of the beam is converted into a higher-order mode of a higher wave of the beam by the light wavelength conversion element, and at least a length in the diameter direction of a main peak of at least one sub-peak, other than the main peak having maximum intensity out of peaks in an intensity distribution of the higher-order mode of the higher harmonic wave, corresponds to the diffraction limit of the higher harmonic wave or less.

36. An optical pick-up comprising a light generator, a focusing optical system and a recording medium, an outgoing beam from the light generator being focused on the recording medium by the focusing optical system,
the light generator comprising a light wavelength conversion element and a semiconductor laser, converting a wavelength of an outgoing beam from the semiconductor laser by a light wavelength conversion element,
wherein the light wavelength conversion element comprises;
a crystal having a nonlinear optical effect;
an optical waveguide formed along a surface in the crystal;
two or more polarization inversion parts formed so as to traverse the optical waveguide periodically; and
an ion exchanged layer formed in a surface of the optical waveguide,
wherein the ion exchanged layer has a refractive index larger than that of the optical waveguide and a thickness that is determined so that a higher harmonic of a fundamental wave can propagate in the ion exchanged layer but for the fundamental wave propagating in the optical waveguide can not propagate in the ion exchanged layer; and
wherein a fundamental mode of a fundamental wave of the beam is converted into a higher-order mode of a higher wave of the beam by the light wavelength conversion element, and at least a length in the diameter direction of a main peak of at least one sub-peak, other than the main peak having maximum intensity out of peaks in an intensity distribution of the higher order mode of the higher harmonic wave, corresponds to the diffraction limit of the higher harmonic wave or less.

37. An optical waveguide comprising:
a crystal substrate;
a waveguide formed along a surface in the crystal substrate; and
an ion exchanged layer formed in a surface of the waveguide, wherein the ion exchanged layer has a refractive index larder than that of the waveguide and a thickness that is determined so that a higher harmonic of a fundamental wave can propagate in the ion exchanged layer but the fundamental wave propagating in the waveguide can not propagate in the ion exchanged layer; and wherein a thickness of the ion exchanged layer is a diffraction limit of the higher harmonic or less.

38. An optical waveguide according to claim 37, wherein a width of the ion exchanged layer is narrower than that of the waveguide.

39. An optical waveguide according to claim 37, wherein the fundamental wave of a fundamental mode and the higher harmonic of a higher-order mode are in the state of phase matching within the waveguide.

40. An optical waveguide according to claim 37, wherein the angle between the polarization direction of the crystal and the surface is 1°–5°.

41. An optical waveguide according to claim 37, wherein a width of the layer having a high refractive index is narrowed to a tapered end at ends of the waveguide.

42. An optical waveguide comprising:

a crystal substrate;

a waveguide formed along a surface in the crystal substrate; and an ion exchanged layer formed in a surface of the waveguide, wherein the ion exchanged layer has a refractive index larger than that of the waveguide, a width narrower than that of the waveguide and a depth shallower than half the depth of the waveguide.

43. A light wavelength conversion element comprising:

a substrate of a crystal with a nonlinear optical effect having an inclination angle of 1°–5° between a polarization direction and a surface of the substrate;

an optical waveguide formed along a surface in the substrate;

two or more polarization inversion parts formed so as to traverse the optical waveguide periodically; and an ion exchanged layer formed in a surface of the optical waveguide, wherein the ion exchanged layer has a refractive index larger than that of the optical waveguide and a thickness thinner than the thickness between the upper end of the polarization inversion part and the substrate surface at the center of the width of the optical waveguide.

* * * * *